US007506261B2

(12) United States Patent
(10) Patent No.: US 7,506,261 B2
(45) Date of Patent: Mar. 17, 2009

Satou et al.

(54) REMOTE OPERATION SYSTEM, COMMUNICATION APPARATUS REMOTE CONTROL SYSTEM AND DOCUMENT INSPECTION APPARATUS

(75) Inventors: Keizou Satou, Kasuga (JP); Tomofumi Nakayama, Kurume (JP); Masako Yoshimura, Dazaifu (JP)

(73) Assignee: Panasonic Corporation, Osaka (JP)

( * ) Notice: Subject to any disclaimer, the term of this patent is extended or adjusted under 35 U.S.C. 154(b) by 615 days.

(21) Appl. No.: 10/972,186

(22) Filed: Oct. 25, 2004

(65) Prior Publication Data

US 2005/0091607 A1 Apr. 28, 2005

(30) Foreign Application Priority Data

Oct. 24, 2003 (JP) .............................. 2003-364269
Nov. 5, 2003 (JP) .............................. 2003-375413
Dec. 1, 2003 (JP) .............................. 2003-401261
Dec. 1, 2003 (JP) .............................. 2003-401262

(51) Int. Cl.
*G06F 3/00* (2006.01)

(52) U.S. Cl. ........................ 715/740; 345/2.1; 345/619; 715/737

(58) Field of Classification Search ................. 345/838, 345/2.1, 619; 715/740, 746, 788, 737
See application file for complete search history.

(56) References Cited

U.S. PATENT DOCUMENTS 5,467,102 A * 11/1995 Kuno et al. .................. 345/1.3
5,598,183 A * 1/1997 Robertson et al. ........... 715/856
5,758,110 A * 5/1998 Boss et al. .................. 715/751

(Continued)

FOREIGN PATENT DOCUMENTS

EP 0949571 10/1999

(Continued)

OTHER PUBLICATIONS

International Search Report dated Jun. 1, 2005.

*Primary Examiner*—Rachna S Desai
*Assistant Examiner*—Gregory A Distefano
(74) *Attorney, Agent, or Firm*—Dickinson Wright, PLLC

(57) ABSTRACT

This invention is, in a remote operation apparatus which transmits information to a terminal device having a display part which displays received information, for the purpose of operability improvement on the occasion of inspecting structured documents such as Web pages, in a document inspection apparatus with a small screen size, equipped with an input part which inputs various instructions, a display part which displays various information, a communication processing part which obtains display information which is displayed on a display screen of the display part through a network, an area recognition processing part which extracts a size of a rectangular area which is included in a window which was obtained by the communication processing part and is displayed on the display part, and display information in the rectangular area, a storage part which stores size information of the display screen of the display part of the terminal device, an area change processing part which modifies a size of the rectangular area to a size of the display screen which was stored in the storage part, and obtains display information in the rectangular area, and control means which controls the communication processing part so as to transmit the display information which was modified by the area change processing part to the terminal device.

5 Claims, 56 Drawing Sheets

U.S. PATENT DOCUMENTS

| | | | | |
|---|---|---|---|---|
| 6,020,881 | A * | 2/2000 | Naughton et al. | 715/740 |
| 6,535,243 | B1 * | 3/2003 | Tullis | 348/207.1 |
| 6,825,860 | B1 * | 11/2004 | Hu et al. | 715/801 |
| 6,964,025 | B2 * | 11/2005 | Angiulo et al. | 715/838 |
| 6,976,226 | B1 * | 12/2005 | Strong et al. | 715/788 |
| 6,978,315 | B1 * | 12/2005 | Burrell | 709/246 |
| 6,983,331 | B1 * | 1/2006 | Mitchell et al. | 709/246 |
| 7,016,704 | B2 * | 3/2006 | Pallakoff | 455/566 |
| 7,032,172 | B1 * | 4/2006 | Lee et al. | 715/526 |
| 7,191,399 | B2 * | 3/2007 | Ohtani et al. | 715/517 |
| 7,210,099 | B2 * | 4/2007 | Rohrabaugh et al. | 715/517 |
| 2001/0050679 | A1 | 12/2001 | Shigeta | |
| 2002/0029259 | A1 | 3/2002 | Okada | |
| 2002/0088002 | A1 * | 7/2002 | Shintani et al. | 725/110 |
| 2002/0191031 | A1 * | 12/2002 | Ricard | 345/838 |
| 2003/0206193 | A1 * | 11/2003 | Sato et al. | 345/736 |
| 2005/0012723 | A1 * | 1/2005 | Pallakoff | 345/173 |

FOREIGN PATENT DOCUMENTS

| | | |
|---|---|---|
| JP | 58117591 | 7/1983 |
| JP | 242524 | 2/1990 |
| JP | 5250125 | 9/1993 |
| JP | 950267 | 2/1997 |
| JP | 1138958 | 2/1999 |
| JP | 1185133 | 3/1999 |
| JP | 2001 100886 | 4/2001 |
| JP | 2001 243151 | 9/2001 |
| JP | 2002 63108 | 2/2002 |
| JP | 2002 111893 | 4/2002 |

* cited by examiner

FIG. 41

10G

```
<HTML>
    <BODY>
      <TABLE>
        <TR>
          <TD>
            http://www.panaso・・・にア
            クセスすると、最新のニュー
            ス情報を・・・
          </TD>
        </TR>
      </TABLE>
    </BODY>
</HTML>
```

11G

```
<HTML>
    <BODY>
      <DIV width=" 320" >
       <TABLE>
        <TR>
          <TD>
            http://www.panaso・・・にア
            クセスすると、最新のニュー
            ス情報を・・・
          </TD>
       </TR>
      </TABLE>
     <DIV>
    </BODY>
</HTML>
```

(1, 10), (10, 20), (30, 40)····

(X, Y) ··· COORDINATE IN BROWSER DISPLAY AREA OF DISPLAY ELEMENT

REMOTE OPERATION SYSTEM, COMMUNICATION APPARATUS REMOTE CONTROL SYSTEM AND DOCUMENT INSPECTION APPARATUS

BACKGROUND OF THE INVENTION

1. Field of the Invention

This invention relates to a communication technology for displaying screen display information of a computer on a display screen of a portable terminal etc., through a network from the computer having a display screen.

2. Description of the Related Art

In recent years, on the basis of popularization of information terminals such as computers and PDA (Personal Digital Assistance), a remote operation system for operating a certain computer by an information terminal such as another computer and PDA has been provided.

In the suchlike remote operation system, a remote operation of a computer by an information terminal is realized, by notifying user operational information in a control side information terminal to a computer to be controlled, and by notifying screen information of the computer to be controlled, to the control side information terminal.

However, in case that a screen size of the control side information terminal is smaller than a screen size of the computer to be controlled, only a part of the screen of the computer to be controlled is displayed on the control side information terminal, and therefore, on the occasion of using the control side information terminal, a scroll operation has to be used freely and heavily.

On this account, in a conventional remote operation system, there is a thing which is equipped with a function for displaying a reduced screen of the computer to be controlled, on the control side information terminal screen, thereby realizing improvement of operability, but since it is of a reduced one, it is very difficult to read.

SUMMARY OF THE INVENTION

The invention is configured by having, in a remote operation apparatus for transmitting information to a terminal device having a display part for displaying received information, an input part for inputting various instructions, a display part for displaying various information, a communication processing part for obtaining display information which is displayed on a display screen of the display part, through a network, an area recognition processing part for extracting size information of a rectangular area which was obtained by the communication processing part and is included in a window which is displayed on the display part and display information in the rectangular area, a storage part for storing size information of the display screen of the display part of the terminal device, an area change processing part for modifying the size of the rectangular area to the size of the display screen which was stored in the storage part, and for obtaining the display information in the rectangular area, and control means for controlling the communication processing means so as to transmit the display information which was modified by the area change processing part, to the terminal device.

An object of the invention is to provide a remote operation system having a display screen which may display screen display information through a network from a computer having a display screen.

BRIEF DESCRIPTION OF THE DRAWINGS

FIG. 41 is a view which shows an alteration result of HTML before and after alteration in the embodiment 13 of the invention.

DESCRIPTION OF THE PREFERRED EMBODIMENTS

Embodiment 1

The embodiments of the invention will be described along with each drawing as bellow.

Figure 1:
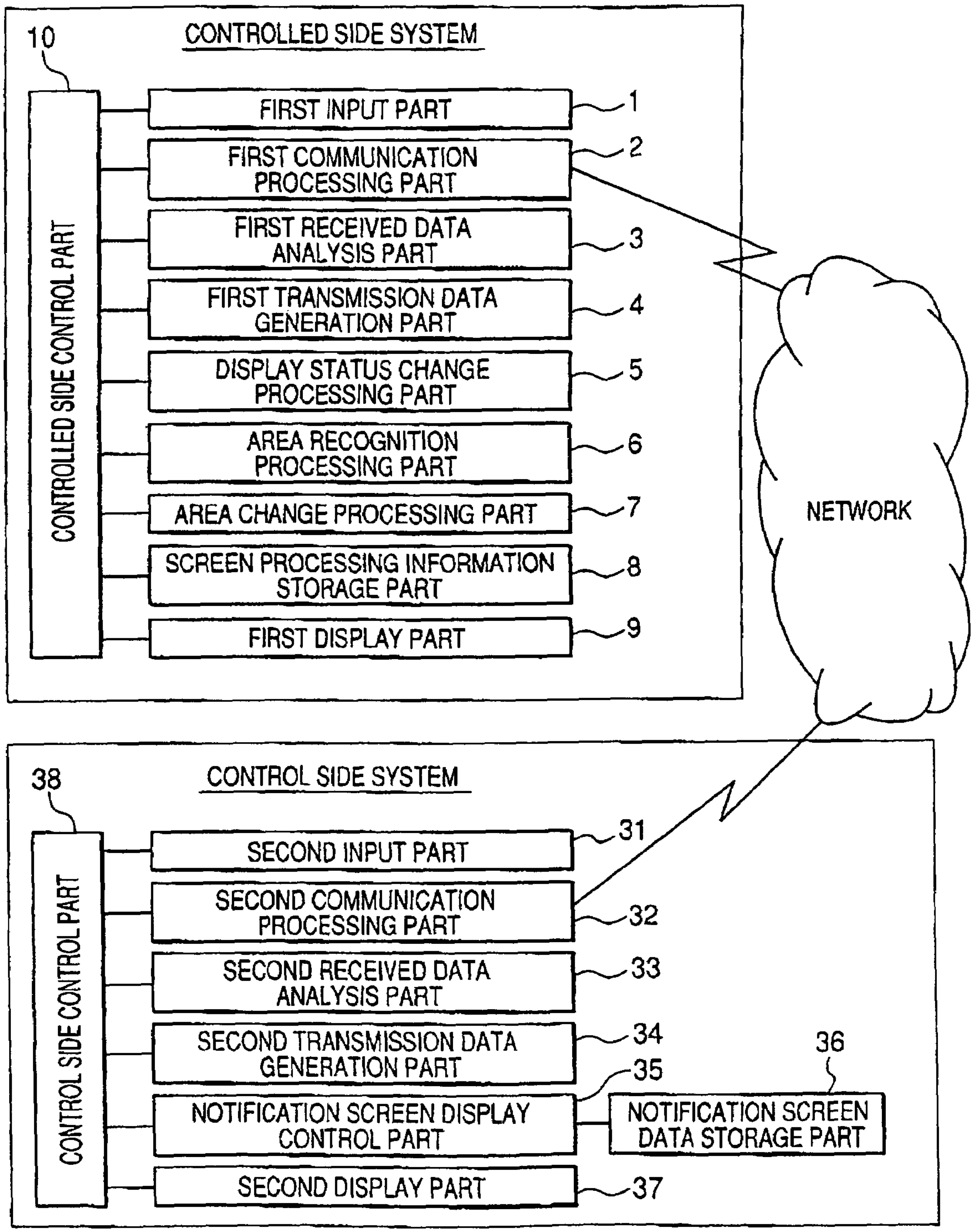
FIG. 1 is a functional block diagram of a remote operation system of an embodiment 1 of the invention.

FIG. 1 is a functional block diagram of a remote operation system in an embodiment 1 of the invention.

In FIG. 1, a controlled side apparatus has a first input part 1 for carrying out an instruction input by a user, a first communication processing part 2 for carrying out transmission and reception of data with a network etc., a received data analysis part 3 for carrying out analysis of received data, a transmission data generation part 4 for preparing transmission data, a display status change processing part 5 for changing data which is displayed by a display part which will be described later, an area recognition processing part 6 for recognizing an area in a window, an area change processing part 7 for carrying out a change of an area size, a screen processing information storage part 8 for storing information regarding a display data operation, a first display part 9 for displaying data, and a controlled side control part 10 for controlling each function of the controlled side apparatus, and an operation between the functions.

Also, a control side apparatus has a second input part 31 for carrying out an instruction input by a user, a second communication processing part 32 for carrying out transmission and reception of data with a network etc., a received data analysis part 33 for carrying out analysis of received data, a transmission data generation part 34 for preparing transmission data, a notification screen display control part 35 for controlling processing regarding display of screen data which is notified from the controlled side apparatus, a notification screen data storage part 36 for storing the screen data which is notified from the controlled side apparatus, a second display part 37 for displaying various data, and a control side control part 38 for controlling each function of the control side apparatus, and an operation between the functions.

Figure 2:
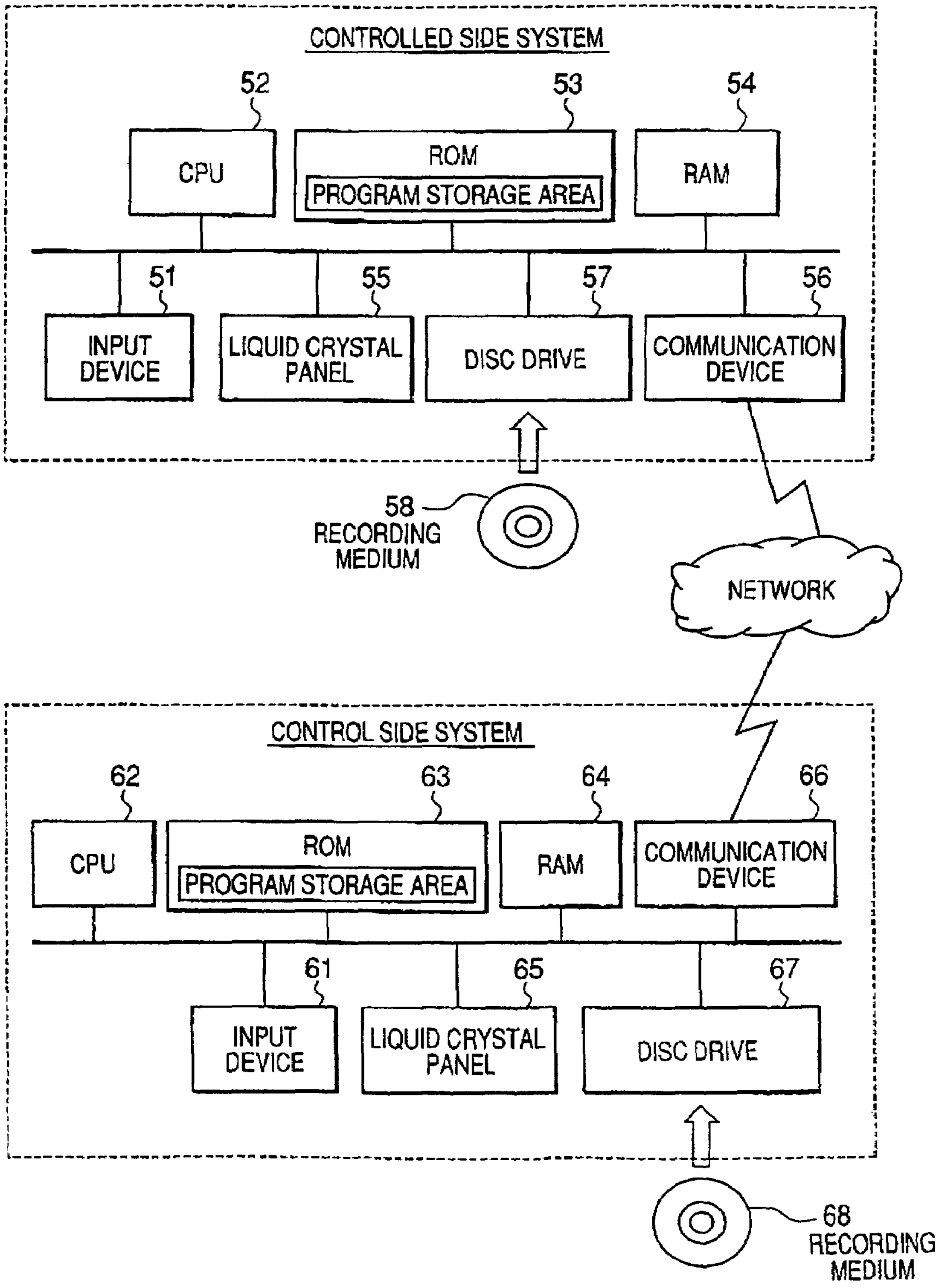
FIG. 2 is a device circuit block diagram of the remote operation system of the embodiment 1 of the invention.

FIG. 2 is a device circuit block diagram of the remote operation system of the embodiment 1 of the invention.

In FIG. 2, the controlled side apparatus has an input device 51, a central processing operation device (CPU) 52, a read only memory (ROM) 53, a random access memory (RAM) 54, a liquid crystal panel 55, a communication device 56, and a disc drive 57 for reading data from a recording medium 58 such as CD-ROM.

The first input part 1, which was shown in FIG. 1, is realized by the input device 51 such as a keyboard, and the screen processing information storage part 8 is realized by RAM 54, and the received data analysis part 3, the transmission data generation part 4, the display status change processing part 5, the area recognition part 6, the area change processing part, the controlled side control part 10 are realized by such a matter that CPU 52 executes a control program which is stored in ROM 53, over carrying out transmission and reception of data with ROM 53 and RAM 54, and the first communication processing part 2 is realized by the communication device 56, and the first display part 9 is realized by the liquid crystal panel 55.

Meanwhile, in this embodiment, shown is such a mode that CPU 52 takes control, by executing the program which was stored in ROM 53, but it is all right even if it is such a made that a control program, which was recorded in a computer readable recording medium 58, is read in from a disc drive 57, and expanded on RAM 54, and thereafter, CPU 52 executes it. By taking the suchlike mode, it is possible to easily realize the invention by use of a general-purpose computer.

Also, the control side apparatus in FIG. 2 has an input device 61 such as a keyboard, a central processing operation device (CPU) 62, a read only memory (ROM) 63, a random access memory (RAM) 64, a liquid crystal panel 65, a communication device 66, a disc drive 67 for reading data from a recording medium 68 such as CD-ROM.

The second input part 31, shown in FIG. 1, is realized by an input device 61, and the notification screen data storage part 36 is realized by RAM 64, and the received data analysis part 33, the transmission data generation part 34, the notification screen display control part 35, and the control side control part 38 are realized by such a matter that CPU 62 executes a control program which is stored in ROM 63, over carrying out transmission and reception of data with ROM 63 and RAM 64, and the second communication processing part 32 is realized by the communication device 66, and the second display part 37 is realized by the liquid crystal panel 65.

Meanwhile, in this embodiment, shown is such a mode that CPU 62 takes control, by executing the program stored in ROM 63, but it is all right even if it is such a made that a control program, which is recorded in a computer readable recording medium 68, is read in from the disc drive 67, and expanded on RAM 64, and thereafter, CPU 62 executes it. By taking the suchlike mode, it is possible to easily realize the invention by use of a general-purpose computer.

As to the remote operation system which is configured as described above, its operation will be hereinafter described as bellow.

In the control side apparatus, when a user carries out an operation by use of the second input part 31, a notification message, which is in response to the operation content, is generated by the transmission data generation part 34, and the generated message is transmitted to the controlled side apparatus by the second communication processing part 32.

In the controlled side apparatus, the notified data is received by the first communication processing part 2 and is analyzed by the received data analysis part 3.

Figure 3:
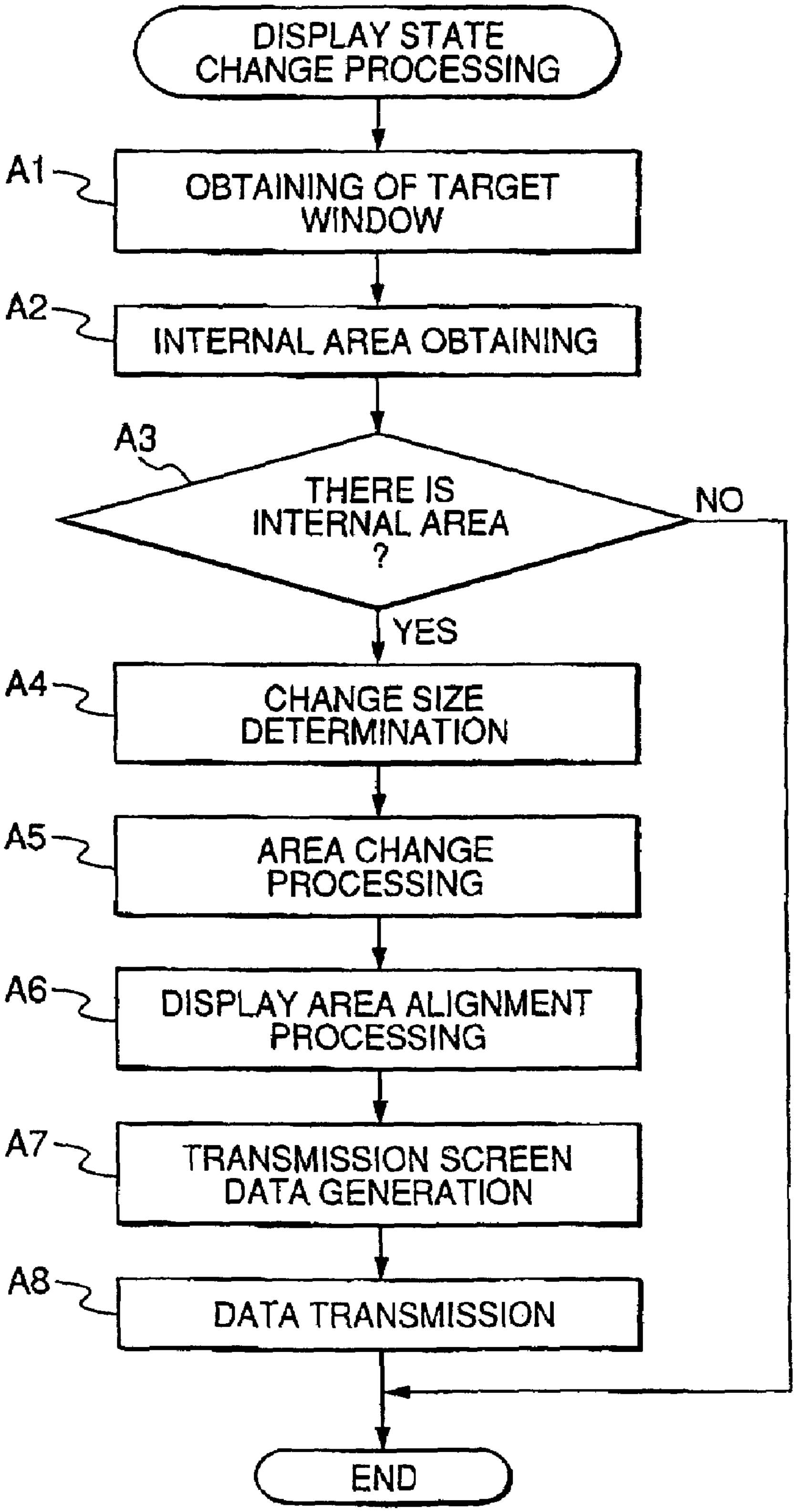
FIG. 3 is a flow chart which shows an operation of display status change processing of the embodiment 1 of the invention.

FIG. 3 is a flow chart which shows an operation of display status change process, which is carried out in the controlled side apparatus, in case that the notification message is of an internal area display change request.

In a step A1, the display status change processing part 51 obtains information regarding a window (a coordinate position and a size on a screen of a window, a coordinate position and a size of a window internal area, attribute information of text characters in the window internal area, image data in the area, etc.) which was opened on a screen of the first display part.

In a step A2, information of the window internal area (a coordinate position and a size of the window internal area, attribute information of text characters in the window internal area, image data in the area, etc.) is obtained by the area recognition processing part 6 from various information which was obtained in the step A1 and is included in the window).

In case that area designation information of a position coordinate etc. has been notified, in the internal area display change request which is notified from the control side apparatus, internal area information is obtained in accordance with the information.

In a step A3, the operation of the process advances to a step A4 in case that the display status change processing part 5 could obtain the internal area information in the step A2, but in case that it could not obtain the internal area information, the display status change processing part 5 does not carry out a display status change, and finishes processing.

In the step A4, a display size that the internal area information, which was obtained in the step A2, occupies on a screen and a display size of the second display part 37 of the control side apparatus are compared each other by the area change processing part 7, and by carrying out calculation, which was based on a current display status (display scale etc.), a size for displaying the internal area information, which was obtained in the step A2, on the entire second display part 37 of the control side apparatus is determined, and in a step A5, the internal area, which was obtained in the step A2, is changed to the size which was determined in the step A4.

In a step A6, the display status change processing part 5 refers to data area (display area) information which is displayed on the second display part of the control side apparatus in display screen data in the first display part of the controlled side apparatus, which was stored in the screen processing information storage part 8, and changes a display area or a target window display position, so as to take consistency of the display area and the internal area position which was obtained in the step A2, and stores changed information in the screen processing information storage part 8.

In a step A7, a screen data notification message, which is notified to the control side apparatus, is generated by the transmission data generation part 4. In case of notifying screen data which is more than a display area, to the control side apparatus, information regarding an internal area position (or display area) is also notified.

In a step A8, the screen data notification message, which was generated in the step A7, is transmitted to the control side apparatus, by the first communication processing part 2.

Meanwhile, in this embodiment, described was the case for displaying identified internal area information on the entire second display part 37, but it may be such a mode that a size of the internal area information is not changed, and only matching processing with a display area position is carried out. In this case, in case that the internal area information could be obtained in the step A3, it advances to the step A6 without carrying out size change processing in the step A4 and the step A5, and display area matching processing is carried out.

Figure 4:
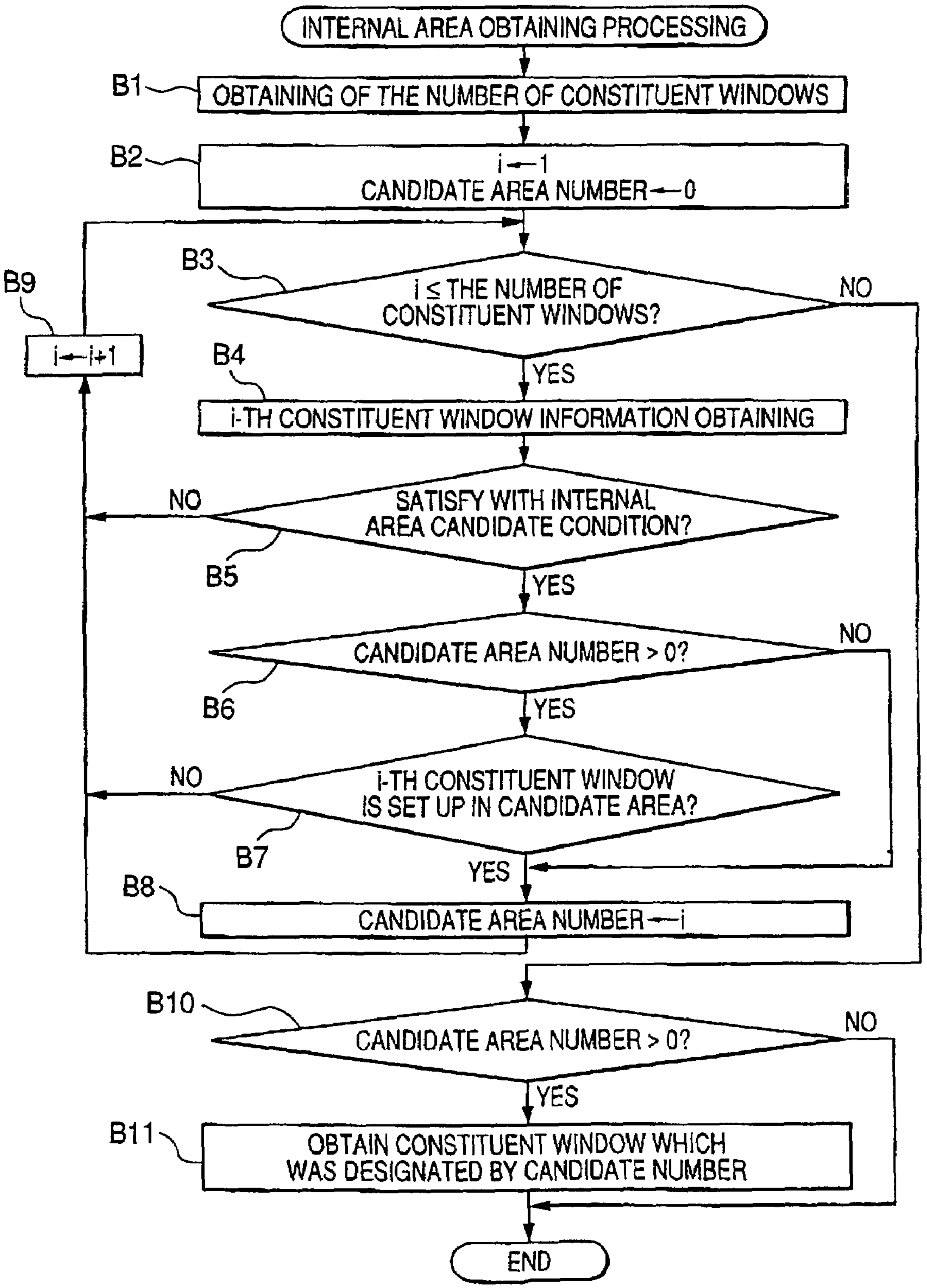
FIG. 4 is a flow chart which shows inside area obtaining processing of the embodiment 1 of the invention.

FIG. 4 is a flow chart which shows an operation of the internal area obtaining processing in the step A2.

The area recognition processing part 6 obtains the number of constituent windows in a step B1. In a step B2, an area number i is initialized to 1, and a candidate area number is initialized to 0.

In the step B3, the operation of the process advances to a step B4, in case that "i" is the constituent window number which was obtained by the area recognition processing part in the step B1, or less.

In a step B5, the area recognition processing part 6 obtains "i"-th constituent window information in the step B4, and checks whether or not the obtained window satisfies an internal area candidate condition (will be described later) in a step B5, and the operation of the process advances to a step B6, in case that it satisfied the condition.

In case that the obtained window does not satisfy the candidate condition, the operation of the process advances to a step B9.

As to the condition of the step B5, a condition is disposed for a type of information in the window, under and subject to such conditions that (1) only an area of text information is targeted, and (2) a window size is checked, and only an area with a predetermined size or more is targeted, it is possible to set up it in the area recognition processing part 6 from an input part. Also, it becomes possible to target all areas, without disposing a condition in particular.

In the step B6, the operation of the process advances to a step B8, in case that the candidate area number is not set up by the area recognition processing part 6 in the step B6, and advances to a step B7, in case that the candidate area number has been already set up.

In the step B7, the area recognition processing part 6 compares a constituent window which is set up in the candidate area number with the "i"-th constituent window, in the step B7, and the operation of the process advances to the step B8, in case that the "i"-th constituent window is more suitable for a candidate area than an area which has been already set up, from information of setup conditions such as a position, a size of each area or the like. In case that the area which has been already setup is more suitable for the candidate area, from information of a position, a size etc. of each area, the operation of the process advances to a step B9. In this embodiment, the area recognition processing part 6 judges from the setup conditions, that a window located at the highest side on the display screen is optimum.

The area recognition processing part 6 sets up "i" in the candidate area number, in the step B8, and the operation of the process advances to the step B9.

The area recognition processing part 6 adds 1 to the area number "i" in the step B9, and returns to the step B3, and carries out similar processing to remaining constituent windows.

In the step B3, the area recognition processing part 6 compares the area number "i" and the number of constituent windows, and the operation of the process advances to a step B10, in case that it exceeded the constituent window number.

In the step B1, the operation of the process advances to a step B11, in case that the candidate area number is set up in the step B8, and the area recognition processing part 6 obtains information of a constituent window with the candidate area number, and finishes processing.

In the step B10, the area recognition processing part 6 finishes processing in the step B10, since a targeted internal area does not exist in case that the candidate area number is not set up in the step B8.

Figure 5:
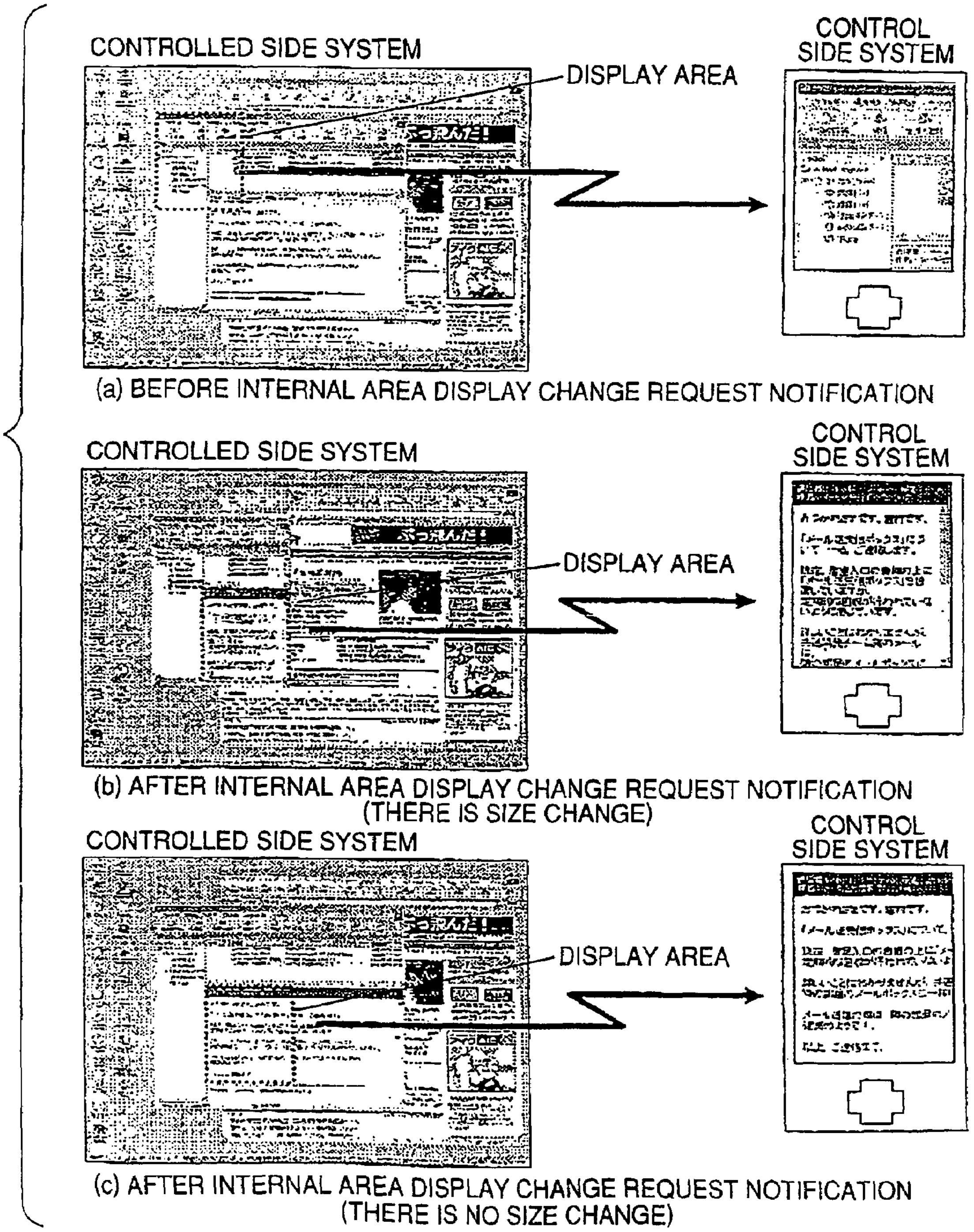
FIG. 5 is a view which shows an example of inside area display change processing of the embodiment of the invention.

FIG. 5 is a view which shows an example of such a case that a internal area display change was carried out by the embodiment 1 of the invention, and (a) is a view of before an internal area display change request notification, and (b) is a view in case that an internal area display change was carried out in accordance with the flow chart of FIG. 3, and (c) is a view in case that size change processing in the step A4 and the step A5 was not carried out in the flow chart of FIG. 3.

In (b), an internal area, in which a main text of a mail was displayed, in accordance with the internal area display change request from the control side apparatus, is displayed in tune with a size of the second display part 37 of the control side apparatus, and therefore, it is possible to read the mail without carrying out a lateral scroll operation.

In (c), a mail main text display area is displayed on the second display part 37 of the control side apparatus, in accordance with the internal area display change request from the controlled side apparatus, and therefore, it is possible to display the mail main text, without carrying out adjustment of a display area by carrying out a troublesome scroll operation in the control side apparatus.

Embodiment 2

Next, an embodiment 2 in the invention will be described.

Meanwhile, a functional block diagram and a device block diagram of this embodiment 2 are similar to FIG. 1 and FIG. 2 of the embodiment 1, respectively. Also, a controlled side apparatus carries out display status change processing in accordance with the flow chart of FIG. 3, in case that a message, which was notified from a control side apparatus, is of an internal area display change request.

Figure 6:
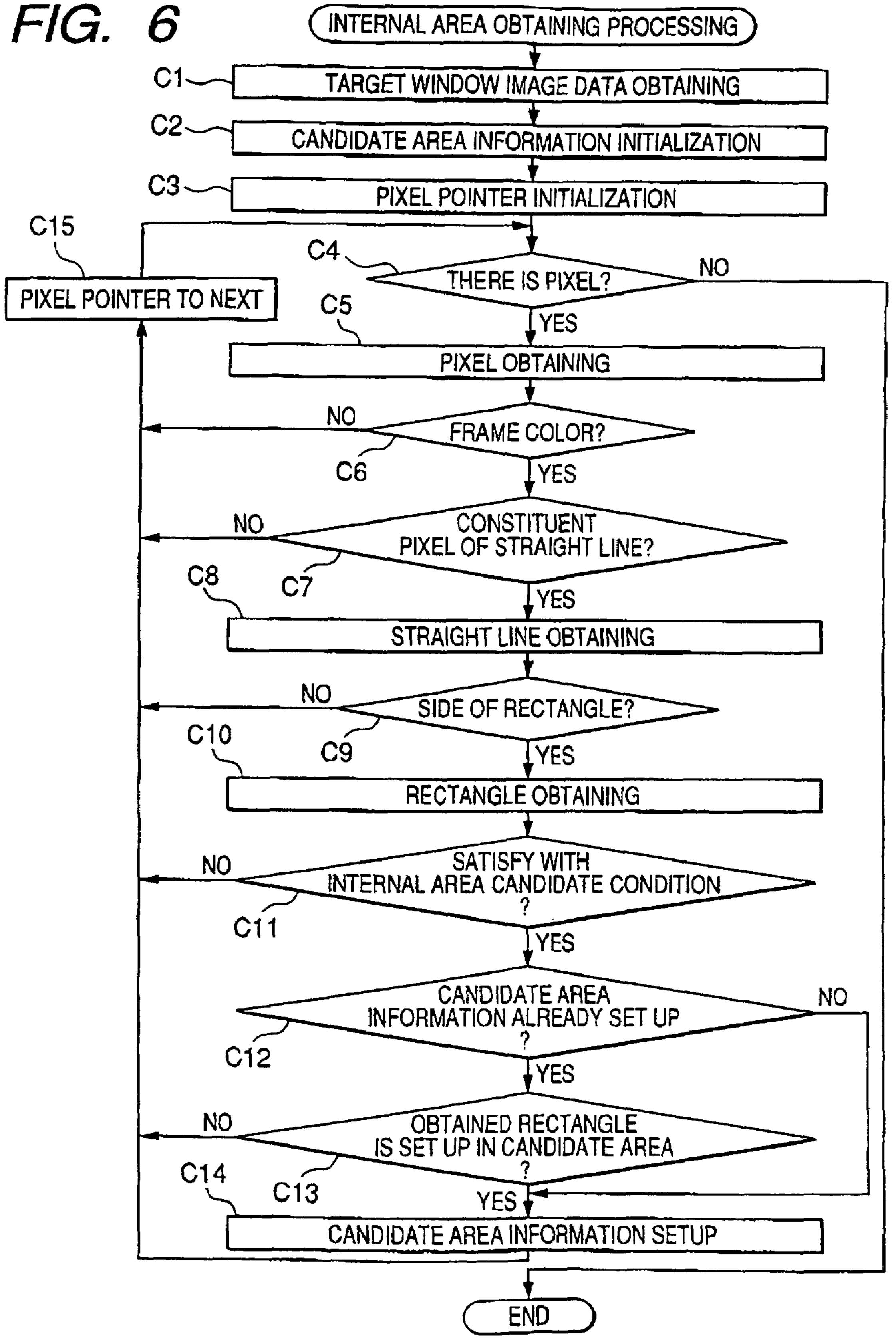
FIG. 6 is a flow chart which shows an operation of inside area obtaining processing of an embodiment 2 of the invention.

FIG. 6 is a flow chart which shows an operation of internal area obtaining processing of a step A2, in the embodiment 2.

The area recognition processing part 6 obtains image data of a target window in a step C1. In a step C2, candidate area information is initialized, and in a step C3, a pixel pointer is initialized.

The area recognition processing part 6 obtains a target pixel in a step C5, in case that there is a target pixel in a step C4.

The area recognition processing part 6, the operation of the process advances to a step C7, in case that it judges in a step C6 that a color of the pixel, which was obtained in the step C5, is the same of a frame line. In case that the color is not the same of the frame line, the operation of the process advances to a step C15.

The area recognition processing part 6, in case that the pixel, which was obtained in the step C5, is a constituent pixel of a straight line in a step C7, obtains the straight line in a step C8. In case that it is not the constituent pixel of the straight line, the operation of the process advances to the step C15.

The area recognition processing part 6, in a case that the straight line, which was obtained in the step C8, is a side of a rectangle in a step C9, obtains the rectangle in a step C10. In case that it is not the side of the rectangle, the operation of the process advances to the step C15.

The area recognition processing part 6 checks, in a step C11, whether or not the rectangle, which was obtained in the step C10, satisfies an internal area candidate condition such as a size and a color, and the operation of the process advances to a step C12, in case that it satisfies the condition. In case that it does not satisfy the candidate condition, the operation of the process advances to the step C15.

Depending on the condition in the step C11, it is possible to dispose such a restriction that only an area with a predetermined size or more is deserved as target by taking a check of a rectangle size into account. Also, it is possible to deserve all areas as target, without disposing a condition in particular.

The operation of the process advances to a step C14, in case that candidate area information is not set up in the step C12 as a result of the judgment by the area recognition processing part 6, and advances to a step C13 in case that the candidate area information has been already set up.

The area recognition processing part 6 compares, in the step C13, the candidate area information which is set up and the rectangle which was obtained in the step C10, and the operation of the process advances to the step C14, in a case that the rectangle, which was obtained in the step C10, is more suitable for a candidate area than an area which has been already set up. In a case that the area which has been already set up is more suitable for the candidate area, the operation of the process advances to the step C15.

The area recognition processing part 6 sets up, in the step C14, the rectangle which is obtained in the step C10, as the candidate area information, and the operation of the process advances to the step C15.

The area recognition processing part 6 brings forward the pixel pointer to next, in the step C15, returning to the step C4, the processing part 6 carries out similar processing to the remaining pixels.

The area recognition processing part 6 finishes processing, in case that there is no target pixel in the step C4.

Embodiment 3

Next, an embodiment 3 of the invention will be described. Meanwhile, a functional block diagram and a device block diagram of this embodiment 3 are similar to FIG. 1 and FIG. 2 of the embodiment 1, respectively. Also, a controlled side apparatus carries out display status change processing in accordance with the flow chart of FIG. 3, in case that a message, which was notified from a control side apparatus, is of an internal area display change request.

Figure 7:
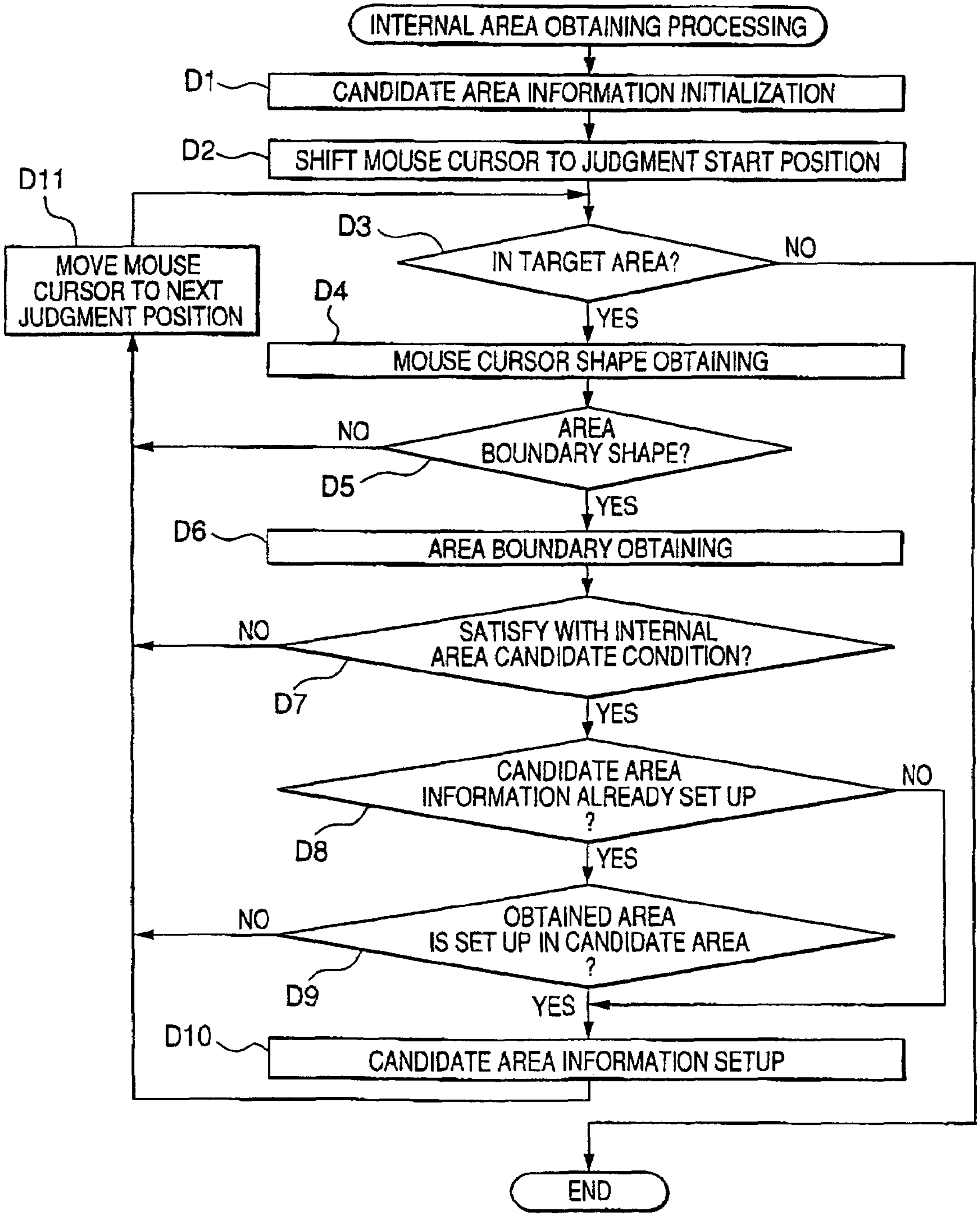
FIG. 7 is a flow chart which shows an operation of inside area obtaining processing of an embodiment 3 of the invention.

FIG. 7 is a flow chart which shows an operation of internal area obtaining processing of a step A2, in the embodiment 3.

The area recognition processing part 6 initializes candidate area information in a step D1, and moves a mouse cursor to a mouse cursor shape judgment starting position in a target window, in a step D2.

In a step D4, the area recognition processing part 6 obtains a mouse cursor shape, in a step D4, in case that a mouse cursor exists in a target area in a step D3.

The operation of the process advances to a step D6, in case that the mouse cursor shape obtained in the step D4, is a shape showing an area boundary (e.g., in case of "leftward and rightward arrow" and "upward and downward arrow" etc.) as the result of the judgment by the area recognition processing part 6. In case that it is not the shape showing the area boundary, the operation advances to a step D11.

In a step D6, the area recognition processing part 6 makes the mouse cursor move in parallel, to investigate a shape, on the basis of the mouse shape which was obtained in the step D4, and obtains the area boundary.

In a step D7, the area recognition processing part 6 checks, in a step D7, whether or not the area, which was obtained in the step d6, satisfies the internal area candidate condition, and the operation of the process advances to a step D8 in case that it satisfies the condition. In case that it does not satisfy the candidate condition, the operation of the process advances to the step D11.

Depending on the condition in the step D7, it is possible to dispose such a restriction that only an area with a predetermined size or more is deserved as target, by conditions such as a width, a height or the like. Also, it is possible to target all areas, without disposing a condition, in particular.

In the step D8, the operation of the process advances to a step D10, in case that candidate area information is not set up in the step D8 as a result of the judgment by the area recognition processing part 6, and the operation advances to a step D9 in case that the candidate area information has been already set up.

The are recognition processing part 6 compares, in the step D9, candidate area information which is set up and the area which was obtained in the step D6, and the operation of the process advances to the step D10 in case that the area, which was obtained in the step D6, is more suitable for the candidate area than the area which has been already set up. In case that the area which has been already set up is more suitable for the candidate area, the operation advances to a step D11.

In the step D10, the area recognition processing part 6 sets up, in the step D10, the area obtained in the step D6, in the candidate area information, and the operation of the process advances to the step D11.

The area recognition processing part 6 moves a mouse cursor to a next judgment position in the step D11, Then the processing part 6 carries out similar processing to remaining areas.

In the step D3, the area recognition processing part 6 finishes processing, in case that the mouse cursor is outside an target area.

Embodiment 4

Next, an embodiment 4 of the invention will be described as bellow.

Figure 8:
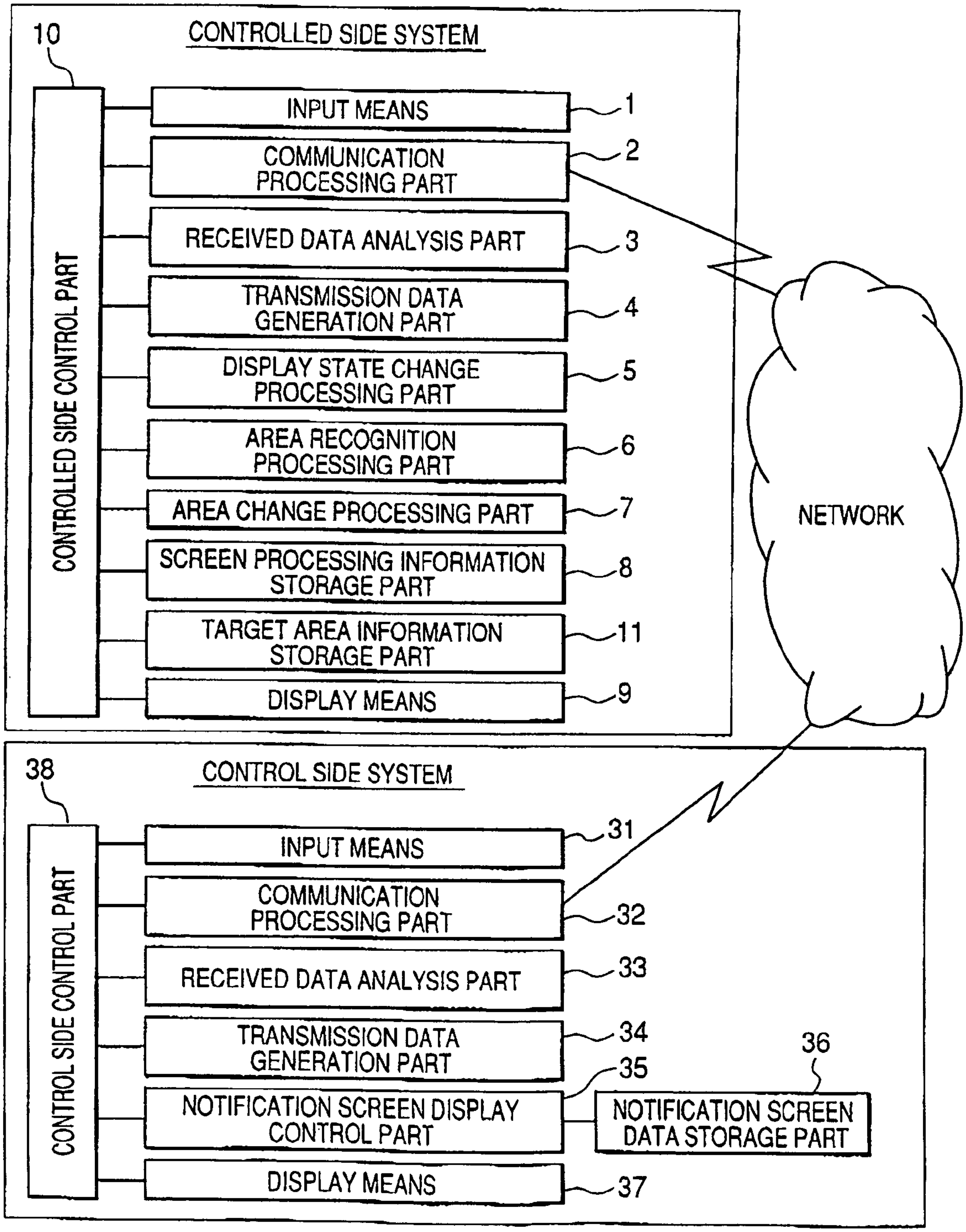
FIG. 8 is a functional block diagram of a remote operation system of an embodiment 4 of the invention.

FIG. 8 is a functional block diagram of a remote operation system of the embodiment 4 of the invention. FIG. 8 is the block diagram which a constituent element was added to the controlled side apparatus in the functional block diagram of FIG. 1, and 11 designates a target area information storage part for storing internal area information to be targeted.

A device block diagram of the embodiment 4 is similar to the device block diagram of FIG. 2, and the target area information storage part 11, which was added in FIG. 8, is realized by RAM 54 of the controlled side apparatus.

As to a remote operation system, which was configured as described above, its operation will be hereinafter described.

In the control side apparatus, when a user carries out an operation by use of the second input part 31, a notification message, which is in response to the operation content, is generated by the transmission data generation part 34, and the generated message is transmitted to the controlled side apparatus by the second communication processing part 32.

In the controlled side apparatus, the notified data is received by the first communication processing part 2, and analyzed by the received data analysis part 3.

Figure 9:
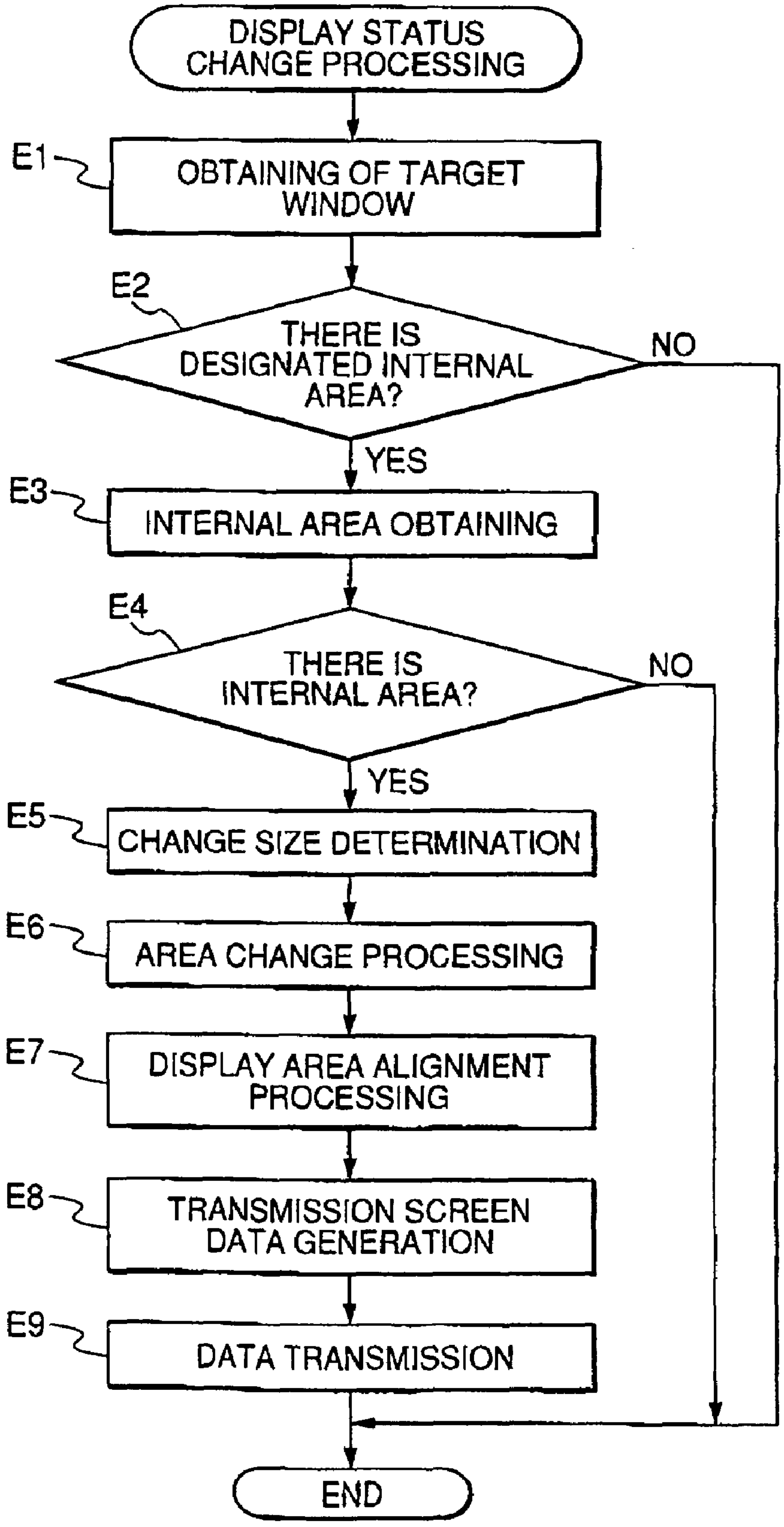
FIG. 9 is a flow chart which shows an operation of display status change processing of the embodiment 4 of the invention.

FIG. 9 is a flow chart which shows an operation of display status change processing, which is carried out in the controlled side apparatus, in case that the notification message is of an internal area display change request.

In a step E1, the display status change processing part 5 obtains a window to be targeted and its information.

In a step E2, the display status change processing part 5 refers to information in the target area information storage part 11, and the operation of the processing advances to a step D3 in case that there is constituent area information of the window which was obtained in the step E1, in the target area information storage part 11. In case that there is no information regarding the window in the target area information storage part 11, the processing is finished since an internal area to be targeted does not exist in the obtained window.

The processing from the step E3 to a step E9 are similar to the processing from the step A2 to the step A8 in the flow chart of FIG. 3 in the embodiment 1.

An operation of internal area obtaining processing in the step E3 is similar to that of any one of the flow charts of FIG. 4, FIG. 6, FIG. 7 which show an operation of the internal area obtaining processing of the step A2.

In this embodiment, in the check of whether or not an obtained area satisfies the internal area candidate condition, which is carried out in the step B5 of FIG. 4, the step C11 of FIG. 6, and the step D7 of FIG. 7, the area recognition processing part 6 refers to information in the target area information storage part 11, and judges whether or not an obtained area is the target area.

Meanwhile, each of embodiments was described in separately, but a combined embodiment, a mode of using a plurality of embodiments in combination at the same time is possible.

Embodiment 5

The embodiments of the invention will be described along with the drawings as follow.

Figure 10:
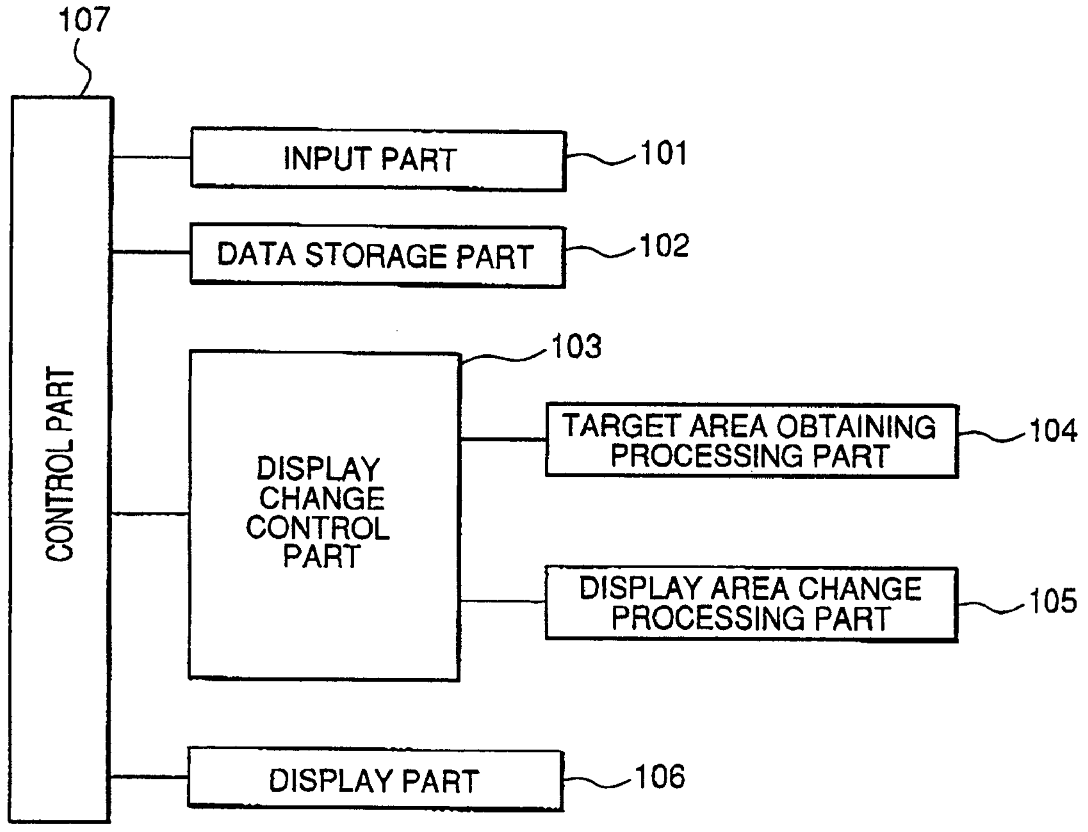
FIG. 10 is a functional block diagram of a document inspection apparatus of an embodiment 5 of the invention.

FIG. 10 is a functional block diagram of a document inspection apparatus of an embodiment 5 of the invention.

In FIG. 10, the document inspection apparatus of this embodiment 5 has an input part 101 for carrying out an instruction input by a user, a data storage part 102 for storing document data, a display change control part 103 for controlling a change of a display status of a document, a target area obtaining processing part 104 for obtaining a display target area in the document, and a display area change processing part 105 for carrying out a change of a display area which is displayed on a display part 106 which will be described later. The apparatus has a display part 106 for displaying the document, and a control part 107 for controlling each function of the document inspection apparatus, and an operation between the functions.

Figure 11:
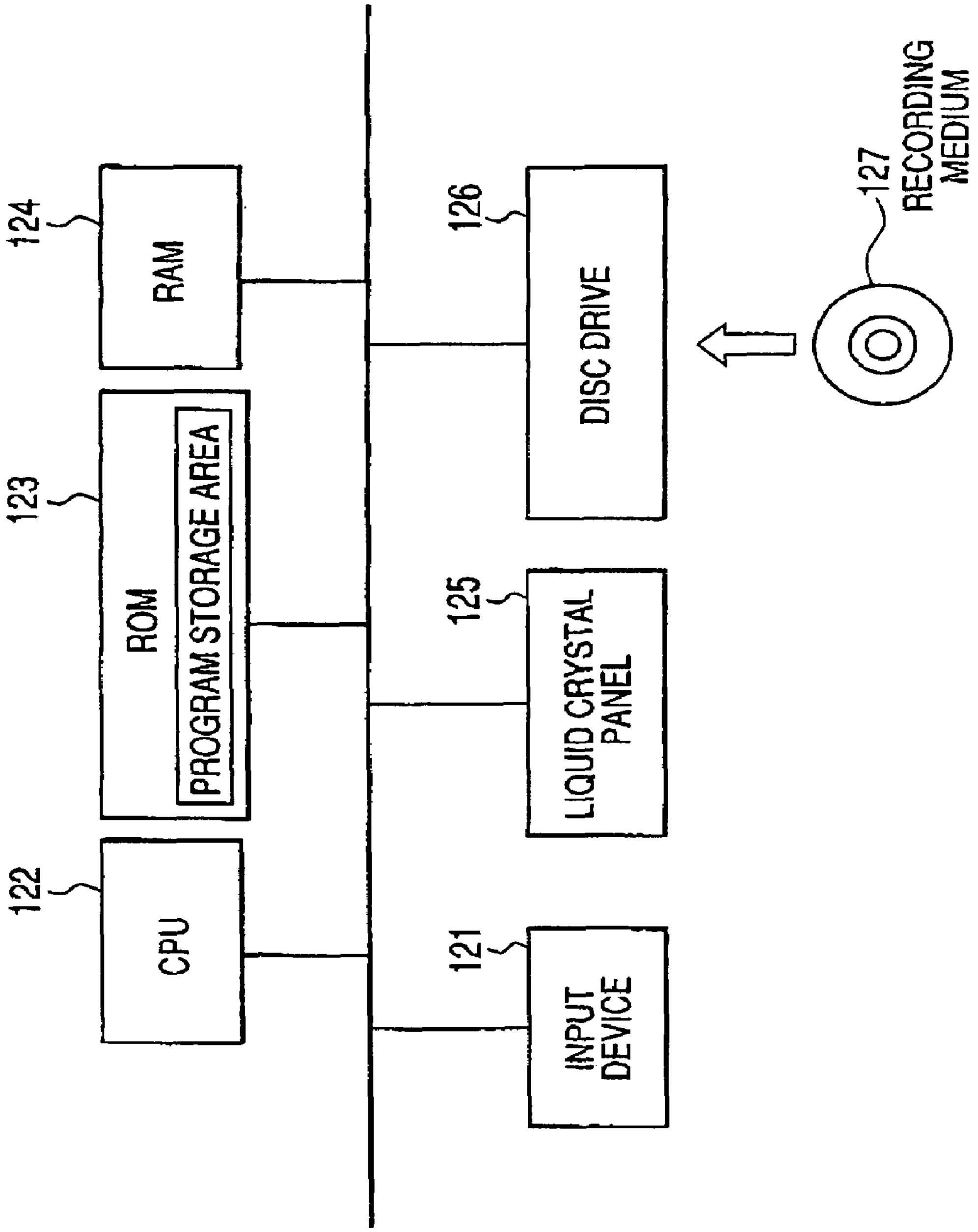
FIG. 11 is a device block diagram of the document inspection apparatus of the embodiment 5 of the invention.

FIG. 11 is a device block diagram of the document inspection apparatus of the embodiment 5 of the invention.

In FIG. 11, the document inspection apparatus of the embodiment 5 has an input device 121 such as a keyboard, a central processing operation device (CPU) 124, a read only memory (ROM) 123, a random access memory (RAM) 124, a liquid crystal panel 125, and a disc drive 126 for reading data from a recording medium 127 such as CD-ROM.

The input part 101 shown in FIG. 10 is realized by the input device 121, and the data storage part 102 is realized by RAM 124, and the display change control part 103, the target area obtaining processing part 104, the display area change processing part 105 and the control part 107 are realized by such a matter that CPU 122 executes a control program which is stored in ROM 123 over carrying out transmission and reception of data with ROM 123 and RAM 124, and also, the display part 106 is realized by the liquid crystal panel 125 etc., respectively.

Meanwhile, in the embodiment 5, shown is such a mode that CPU 122 takes control, by executing the program which was stored in ROM 123, but it is all right even if it is such a made that a control program, which was recorded in a computer readable recording medium 127, is read in from a disc drive 126, and expanded on RAM 124, and thereafter, CPU 122 executes it. By taking the suchlike mode, it is possible to easily realize the invention by use of a general-purpose computer.

As to the document inspection apparatus which was configured as described above, its operation will be hereinafter described.

Figure 12:
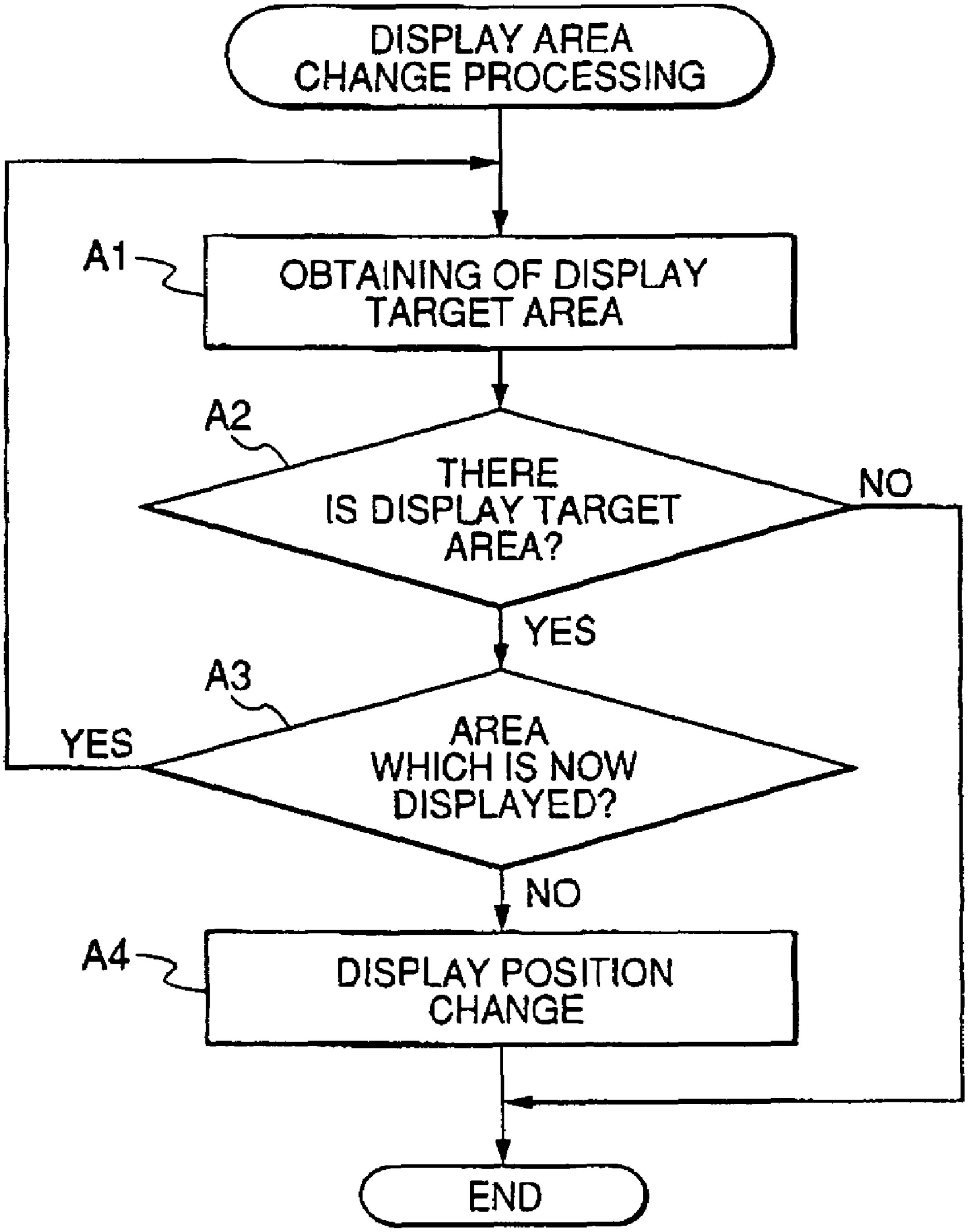
FIG. 12 is a flow chart which shows an operation of display area change processing of the embodiment 5 of the invention.

FIG. 12 is a flow chart which shows display area change processing, in case that a change of a display area was instructed by the input part 101.

In a step A1, the target area obtaining processing part 104 obtains a display target area in a document which is now displayed on the display part 106.

In a step A2, the operation of the processing of the advances to a step A3 in case that the display change control part 103 could obtain the display target area in the step A1, and finishes in case that it could not obtain the display target area.

In a step A3, the display change control part 103 judges whether or not the area obtained in the step A1 is now displayed on the display part 6, and the operation advances to a step A4 in case that it is not displayed now. In case that it is now displayed, it returns to the step A1, and obtains a next display target to the obtained area by the target area obtaining processing part 104.

In the step A4, the display area change processing part 105 carries out a change of a display document position (position change of the area which was obtained in the step A1, or change of a position of a document which is displayed on the display part 106), so as for the area which was obtained in the step A1 to be displayed on the display part 106, and finishes processing.

Figure 13:
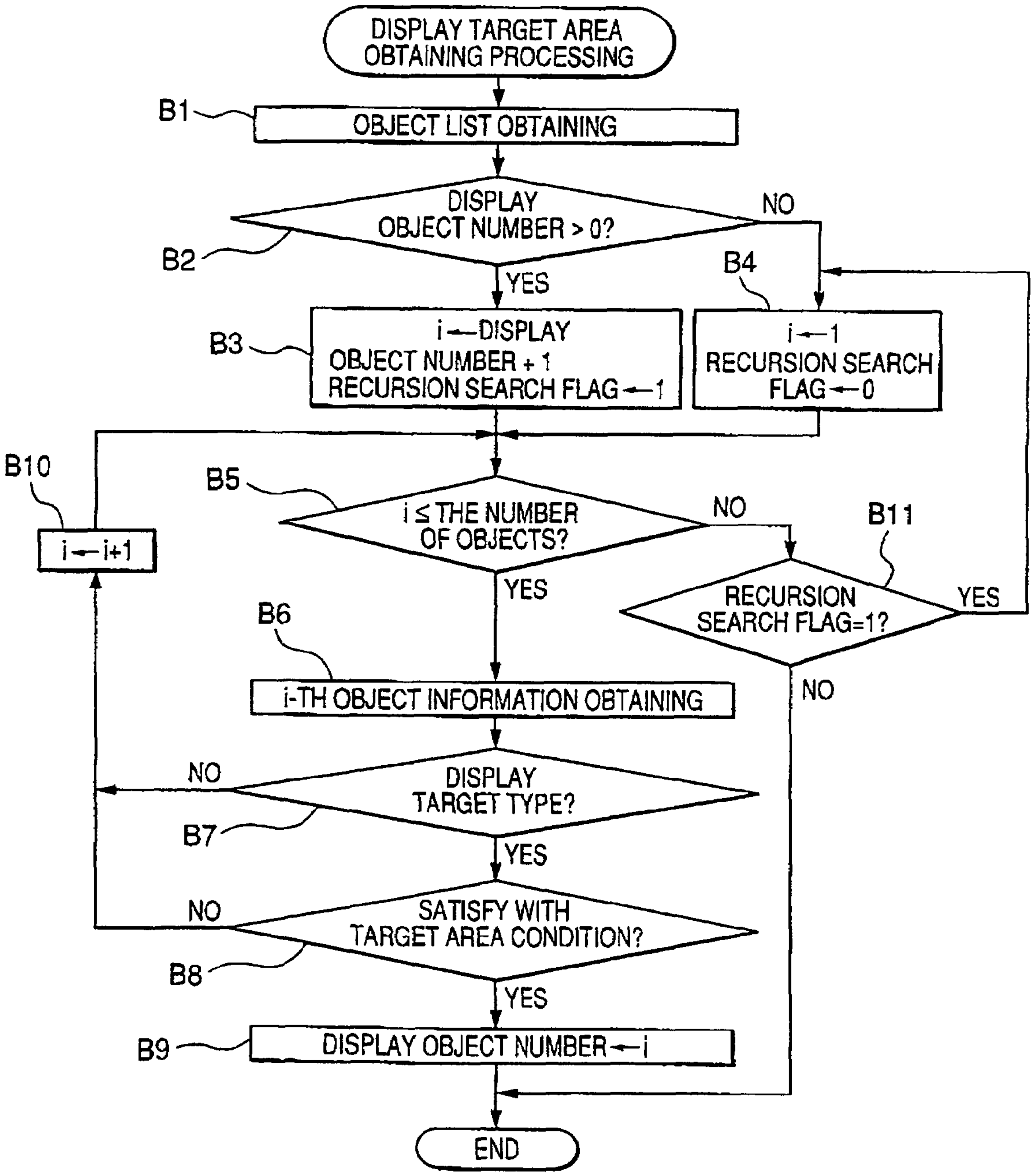
FIG. 13 is a flow chart which shows an operation of display target area obtaining processing of the embodiment of the invention.

FIG. 13 is a flow chart which shows an operation of display target area obtaining processing which is carried out in the step A1.

In a step B1, the target area obtaining processing part 104 refers to document structure information of the document which is now displayed on the display part 106, and obtains an object list.

The operation of the processing advances to a step B3, in case that a display object number is set up in a step B2, and the target area obtaining processing part 104 sets up the display object number+1 in a processing number i, and sets up 1 in a recursion search flag.

The operation of the processing advances to a step B4, in case that the display object number is not set up in the step B2, and the target area obtaining processing part 104 sets up 1 in the processing number i, and sets up 0 in the recursion search flag.

The processing of the process advances to a step B6, in case that the processing number i is the number of objects or less in the object list which was obtained in the step B1, in a step B5, and The target area obtaining processing part 104 obtains i-th object information.

The operation of the processing advances to a step B8 in case that an object type of the object information which was obtained in the step B6 is an object type which is targeted for display as the result of the judgment by the target area obtaining processing part 104, in a step B7, and also, advances to a step B10, in case that it is not so. By limiting the object type which is targeted for display, as an object judgment condition of the step B7, it is possible to make a selection so as to make an area such as only a text area, only an image area, and the text area and the image area, a display target area.

In the step B8, the operation of the processing advances to a step B9 in case that the object obtained in the step B6, satisfies a display target area condition, in the step B8, and the target area obtaining processing part 104 sets up i in the display object number, and the operation finishes processing. Depending on a condition in the step B8, an area size is checked and, it is possible to dispose such a restriction that only an area with a predetermined size or more is targeted. Also, it is possible to target all areas, without disposing a condition in particular. In case that the target area condition is not satisfied in the step B8, the operation of the processing advances to the step B10.

The target area obtaining processing part 104 adds 1 to the processing number i in the step B10, and returns to the step B5 to continue processing.

The operation of the processing advances to a step B11, in case that the processing number i is larger than the number of objects in the object list which was obtained in the step B1 as a result of the judgment of the target area obtaining processing part 104.

The operation of the processing advances to the step B4 in case that the recursion search flag is 1 in the step B11 as the result of the judgment by the target area obtaining processing part 104, and returns again to a head of the beginning of the object list to continue processing. In case that the recursion search flag is 0 in the step B11, it finishes processing.

Figure 14:
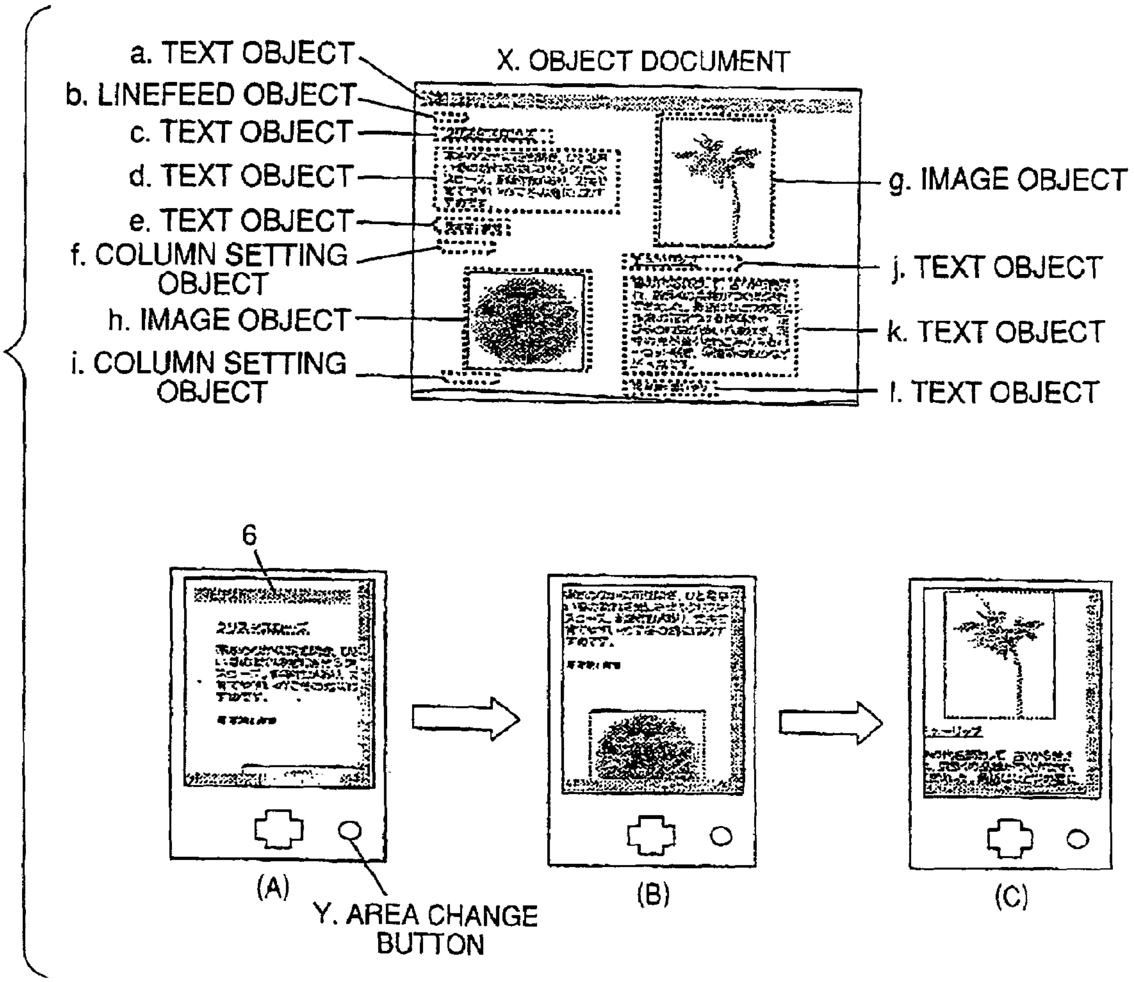
FIG. 14 is a view which shows a display example in case of carrying out the display area change processing by the embodiment 5 of the invention.

FIG. 14 is a view which shows a display example in case of carrying out display area change processing by the embodiment 5 of the invention. In the document inspection apparatus in FIG. 14(A), when a user pushes down an area change button 111 of the input part 101, a change of a display area is carried out in accordance with the flow charts of FIG. 12, FIG. 13.

a~i represent objects in a target document 10 as shown in FIG. 14(D), and in case of targeting a text object and an image object as the display target area, a text object a is obtained in the step A1.

Since the text object a is now displayed on the display part 106 of FIG. 14(A), the operation returns to the step A1, in the step A3, and since the linefeed object b is not in conformity with a target object type condition in the step B7, the text object c is obtained as a next display object area.

Since the object c is also displayed on the display part 6 of FIG. 14(A) now, it returns to the step A1, in the step A3, and the text object d is obtained as a next display object area.

As for the text object d, only a portion thereof is displayed on the display part 106 of FIG. 14(A), and therefore, in the step A4, a change of a display document position is carried out, so as for the text object d to be displayed on the display part 106 by the display area change processing part 5.

The display of the embodiment of document inspection apparatus after execution of display area change processing is shown in FIG. 14(B).

In the document inspection apparatus in FIG. 14(B), when a user pushes down an area change button Y of the input part 101, since the text object e is now displayed on the display part 106, and the column setting object f is not in conformity with the target object condition, in accordance with the flow charts of FIG. 12, FIG. 13, a change of a display document position is carried out, so as for the image object g to be displayed on the display part 106.

The display of the embodiment of the document inspection apparatus after execution of display area change processing execution is shown in FIG. 14(C).

Embodiment 6

Next, an embodiment 6 of the invention will be described as bellow. Meanwhile, a functional block diagram and a device block diagram of a document inspection apparatus of the embodiment 6 are similar to FIG. 10 and FIG. 11 in the embodiment 5, and in case that a change of a display area was instructed by the input part 101, display area change processing is carried out in accordance with the flow chart of FIG. 12.

Figure 15:
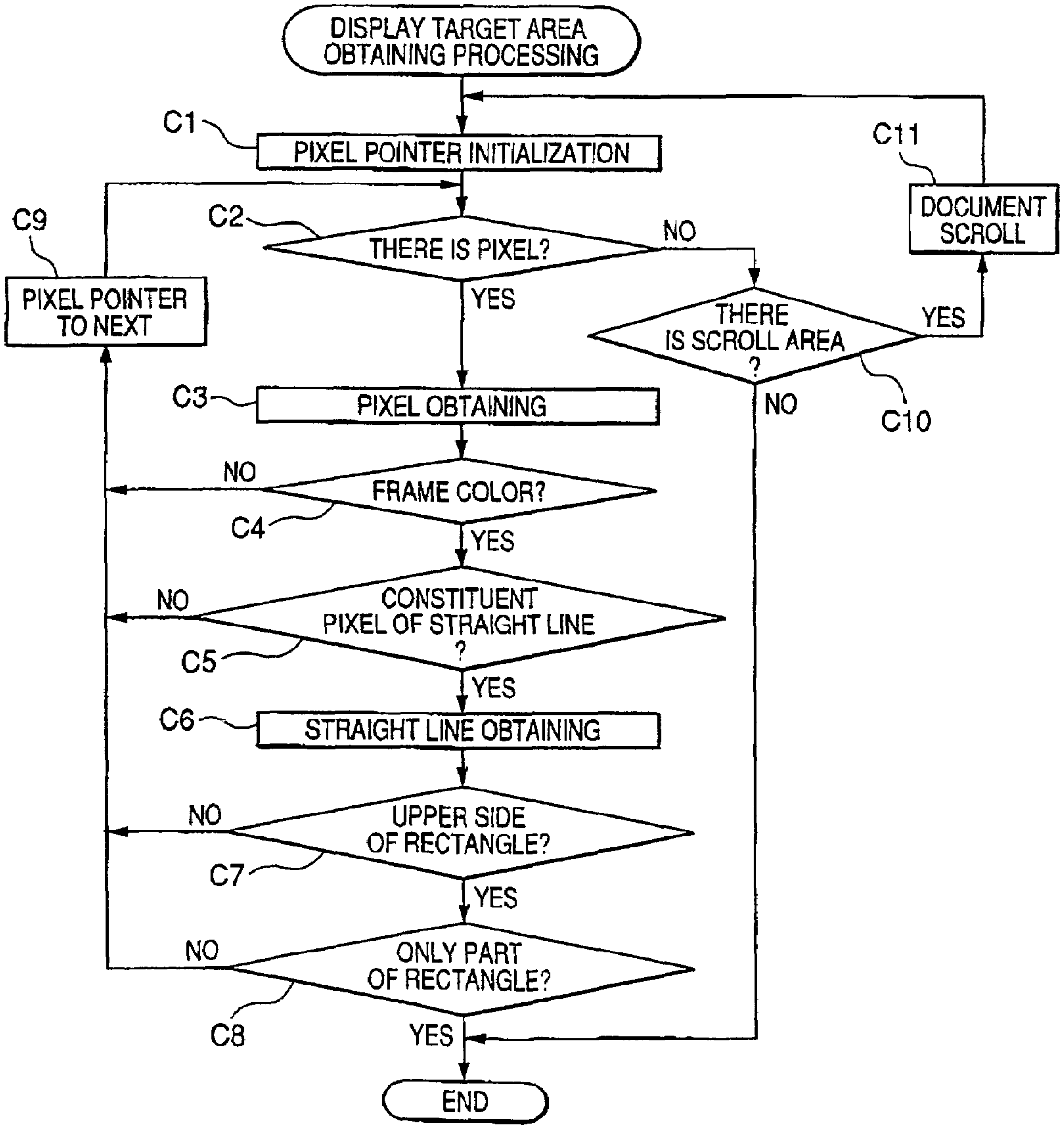
FIG. 15 is a flow chart which shows an operation of display target area obtaining processing of an embodiment 6 of the invention.

FIG. 15 is a flow chart which shows an operation of display target area obtaining processing of a step A1, in the embodiment 6 of the invention.

In a step C1, the target area obtaining processing part 104 initializes a pixel pointer.

The target area obtaining processing part 104 obtains a object pixel in a step C3, in case that there is a target pixel in a step C2.

The operation of the processing advances to a step C5, in case that the target area obtaining processing part 104 judges that a color of the pixel, which was obtained in the step C3 is a color of a frame line which shows a target area, in a step C4. In case that it is not the color of the frame line, it advances to a step C9.

In case that the pixel obtained in the step C3 is a constituent pixel of a straight line as the result of the judgment by the target area obtaining processing part 104, the processing part 104 obtains the straight line in a step C6. In case that it is not the constituent pixel of the straight line, the processing advances to the step C9.

The target area obtaining processing part 104 investigates, in a step C7, a straight line which extends perpendicularly from left and light of the straight line which was obtained in the step C6, and in case that the straight line, which was obtained in the step C6, is a upper side of a rectangle, the operation of the processing advances to a step C8. In case that it is not the upper side of the rectangle, the operation of the processing advances to the step C9.

The operation of the processing advances to the step C9, since the rectangle is now displayed on the display part 6, in case that the target area obtaining processing part 104 can confirm all of four sides of the rectangle. In case that the area, which was recognized in the step C8, is a part of the rectangle, the target area obtaining processing part 104 sets up the rectangle as the display target area, and the operation finishes the processing.

In the step C9, the target area obtaining processing part 104 brings forward the pixel pointer to next, in the step C9, and returns to the step C2, and the processing part 104 carries out similar processing to remaining pixels.

The operation of the processing advances to a step C10, in case that the target area obtaining processing part 104 judges there is no target pixel in the step C2.

The target area obtaining processing part 104 confirms presence or absence of a scroll target area of a document which is not displayed on the display part 106 by the display change control part 103, and the operation of the processing advances to a step C11 in case that there is the scroll target area.

The target area obtaining processing part 104 carries out scroll processing of the document which is not displayed on the display part 106, by the display area change processing part 105, in the step C11. Returning to the step C1, and the processing portion 104 carries out display target area obtaining processing, targeting the area which is not displayed.

The operation finishes processing, in case the target area obtaining processing part 104 judges that there is no scroll target area in the step C10.

Embodiment 7

Next, an embodiment 7 of the invention will be described as follow.

Figure 16:
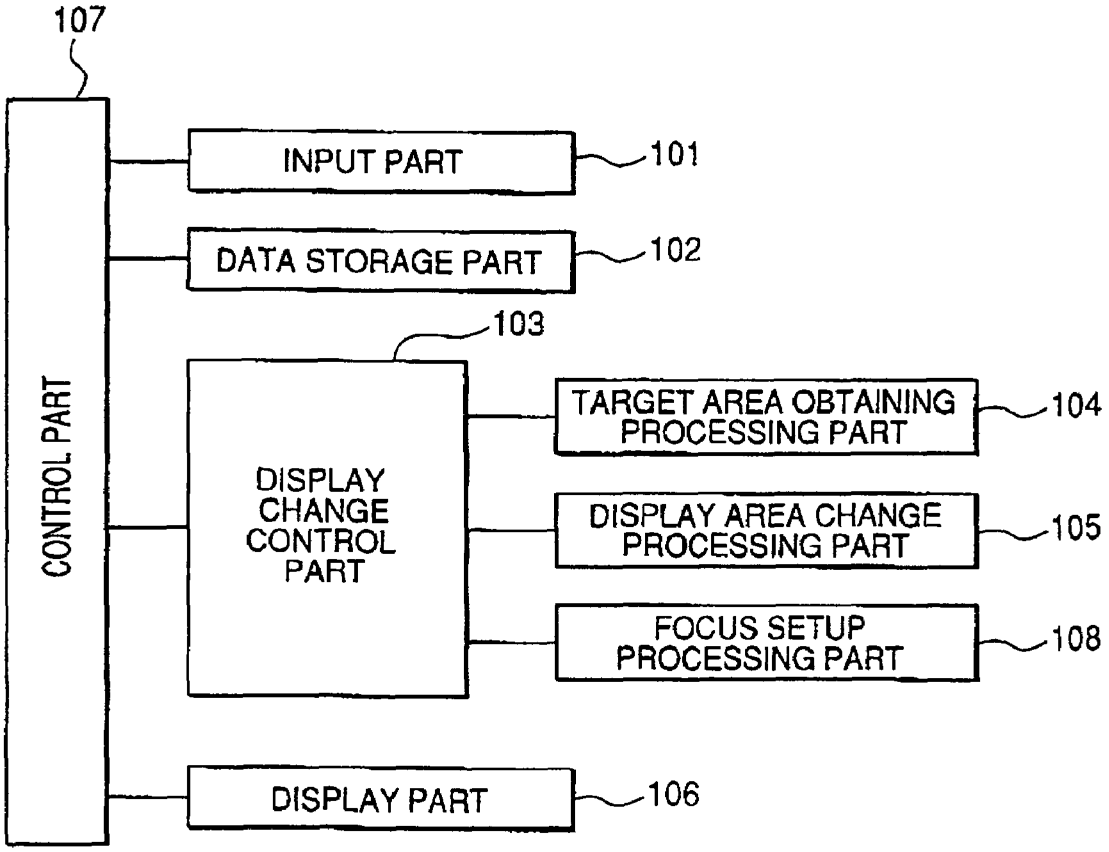
FIG. 16 is a functional block diagram of a document inspection apparatus of an embodiment 7 of the invention.

FIG. 16 is a functional block diagram of a document inspection apparatus of the embodiment 7 of the invention. FIG. 16 is the diagram that a constituent element was added to the controlled side apparatus in the functional block diagram of FIG. 1, and 108 designates a focus setup processing part for obtaining a focus setup element in a display target area and for carrying out setup of focus.

A device block diagram of the document inspection apparatus of the embodiment 7 is similar to the device block diagram of FIG. 11, and the focus setup processing part 108, which was added in FIG. 16, is realized by such a matter that CPU 122 executes a program which is stored in ROM 123 over carrying out exchange of data with ROM 123 and RAM 124.

As to the document inspection apparatus, which was configured as described above, its operation will be described as follows.

Figure 17:
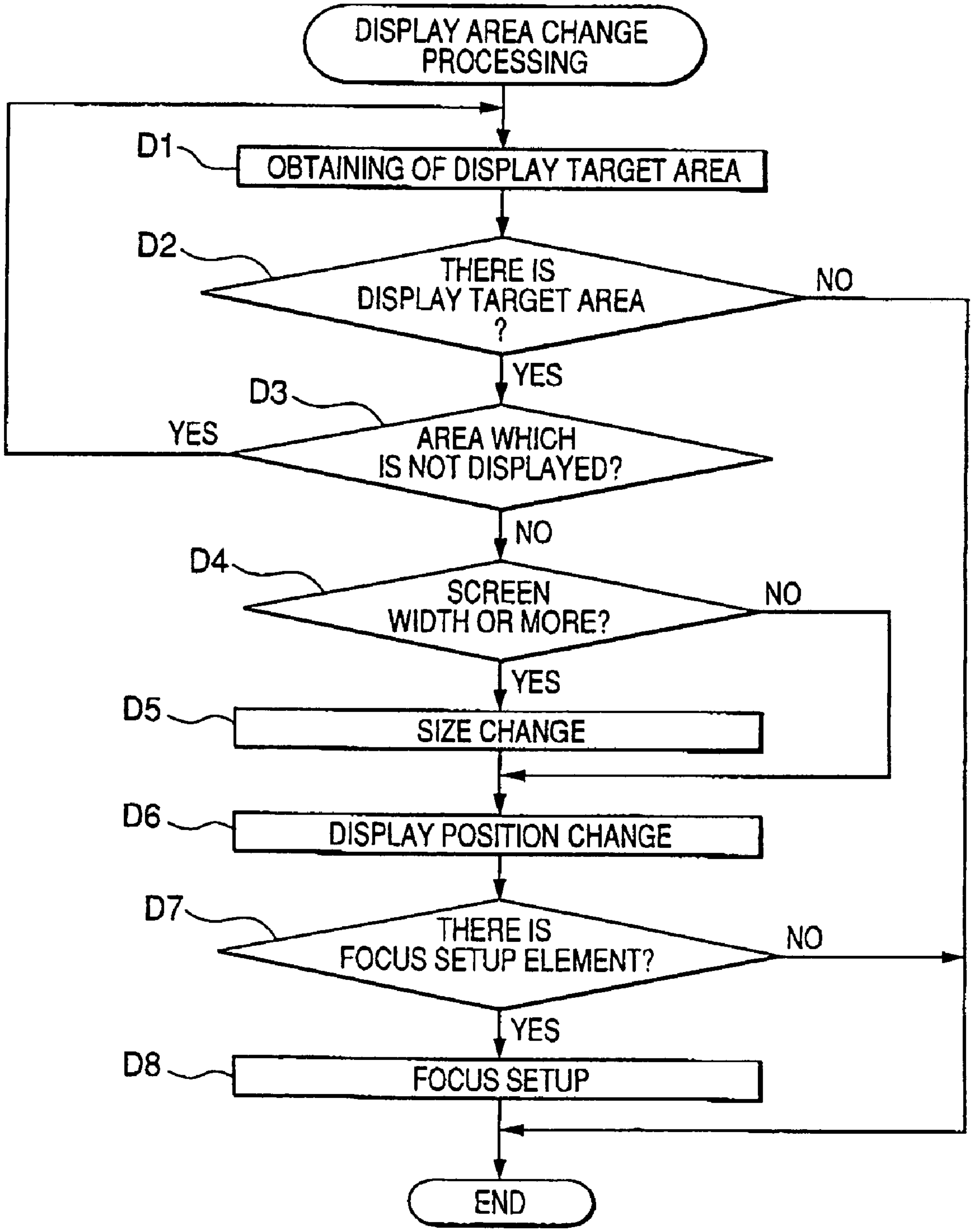
FIG. 17 is a flow chart which shows an operation of display area change processing of the embodiment 7 of the invention.

FIG. 17 is a flow chart which shows an operation of display area change processing, in case that a change of a display area was instructed by the input part 101.

In a step D1, the target area obtaining processing part 104 obtains a display target area in a document which is displayed on the display part 106.

In a step D2, the operating of the processing advances to a step D3 in case that the display change control part 103 could obtain a display target area in the step D1, and finishes processing in case that it could not obtain the display target area.

In the step D3, the display change control part 3 judges whether or not the area, which was obtained in the step D1, is now displayed on the display part 10, and the operating of the processing advances to a step D4 in case that the control part 103 judges it is not displayed now. In case that the control part 103 judges it is now displayed, the operation returns to the step D1, and a next display target area is obtained by the target area obtaining processing part 104.

In the step D4, the operation advances to a step D5, in case that display change control part 103 judges a width of the area obtained in the step D1 is larger than a width of the display part 106, and changes, in the step D5, the width of the area obtained in the step D1 to the width of the display part 106 by the display area change processing part 105. In the step D4, in case that the control part judges the width of the area which was obtained in the step D1 is the width of the display part 106 or less, the operation advances to a step D6, without carrying out size change processing of the step D5.

In the step D6, the display area change processing part 105 carries out a change of a display document position, so as for the area which was obtained in the step D1 to be displayed on the display part 106.

In a step D7, the focus setup processing part 108 carries out acquisition of a focus setup element in the area which was obtained in the step D1, and advances to a step D8, in case that there is the focus setup element.

In the step D8, the focus setup processing part 108 sets up focus on the focus setup element which was obtained in the step D7, and the operation of the processing finishes processing.

The focus setup processing part 108 finishes the display area change processing without carrying out processing of the step D8, in case that there is no focus setup element in the step D7.

Embodiment 8

Next, an embodiment 8 of the invention will be described as follows. Meanwhile, a functional block diagram and a device block diagram of a document inspection apparatus of the embodiment 8 are similar to FIG. 16 and FIG. 11 of the embodiment 7.

As to the document inspection apparatus which was configured as described above, its operation will be hereinafter described.

Figure 18:
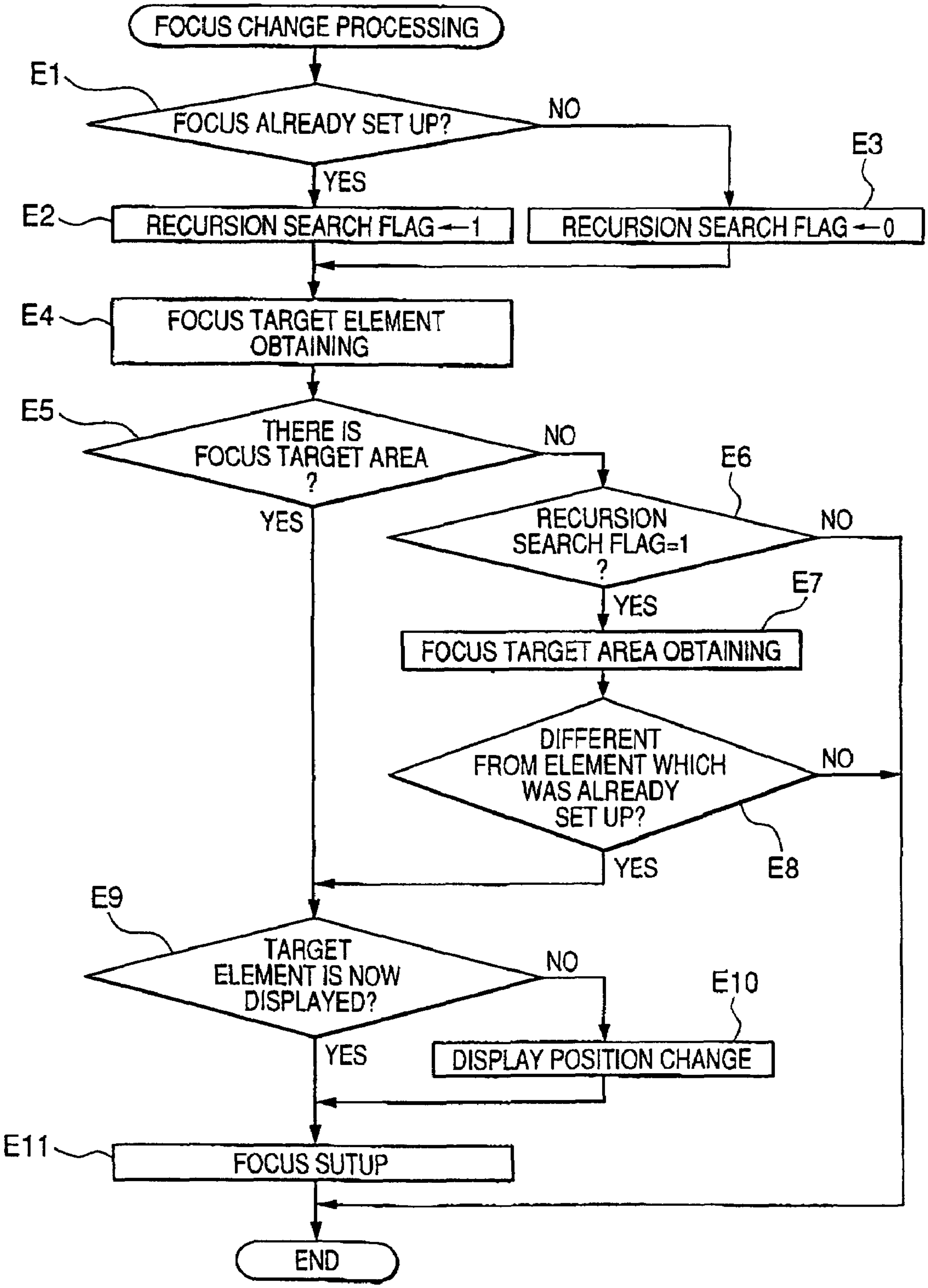
FIG. 18 is a flow chart which shows an operation of focus change processing of an embodiment 8 of the invention.

FIG. 18 is a flow chart which shows an operation of focus change processing, in case that a change of focus (object in a selected status) was instructed by the input part 101.

The operation of the processing advances to a step E2 in case that the focus setup processing part 108 judges focus has been already set up in a display target area, by the focus setup processing part 108 or a user operation by use of the input part 101, etc. in a step E1, and sets up 1 in the recursion search flag.

In the step E1, the operation of the processing advances to a step E3 in case that focus is not set up in the display target area as the result of the judgment by the focus setup processing part 108 and the processing part 108 sets up 0 in the recursion search flag.

In a step E4, the focus setup processing part 108 obtains a next focus target element in the display target area.

In a step E5, the operation of the processing advances to a step E9, in case that the focus setup processing part 108 can the focus target element in the step E4, and the operation advances to a step E6 in case that it can not obtain it.

In the step E6, the operation of the processing advances to a step E7 in case that the recursion search flag is 1 as the result of the judgment by the focus setup processing part 108. In case that the recursion search flag is 0, since the focus target element does not exist, the processing pat 108 finishes processing.

In the step E7, the focus setup processing part 108 carries out again, acquisition of the focus target element, from a head in the display target area.

In a step E8, the operation of the processing advances to a step E9, in case that the focus target element obtained in the step E7 is different from an element which has been already focus-set up at present as the result of the judgment by the focus setup processing part 108. In case that the focus target element obtained in the step E7 is the same as the element which has been already focus-set up at present, a focus change is unnecessary, and therefore, processing is finished.

In a step E9, the display change control part 103 checks, in a step E9, whether or not the focus target element, which was obtained in the step E4 or the step E7, is now displayed on the display part 106, and the operation advances to a step E11 in case that the control part 103 judges it is now displayed. In case that the control point 103 judges focus target element is not displayed on the display part 106, it advances to a step E10.

In the step E10, the display area change processing part 105 carries out a change of a display document position, so as for the focus target element to be displayed on the display part 106.

In the step E11, the focus setup processing part 108 sets up focus on the obtained focus target element.

Embodiment 9

Next, an embodiment 9 of the invention will be described as follow. Meanwhile, a functional block diagram and a device block diagram of a document inspection apparatus of the embodiment 9 are similar to FIG. 16 and FIG. 11 of the embodiment 7.

As to the document inspection apparatus which was configured as described above, its operation will be hereinafter described as follow.

Figure 19:
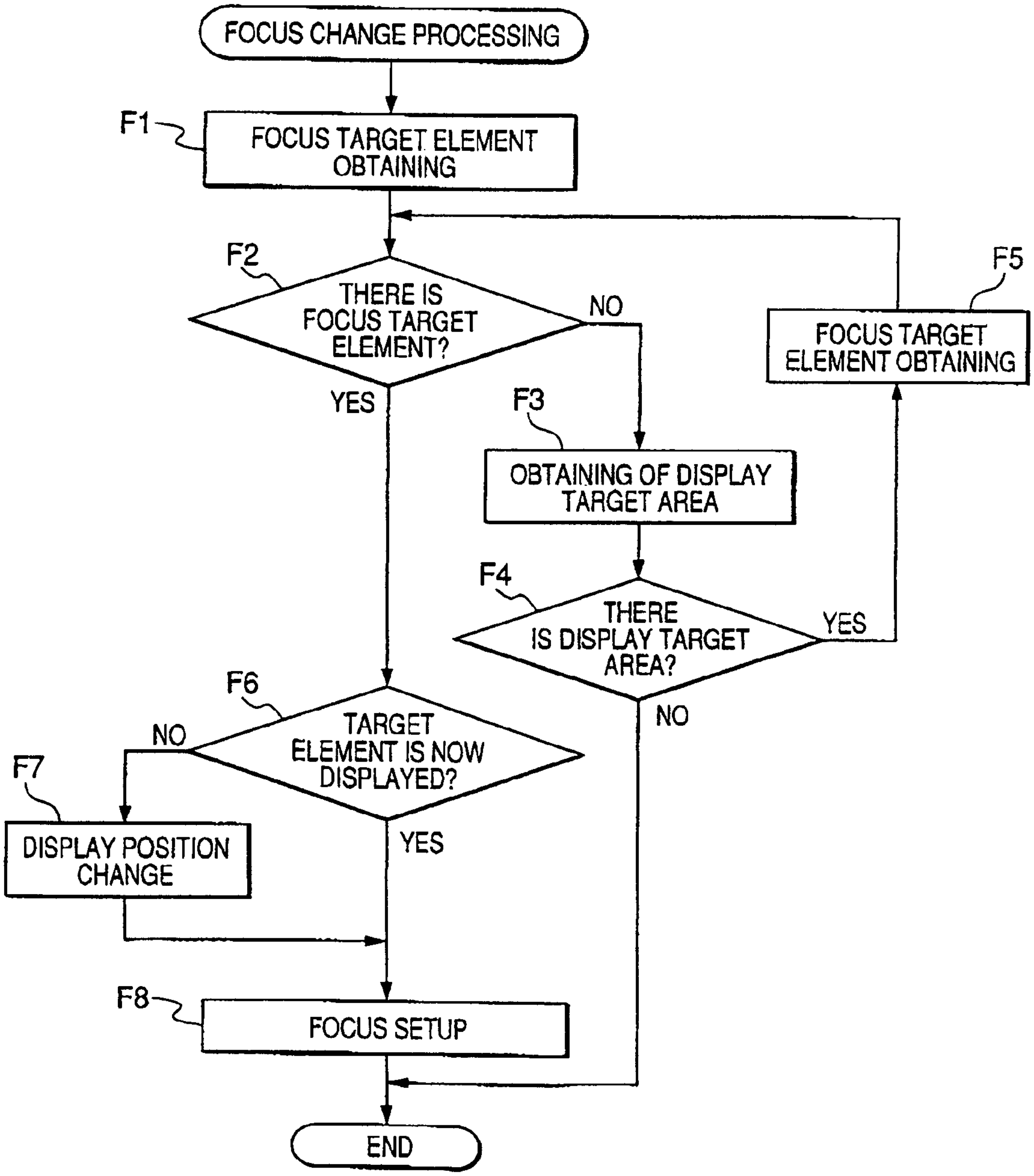
FIG. 19 is a flow chart which shows an operation of focus change processing of an embodiment 9 of the invention.

FIG. 19 is a flow chart which shows an operation of focus change processing, in case that a change of focus was instructed by the input part 101.

In a step F1, the focus setup processing part 108 obtains a next focus target element in a display target area.

The focus setup processing part 108 advances to a step F3, in case that it can not obtain the focus target element in a step F2.

In the step F3, the target area obtaining processing part 104 obtains a next display target area in a document which is displayed on the display part 106.

In a step F4, the operation of the processing advances to a step F5, in case that the display change control part 103 can obtain the display target area in the step F3, In case that the control part 103 can not obtain the display target area, the control part 103 finishes processing.

In the step F5, the focus setup processing part 108 obtains a focus target element in the display target area obtained in the step F3, and returns to the step F2, and confirms presence or absence of the focus target element.

In the step F2 the operation of the processing advances to a step F6, in case that the focus setup processing part 108 can obtain the focus target element in the step F2.

In a step F6, the display change control part 103 judges confirms whether or not the focus target element obtained in the step F1 or the step F5 is now displayed on the display part 106. In case that the control part 103 judges it is now displayed, the operation advances to a step F8. In case that the control part 103 judges the focus target element is not displayed on the display part 106, the operation advances to a step F7.

In the step F7, the display area change processing part 105 carries out a change of a display document position, so as for the focus target element to be displayed on the display p-art 106.

In the step F8, the focus setup processing part 108 sets up focus on the obtained focus target element, and finishes processing.

Embodiment 10

Next, an embodiment 10 of the invention will be described as follow.

Figure 20:
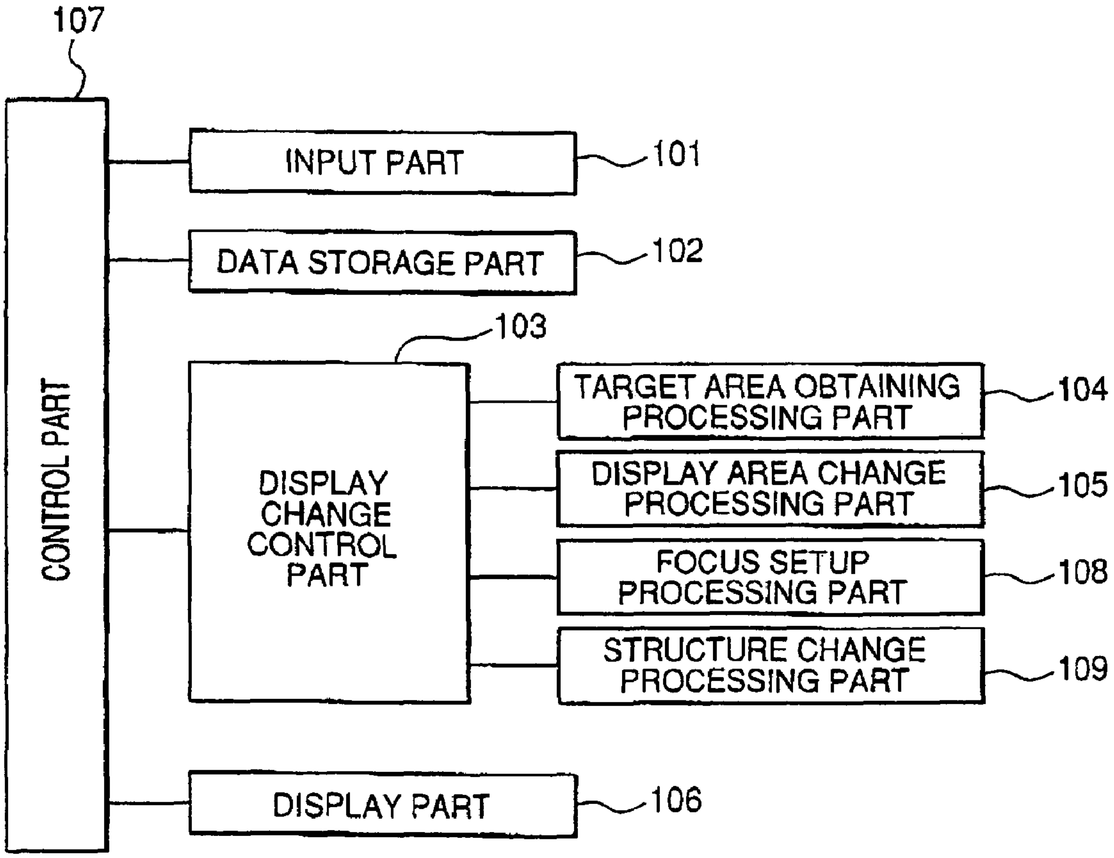
FIG. 20 is a functional block diagram of a document inspection apparatus of an embodiment 10 of the invention.

FIG. 20 is a functional block diagram of a document inspection apparatus of the embodiment 10 of the invention. FIG. 20 is the diagram that a constituent element 109 is added to the functional block diagram of FIG. 16. Numeral 109 designates a structure change processing part for changing a document object attribute of document structure information which shows a structure of a document.

Here, the document structure and its change will be described as follows.

It is possible to judge how the document is configured, by document structure information (and document object attribute). Also, if this document object attribute is changed, it is possible to change the structure of the document.

For example, viewing a Web, there is such a page that different pages are displayed on a left half and a right half of a browser, and it is clear that the suchlike page is a HTML document (document C) which was configured by two documents of a left part HTML document (document A) and a right part HTML document (document B).

Also, in case that the document A is designated with a width 50% at a left side, and the document B is designated with a width 50% at a right side, in the document object attribute, the document A and the document B are displayed half and half. It is possible to change the document A to 30% at the left side, and the document B to 70% at the right side, by changing the document target attribute.

A device block diagram of the document inspection apparatus of the embodiment 10 is similar to the block diagram of FIG. 11, and the structure change processing part 109, which was added in FIG. 20, is realized by such a matter that CPU 122 executes a control program which is stored in ROM 123, over carrying out exchange of data with ROM 123 and RAM 124.

As to the document inspection apparatus which was configured as described above, its operation will be described as follows.

Figure 21:
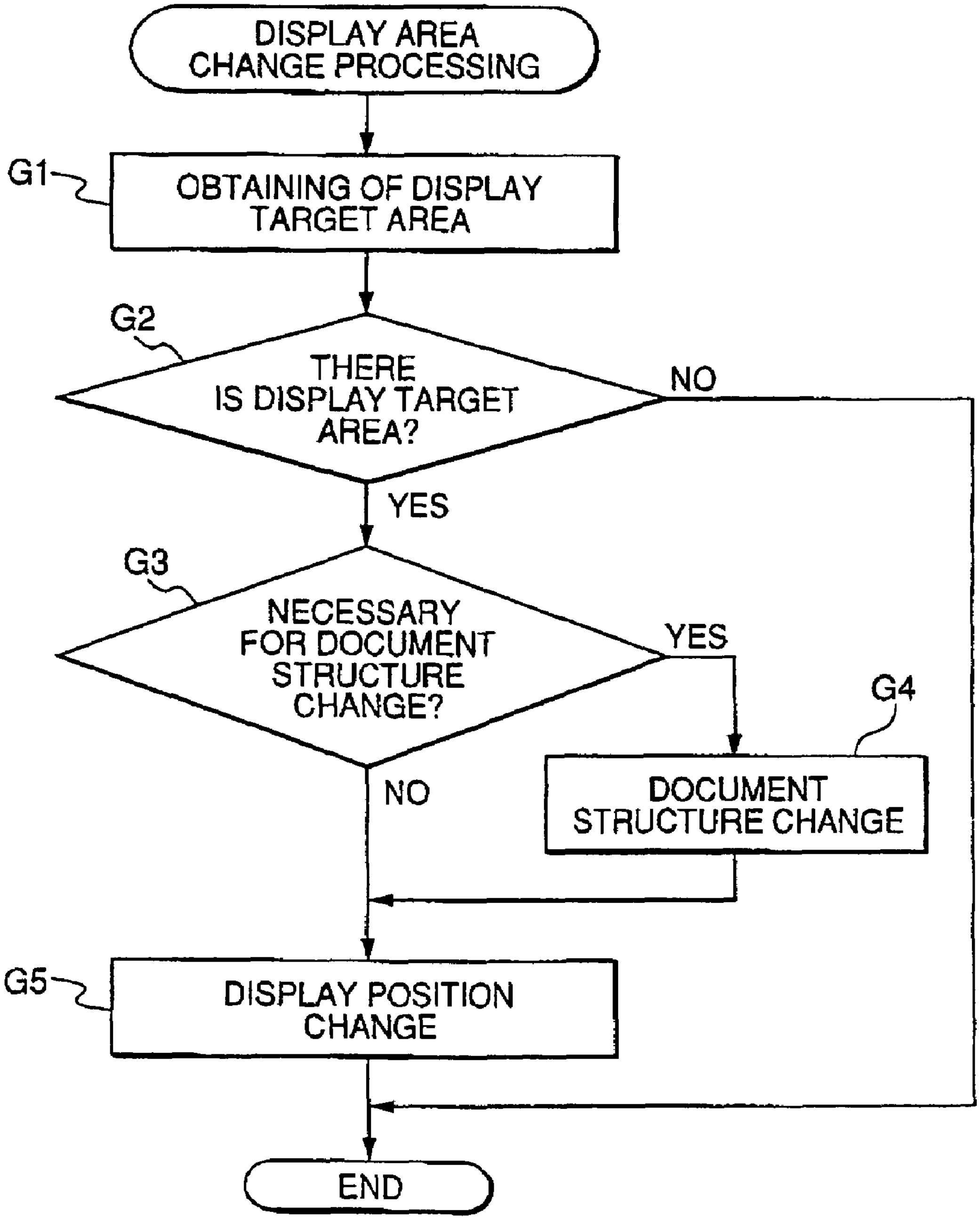
FIG. 21 is a flow chart which shows an operation of display area change processing of the embodiment 10 of the invention.

FIG. 21 is a flow chart which shows an operation of display area change processing, in case that a change of a display area is instructed by the input part 101.

In a step G1, the target area obtaining processing part 104 obtains a display target area in a document which is displayed on the display part 106.

In a step G2, the operation of the processing advances to a step G3, in case that the display change control part 103 can obtain the display target area in the step G1, and in case that it can not obtain the display target area, processing is finished.

In a step G3, the display change control part 103 judges whether or not a change of the document structure is necessary.

In the step G3, the operation of the processing advances to a step G4, since a change of a document structure by the display change control part 103 is necessary, in case that the document, which is now displayed on the display part 106, is a document which was configured by a plurality of documents, and an area of a document in which the area obtained in the step G1 is included is smaller than the that of display part 106. The operation of the processing advances to a step G5 in case that the change of the document structure is unnecessary.

In the step G4, the structure change processing part 109 carries out a change of a display document structure, so as for the document including the area obtained in the step G1 to be displayed on the display part 106, and finishes processing.

In a step G5, a display area processing part 105 carry out a change of the position of the display document so as for the area obtained in the G1 to be displayed on the display part 106.

Figure 22:
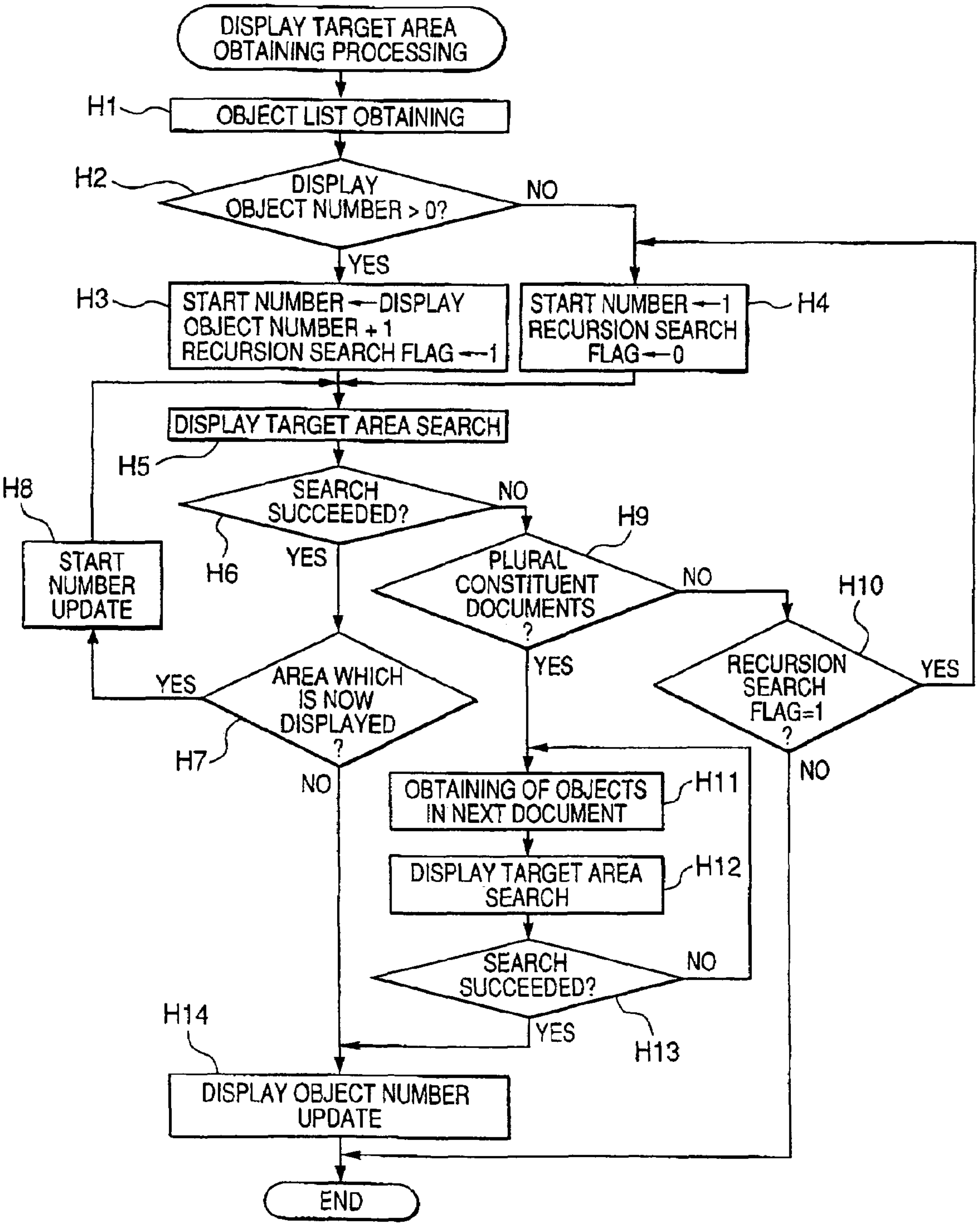
FIG. 22 is a flow chart which shows an operation of display target area obtaining processing of the embodiment 10 of the invention.

FIG. 22 is a flow chart which shows an operation of display target area obtaining processing which is carried out in the step G1.

In a step H1, the target area obtaining processing part 104 refers to document structure information of the document which is displayed on the display part 106, and obtains an object list.

In a step H2, the operation of the processing advances to a step H3, in case that a display object number is set up as the result of the judgment by the target area obtaining processing part 104, the processing part 104 sets up the display object number+1 to a start number, and sets up 1 to a recursion search flag.

In the step H2, the operation of the processing advances to a step H4 in case that the display object number is not set up as the result of the judgment by the target area obtaining processing part 104. The processing part 104 sets up 1 to the start number, and sets up 0 to the recursion search flag.

In a step H5, the target area obtaining processing part 104 carries out search of a display target area, from objects with the start number set up in the step H3 or the step H4, on a basis of the object list obtained in the step H1.

In a step H6, the operation of the processing advances to a step H7, in case that the target area obtaining processing part 104 succeeded in the search of the target area in the step H5, in a step H6.

In the step H7, the display change control part 103 judges whether or not the area obtained in the step H5 is now displayed on the display part 106 And the operating of the processing advances to a step H14 in case that it is not displayed now. In case that it is now displayed, the operation of the processing advances to a step H8, and the control part 103 updates the start number to the target object number+1 which was obtained in the step h5, and the control point 103 carries out search of a next display target area.

In the step H6, in case that the control 103 failed the search of the target area in the step H5, the operation of the processing advances to a step H9.

In the step H9, the target area obtaining processing part 104 refers to document structure information of a document which is now displayed on the display part 106, and the operation of the processing advances to a step H10, in case that the document object is not a document object which comprises a plurality of document objects.

In the step H10, the operation of the processing 104 returns to the step H4, in case that 1 was set up in the recursion search flag, and the target area obtaining processing part 104 carries out the search of the display target area from the beginning of the object list again. In case that the recursion search flag is 0 in the step H10, processing is finished.

In the step H9, the operation of the processing advances to a step H11, in case that the document which is now displayed on the display part 106, is configured by a plurality of documents as the result of the judgment by the target area obtaining processing part 104.

In the step H11, the target area obtaining processing part 104 refers to the document structure information of the document which is displayed on the display part 106, and obtains an object list of a next document of the document which is targeted for search at present.

In a step H12, the target area obtaining processing part 104 designates 1 to the start number, targeting the object list which was obtained in the step H11, and carries out search of a display target area.

In a step H13, the operation of the processing advances to a step H14, in case that the control portion 103 succeeded in the search of the target area in the step H12, and the operation returns to the step H11 in case that it fails the search, and the target area obtaining processing part 104 carries out search of a display target area, targeting a next document.

The target area obtaining processing part 104 updates, in the step H14, the display object to the object number which is obtained in the step H5 or the step H12, and finishes processing.

Figure 23:
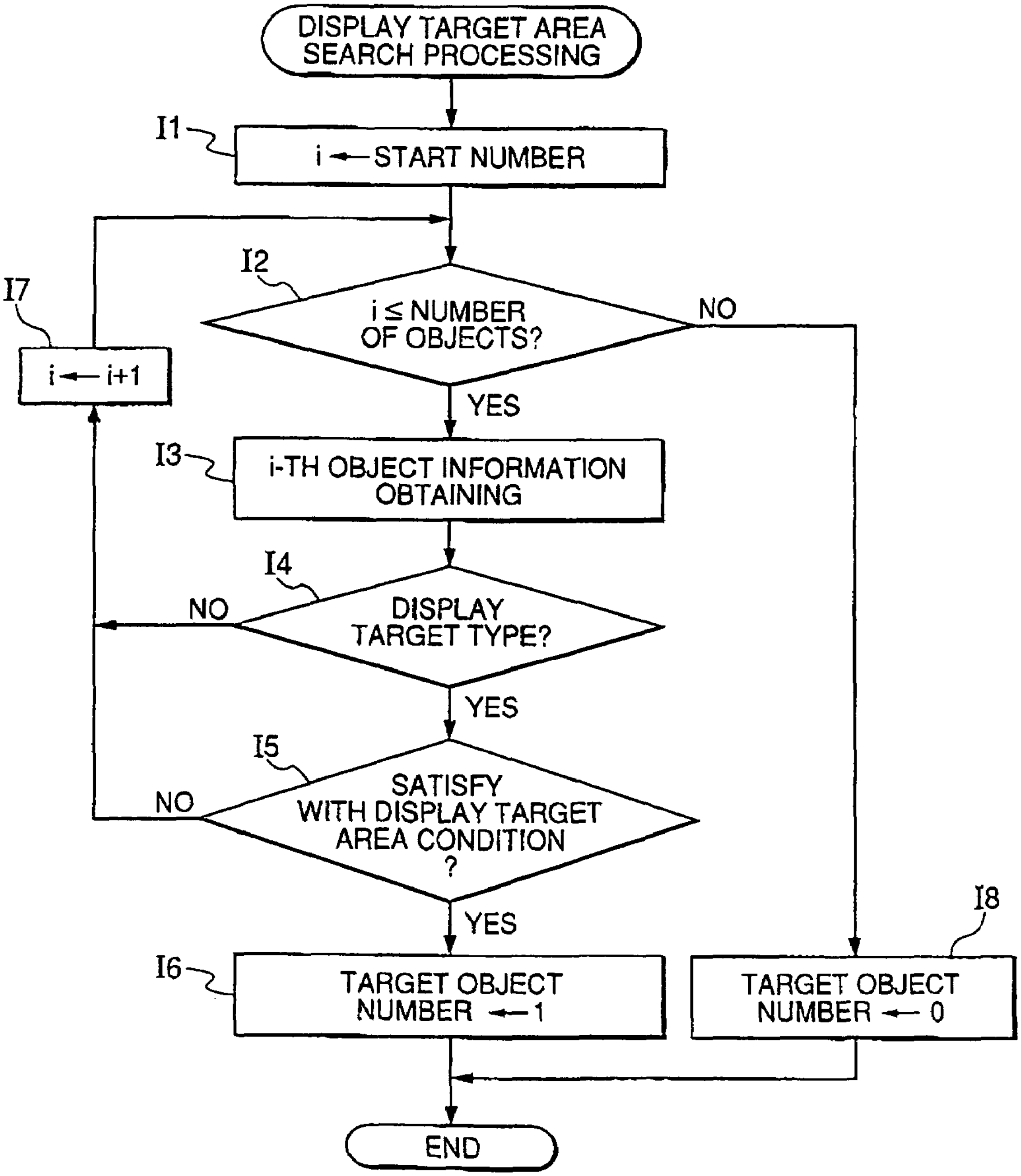
FIG. 23 is a flow chart which shows an operation of display target area search processing of the embodiment 10 of the invention.

FIG. 23 is a flow chart which shows an operation of display target area search processing which is carried out in the step H5 and the step H12.

The target area obtaining processing part 104 sets up a number which was designated as the start number, in the processing number i in a step I1.

The operation of the processing advances to a step I3, in case that the processing number i is the number of object or less in the object list which was designated as a target list in a step I2, and the target area obtaining processing part 104 obtains i-th object information.

In a step I4, as the result of the judgment by the object area obtaining processing part 104, the operation of the processing advances to a step I5 in case that an object type of the object information obtained in the step I3 is the one for display, and the operation advances to a step I7, in case that it is not so.

In the step 14, by using such a matter that an object type is "text object" or "image object" as a display object judgment condition, it is possible to set an area such as only a text area, only an image area, the text area and the image area, as a display target area.

The operation of the processing advances to a step 16, in case that the object obtained in the step 13, satisfies the display target area condition, in a step 15, and the target area obtaining processing part 104 sets up i in a target object number and finishes processing.

Depending on the condition in the step 15, an area size is checked and it is possible to dispose such a restriction that only an area with a predetermined size or more is targeted. Also, it is possible to target all areas, without disposing a condition in particular. In case that the target area condition is not satisfied in the step 15, the operation of the processing advances to a step 17.

The target area obtaining processing part 104 adds 1 to the processing number i in the step 17, and the operation returns to the step 12, and the processing portion 4 continues processing.

In case that the processing number i is larger than the number of objects in the object list which was designated as the target list, as the result of the judgment by the target area obtaining processing part 104, in the step 12, the target area obtaining part 104 sets up 0 in the target object number, in a step 18.

Figure 24:
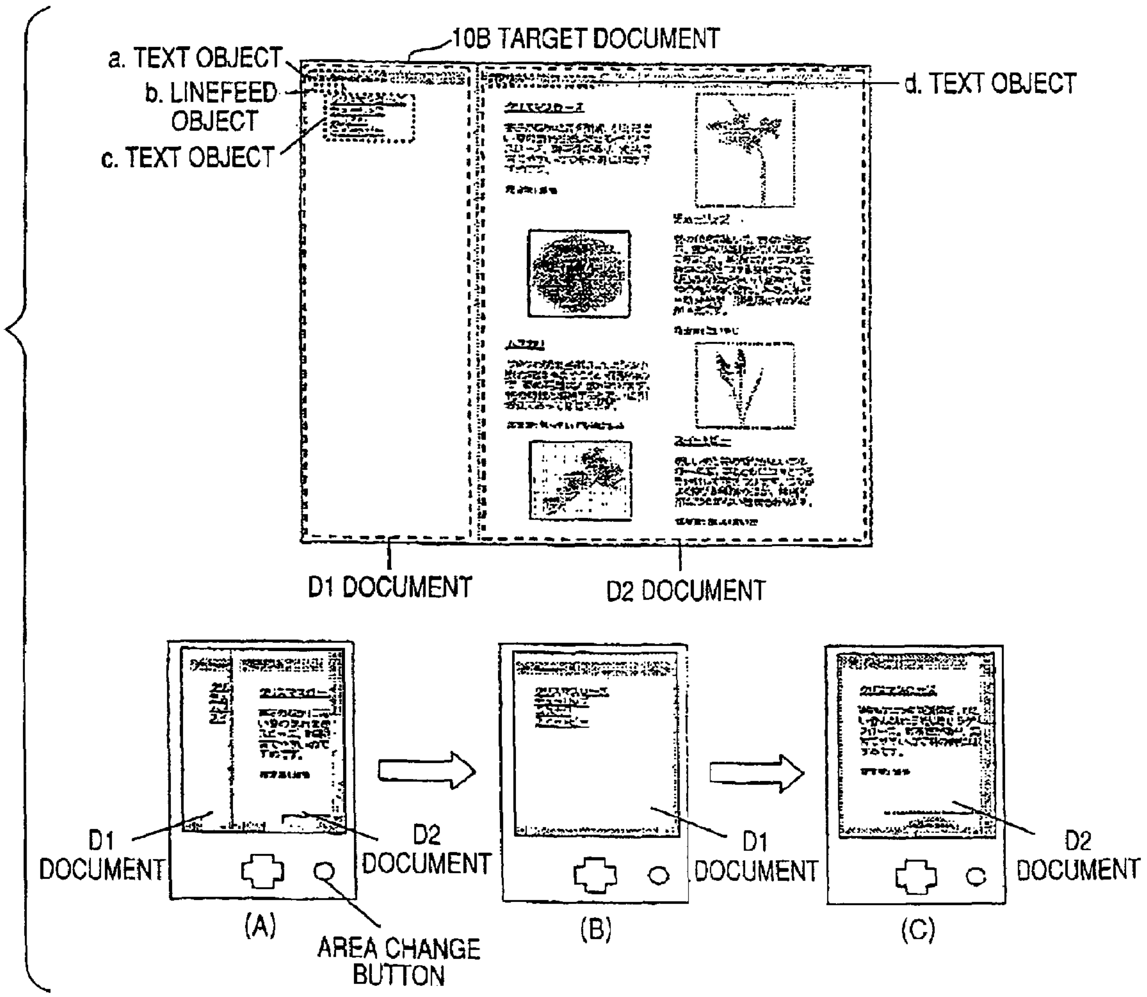
FIG. 24 is a view which shows a display example in case of carrying out display area change processing by the embodiment 10 of the invention.

FIG. 24 is a view which shows a display example in case of carrying out display area change processing by the embodiment 10 of the invention.

A target document 10 is a document which was configured by a document D01 and a document D02, as shown in FIG. 24(D), and a~d represent objects in the target document 10.

In the document inspection apparatus of FIG. 24(A), when a user pushes down the area change button Y of the input part 101, a change of a display area is carried out in accordance with the flow charts of FIG. 21, FIG. 22, and FIG. 23.

In a step G1, as a display target area, the text object a of the document D01 is obtained.

A document which is not displayed on the display part 106 is a document which was configured by a plurality of documents, and an area of the document D01 which includes the object a is smaller than the display part 6 (step G3), and therefore, a change of a document structure is carried out, so as for the document D01 to be displayed on the display part 106 (step G4).

The document inspection apparatus after a change of a display document position was carried out in a step G5 is shown in FIG. 24(B).

In the document inspection apparatus of FIG. 24(B), when a user pushes down the area change button Y of the input part 101, in the same manner as above, a change of the display area is carried out in accordance with the flow charts of FIG. 21, FIG. 22, and FIG. 23, and since the text object c is now displayed on the display part 106 of FIG. 24(B), search is carried out, targeting a next document, and the text object d of the document D02 is obtained as the display target area (step G1), and the change of the document structure is carried out, so as for the document D02 to be displayed on the display part 106 (step G4).

The document inspection apparatus after the change of the display document position was carried out in the step G5 is shown in FIG. 24(C)

Embodiment 11

Next, an embodiment 11 of the invention will be described. Meanwhile, a functional block diagram and a device block diagram of a document inspection apparatus of the embodiment 11 are similar to FIG. 20 and FIG. 11 of the embodiment 10.

As to the document inspection apparatus which was configured as described above, its operation will be hereinafter described.

Figure 25:
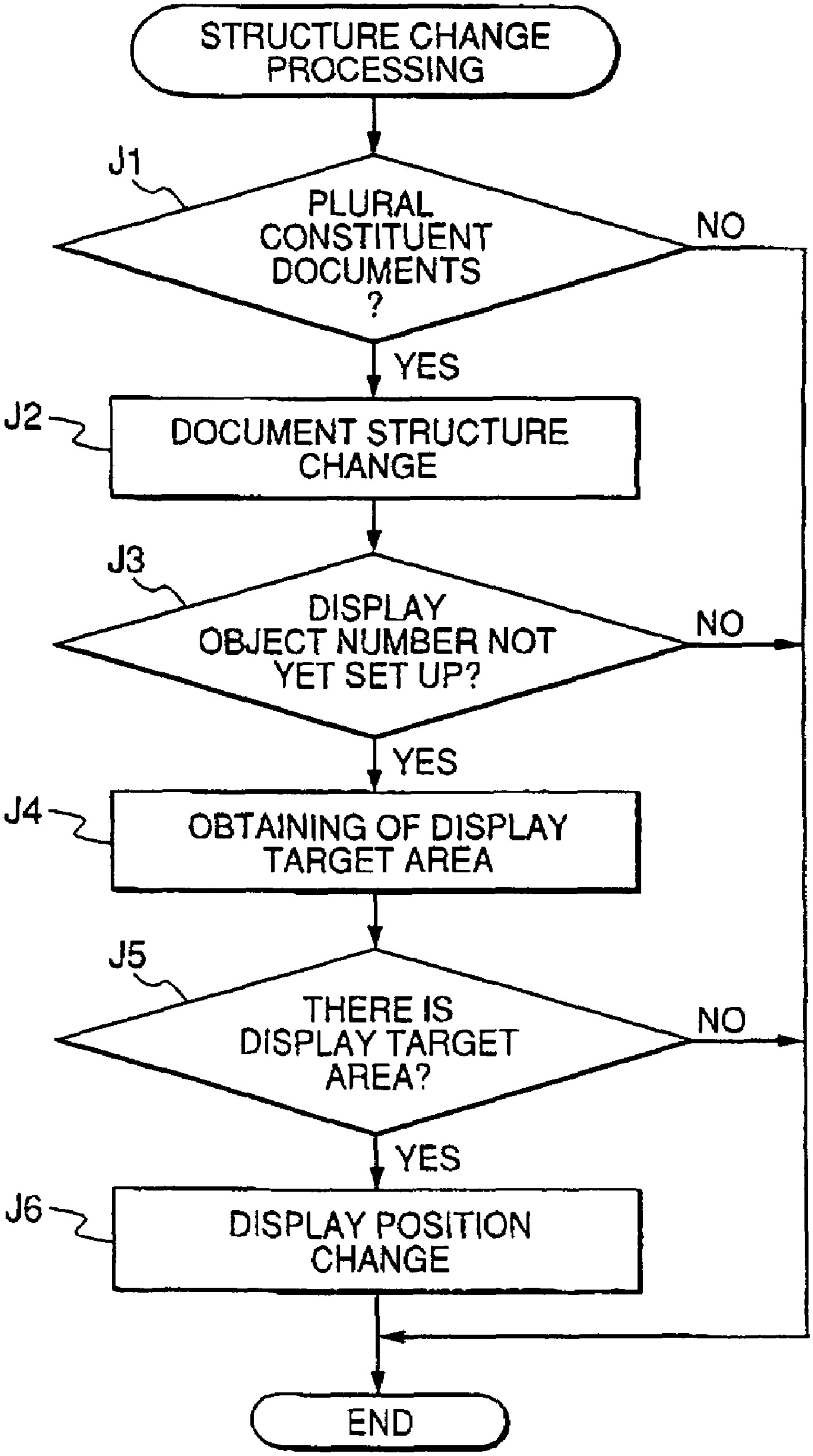
FIG. 25 is a flow chart which shows an operation of configuration change processing of an embodiment 11 of the invention.

FIG. 25 is a flow chart which shows document structure change processing, in case that a structure change was instructed by the input part 101.

In a step J1, the display change control part 103 refers to document structure information of a document which is now displayed on the display part 106, and advances to a step J2, in case that the document object is a document object which comprises a plurality of document objects. In case that the document object is not the document object which comprises the plurality of document objects, structure change processing is not carried out and processing is finished.

In the step J2, the structure change processing part 109 changes document structure information so as to change a structure document which is now displayed on the display part 106, to a next structure document, and carries out a change of a document structure.

In a step J3, the operation of the processing advances to a step J4 in case that the display change control part 103*a* judges display object number is not set up in the structure document which is now displayed on the display part 106.

In the step J4, the target area obtaining processing part 104 obtains a display target area in the structure document which is now displayed on the display part 106.

In a step J5, the operation of the processing advances to a step J6, in case that the display change control part 103 judges the display target area could be obtained in the step J4. In case that the control part 103 judges the display target area can not be obtained, the control part finishes processing In the step J6, the display area change processing part 105 carries out a change of a display document position, so as for the area which was obtained in the step J4 to be displayed on the display part 106.

Figure 26:
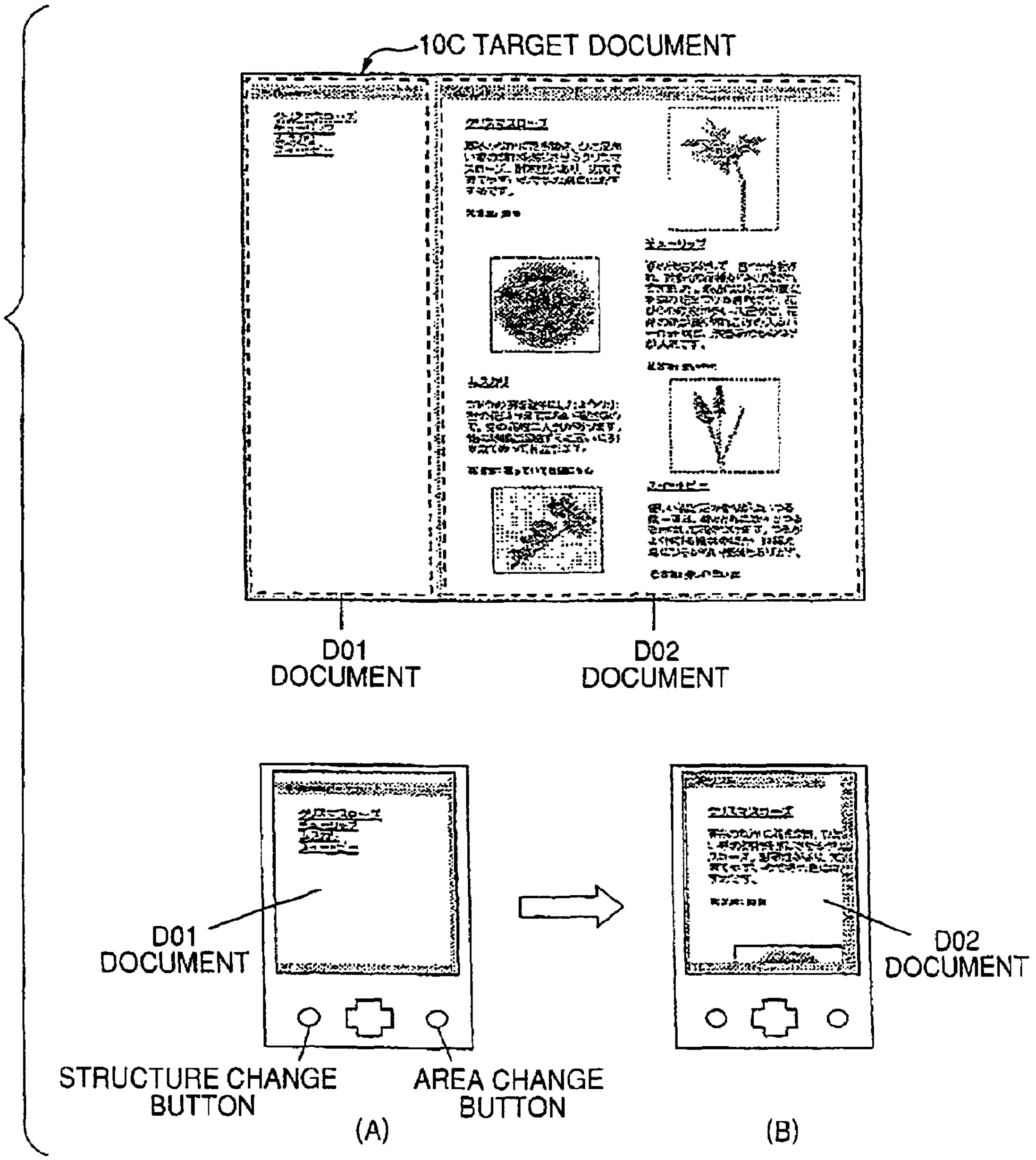
FIG. 26 is a view which shows a display example in case of carrying out configuration change processing by the embodiment 11 of the invention.

FIG. 26 is a view which shows a display example of a case of carrying out structure change processing by the embodiment 11 of the invention.

In FIG. 26(C), a target document 10C is configured by two documents of the document D01 and the document D02.

In the document inspection apparatus of FIG. 26(A), when a user pushes down a structure change button 112 of the input part 101, the structure change processing part 109 changes document structure information, and carries out a change of a document structure. For example, in the document inspection apparatus of FIG. 26(A), in case that the document D01 is designated by 100%, and the document D02 is designated by 0%, the change of the document structure is carried out by changing the document D01 to 0% and the document D02 to 100% The document inspection apparatus after document structure change is shown in FIG. 26(B).

Meanwhile, in this embodiment, each was described in separate embodiments, but as an embodiment, a mode of using a plurality of embodiments in combination at the same time is possible.

Embodiment 12

The embodiments of the invention will be described along with ach drawing as follows.

Figure 27:
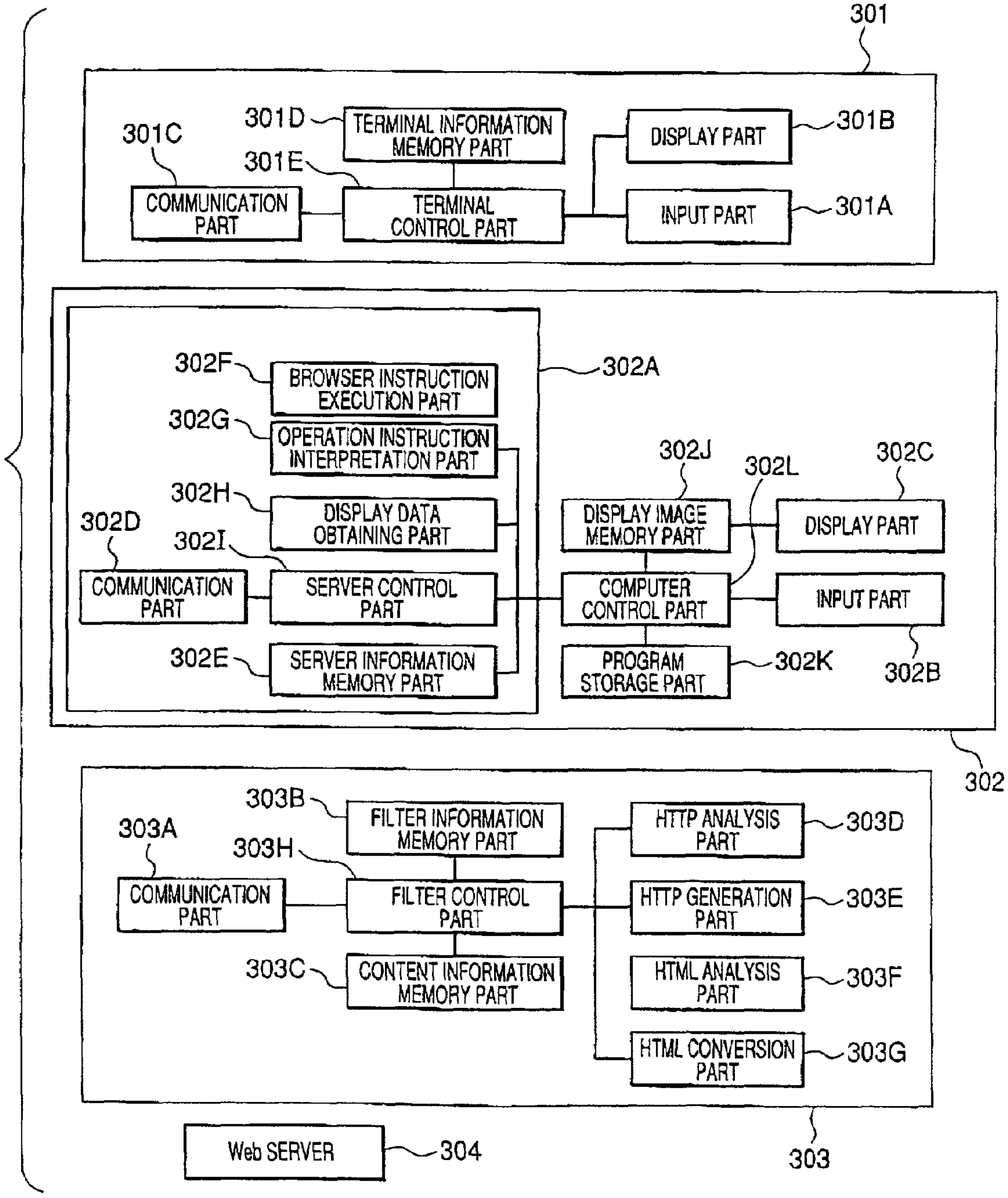
FIG. 27 is a functional block diagram of a remote control system in an embodiment 12 of the invention.

FIG. 27 is a functional block diagram of a remote control system in the embodiment of the invention. The remote control system in this embodiment has a control terminal (hereinafter, referred to as terminal) 301, a computer to be controlled (hereinafter referred to as PC) 302, a HTML conversion filter for converting contents of Internet (hereinafter, referred to as filter) 303, and a computer for storing the contents of Internet (hereinafter, referred to as Web server) 304.

In this configuration, the terminal 301 is connected to PC 302, and also, the HTML conversion filter 303 is connected to the Web server 304 and PC 302 through a communication line, respectively. Meanwhile, in this embodiment, it is configured that the filer 303 is connected to PC 302 and the Web server 304 through the communication line, but it is available even if it is configured that the filter 303 is stored in a program storage area of PC 302 or the Web server 304, and connected through an internal control line.

Also, in this configuration, the terminal 301 has an input part 301A through which a user carries out an input, a display part 301B, a communication part 301C, a terminal information memory part (hereinafter, referred to as memory part) 301D, and a terminal control part (hereinafter, referred to as control part) 301E. The communication part 301C transmits image display capability information of the terminal 301 and input information which was inputted from the input part 301A, to PC 302 through the control part 301E, and receives display image information from PC 302. Also, PC 302 has a remote control server (hereinafter, referred to as server) 302A, an input part 302B, a display part 302C, a display image memory part (hereinafter, referred to as memory part) 302J, a computer control part (hereinafter, referred to as control part) 302L, and a program storage part (hereinafter, referred to as storage part) 302K. The memory part 302J temporarily stores image information which is displayed by the display part 302C. The storage part 302K stores an OS (Operating System) program which operates in the control part 302L and PC 302, and a browser application (hereinafter, referred to as browser) which is an application program which operates on the OS program of PC 302.

Further, the server 302A has a display data obtaining part (hereinafter, referred to as obtaining part) 302H, a server information memory part (hereinafter, referred to as memory part) 302E, a communication part 302D, a browser instruction execution part (hereinafter, referred to execution part) 302F, an operation instruction interpretation part (hereinafter, referred to interpretation part) 302G, and a server control part (hereinafter, referred to control part) 302I. The obtaining part 302H obtains display image information which was displayed on PC 302, from the display part 302C or the memory part 302J of the PC 302. Also, the obtaining part 302H processes (changes) the image information in accordance with the display capability information of the terminal 301. Therefore, the obtaining part 302H is also used as a change part. The memory part 302E stores display image information which was obtained, processed by the obtaining part 302H. The communication part 302D receives display capability information and input information of the terminal 301, and transmits the display image information, which was stored in the memory part 302E, to the terminal 301. The interpretation part 302G and the execution part 302F analyze input information such as a command, which was received from the communication part 302D, and transmits it to the control part 302L as an instruction request. The control part 302I carries out operation control of the server 302A.

Further, the filter 303 has a communication part 3A, a filter information memory part (hereinafter, referred to as memory part) 303B, a content information memory part (hereinafter, referred to memory part ) 303C, a HTTP analysis part 303D, a HTTP generation part 303E, a HTML analysis part 303F, a HTML conversion part 303G, and a filter control part (hereinafter, referred to as control part ) 303H. The communication part 303A receives a content obtaining request from the browser of PC 302, and content data from the Web server 304, and transmits the content data to PC 302, and also, the content obtaining request to the Web server 304. The HTTP analysis part 303D receives a HTTP request, which is a content obtaining request from the browser, which was received from PC 302 through the communication part 3A, and transmits it to the Web server 304 through the communication part 303A, and further, analyzes a HTTP response to the HTTP request which was received from the Web server 304 through the communication part 303A. The HTML analysis part 3F analyzes HTML in the HTTP response which was analyzed by the HTTP analysis part 303D, and takes out a display element in HTML. And, the HTML conversion part 303G alters HTML by describing a tag for marking a display element to the display element of HTML. The HTTP generation part 303E re-generates the HTTP response from a HTML file which was altered, and transmits it to PC 302 through the communication part 303A.

Figure 28:
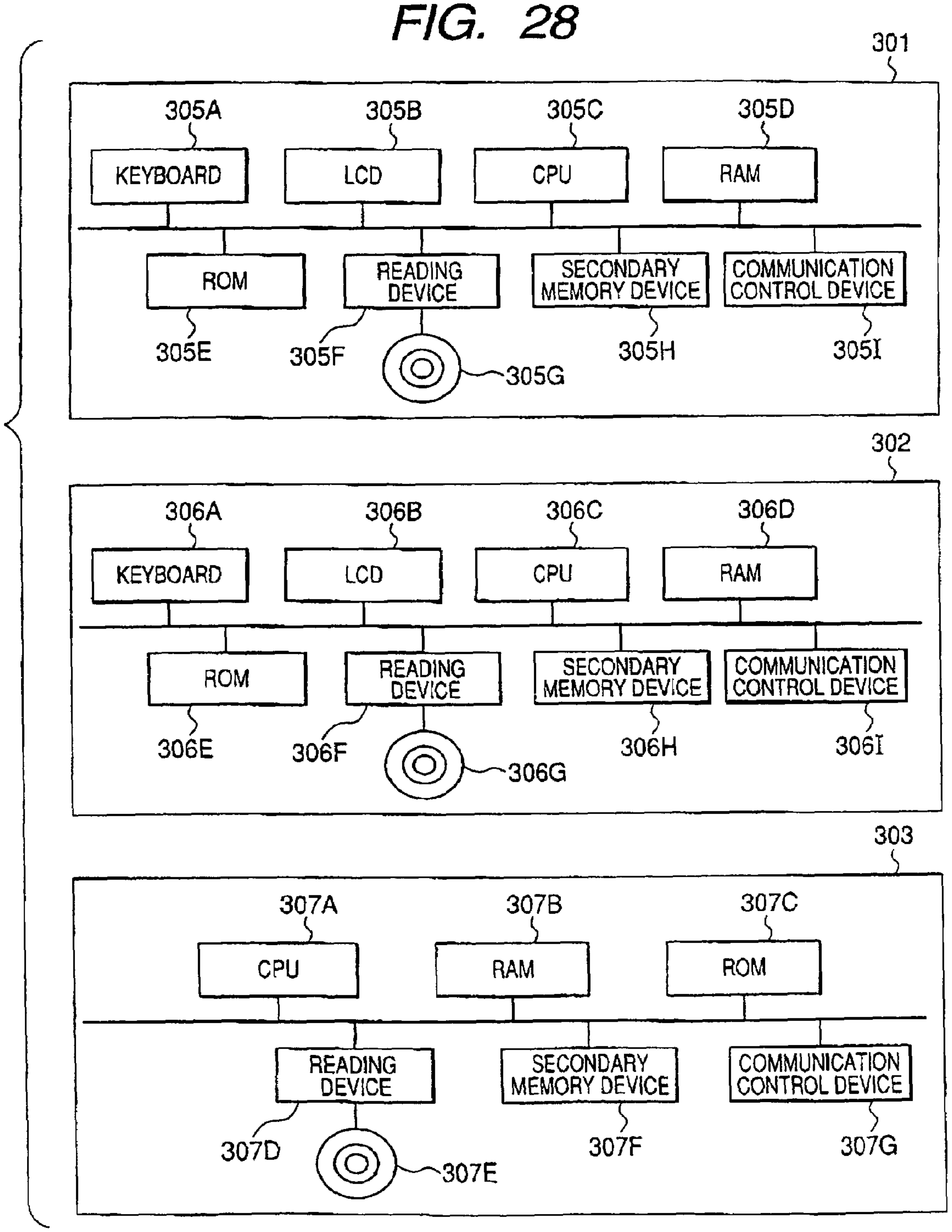
FIG. 28 is a circuit block diagram of the remote control system in the embodiment 12 of the invention.

FIG. 28 is a circuit block diagram of the remote control system in the embodiment of the invention.

In FIG. 28, the terminal 301 has a keyboard 305A, a liquid crystal display (hereinafter, referred to as LCD) 305B, a central processing unit (hereinafter, referred to as CPU) 305C, a random access memory (hereinafter, referred to as RAM) 305D, a read only memory (hereinafter, referred to as ROM) 305E, a reading device 305F, a secondary memory device 305H, and a communication control device 305I. The reading device 305F reads a storage media 305G such as CD(Compact Disc)-ROM, DVD(Digital Versatile Disc)-ROM. The communication control device 3051 (hereinafter, referred to as control device) carries out a connection with an external line through a telephone line, a network cable and so on.

PC 302 has a keyboard 306A, LCD 306B, CPU 306C, RAM 306D, ROM 306E, a reading device 306F, a secondary memory device 306H, and a communication control device 306I. The reading device 306F reads a storage medium 306G such as CD-ROM. The communication control device (hereinafter, referred to as control device) 3061 carries out a connection with an external line through a telephone line, a network cable and so on.

The filter 303 has CPU 307A, RAM 307B, ROM 307C, a reading device 307D, a secondary memory device 307F, and a communication control device 307G. The reading device 307D reads a storage medium 307E such as CD-ROM. The communication control device (hereinafter, referred to as control device) 307G carries out a connection with an external line through a telephone line, a network cable and so on.

Here, a corresponding relation of the functional block diagram of FIG. 27 and the circuit block diagram of FIG. 28 will be described. As shown in FIG. 27 and FIG. 28, in the terminal 301, the memory part 301D is realized by RAM 305D. The input part 301A is realized by the keyboard 305A, but may include a mouse, a touch panel etc. The display part 301B is realized by LCD 305B, and the communication part 301C is realized by the control device 305I. Also, in this configuration, the control part 301E is realized by such a matter that CPU 305C executes a program which was stored in ROM 305E, over exchanging data with RAM 305D, ROM 305E, and the secondary memory device 305H.

Also, in the server 302A, the memory part 302E is realized by RAM 306D. OS program and an application program are stored in any one of RAM 306D, ROM 306E, and the secondary memory device 306H, Also, in this configuration, the control device 302I, the obtaining part 302H, the interpretation part 302G, and the execution part 302F are realized by such a matter that CPU 306C executes a program which was stored in ROM 306E, over exchanging data with RAM 306D, ROM 306E, and the secondary memory device 306H. Meanwhile, the memory part 302J in PC 302 is realized by RAM 306D, and the display part 302C is realized by LCD 306B, and the input 302B is realized by the keyboard 306A, but may includes a mouse, a touch panel etc.

Further, in the filter 303, the memory part 303C is realized by RAM 307B, and the communication part 303A is realized by the control device 307G. The HTTP analysis part 303D, the HTTP generation part 303E, the HTML analysis part 303F, and the HTML conversion part 303G are stored in any one of RAM 307B, ROM 307C, and the secondary memory device 307F. Also, in this configuration, the control part 303H, the HTTP analysis part 303D, the HTTP generation part 303E, the HTML analysis part 303F, and the HTML conversion part 303G are realized by such a matter that CPU 307A executes a program which was stored in ROM 307C, over exchanging data with RAM 307B, ROM 307C, and the secondary memory device 307F.

Meanwhile, in this embodiment, the terminal 301 is designed in such a manner that CPU 305C executes a program which was stored in ROM 305E. However, the program, which is executed by CPU 305C, may be a program which was stored in the storage medium 305G, using the reading device 305F. Also, in the server 302A, CPU 306C executed a program which was stored in ROM 306E, but the program, which is executed by CPU 306C, may be a program which was stored in the storage medium 306G, using the reading device 306F. Also, CPU 306C may be also used as the control part 302I of PC 302. Further, two or more of the memory parts 302E, 302J, and the storage part 302K, may be configured by an identical device. Further, the filter 303 is designed in such a manner that CPU 307A executes a program which was stored in ROM 307C, but the program, which is executed by CPU 307A, may be a program which was stored in the storage medium 307E, using the reading device 307D.

Figure 29:
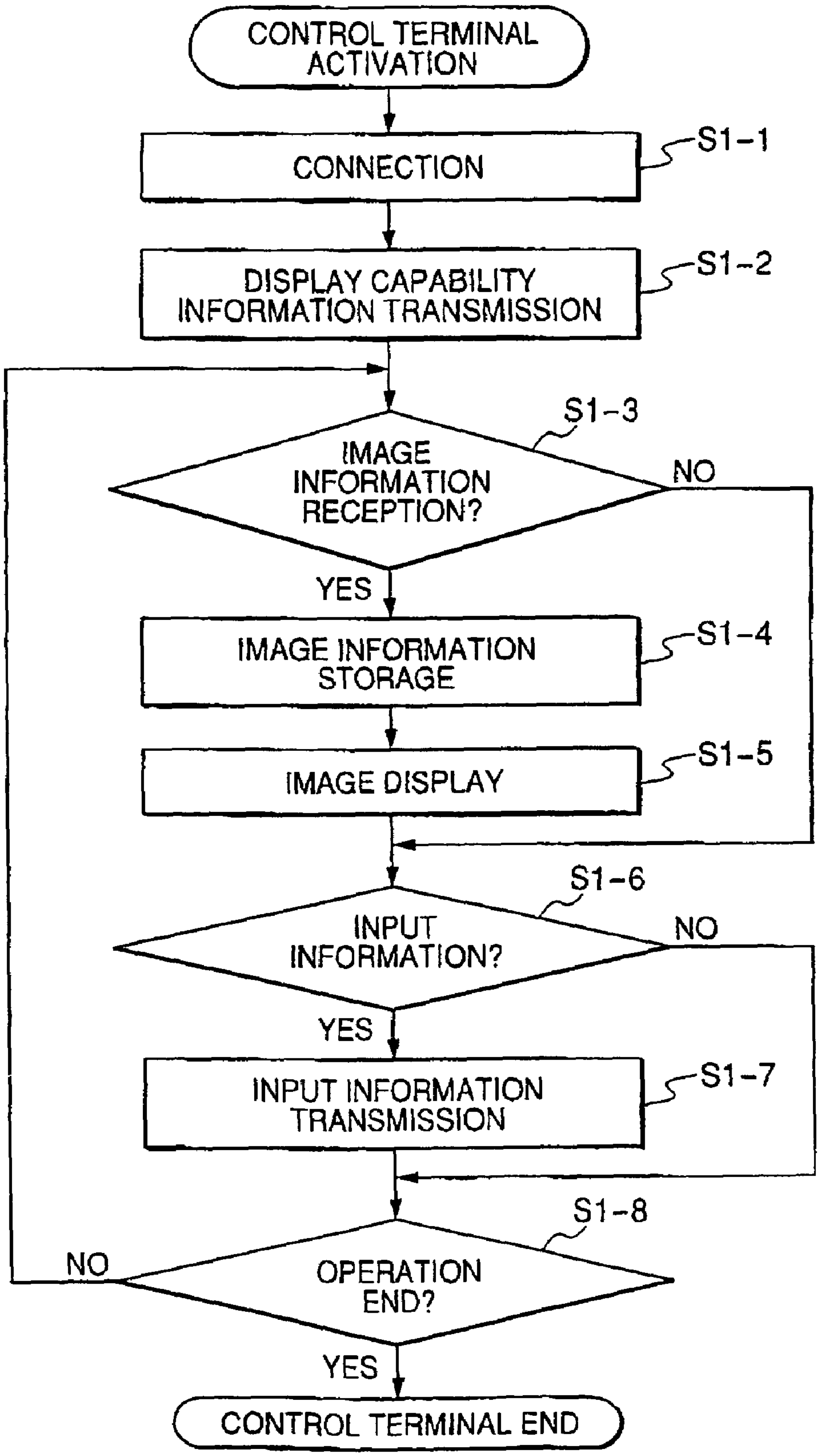
FIG. 29 is a flow chart which shows an operation of a control terminal in the embodiment 12 of the invention.
Figure 30:
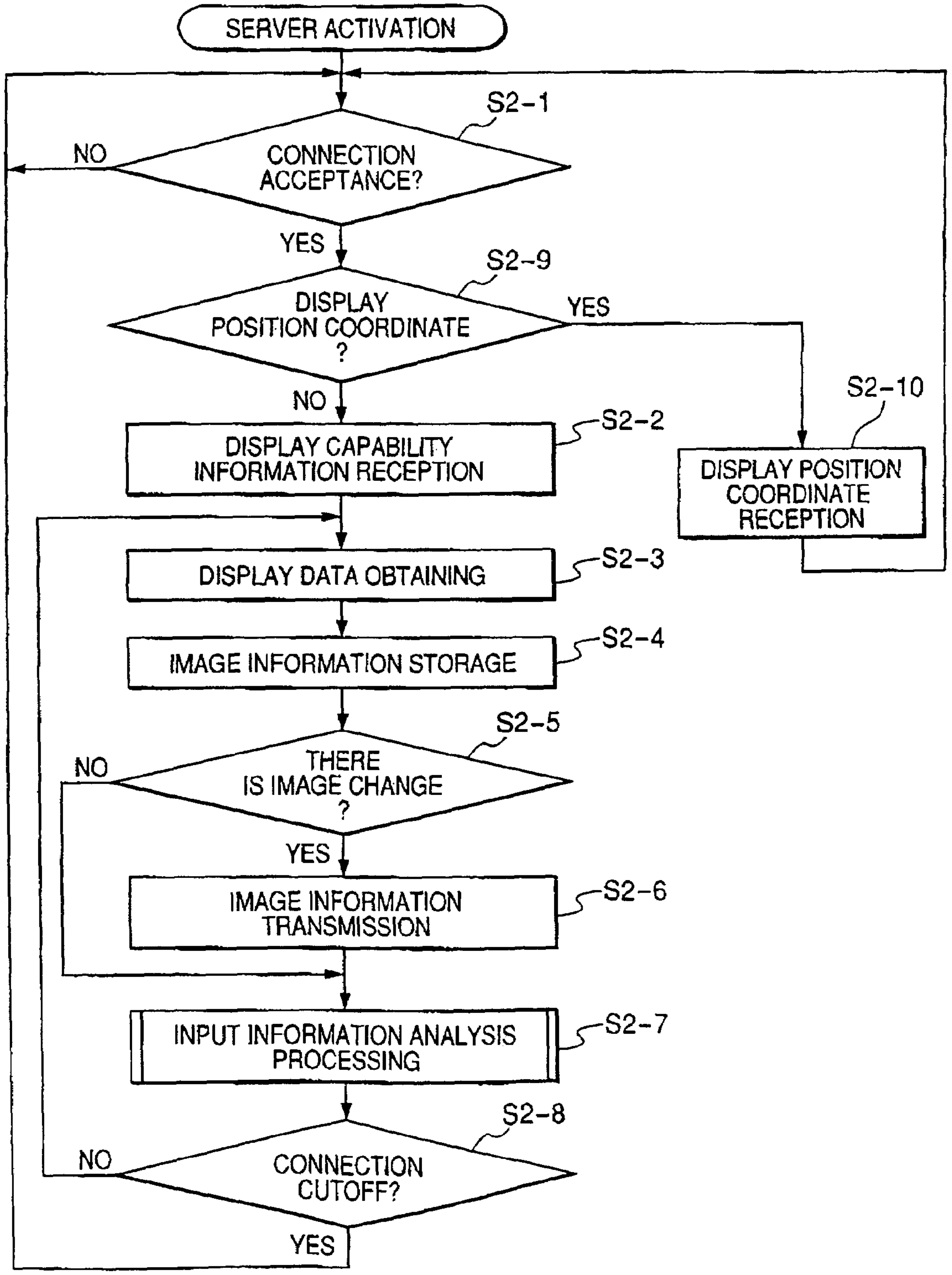
FIG. 30 is a flow chart which shows an operation of a remote control server in the embodiment 12 of the invention.
Figure 31:
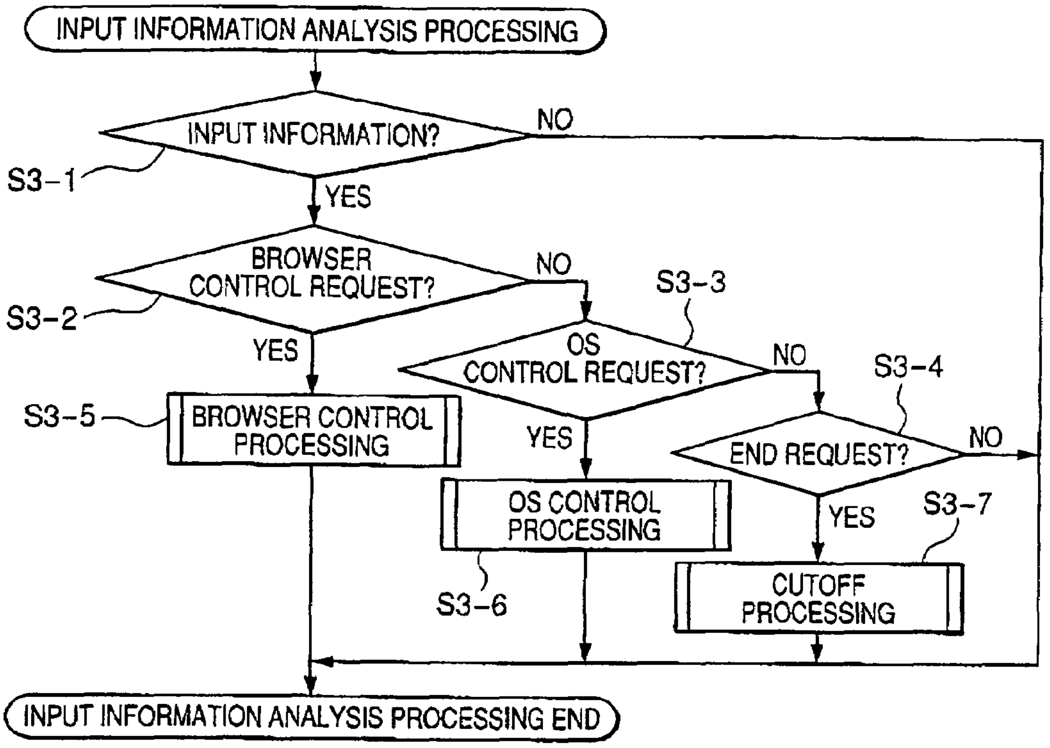
FIG. 31 is a flow chart which shows the operation of the remote control server in the embodiment 12 of the invention.

As to the remote control apparatus which was configured as above, operations of the terminal 301, PC 302, and the filter 303 will be described on the basis of flow charts from FIG. 29 to FIG. 35. Meanwhile, the flow chart of FIG. 29 is a flow chart which shows an operation of the terminal 301, and shows such an appearance that CPU 305C executes a program which was stored in ROM 305E.

Figure 33:
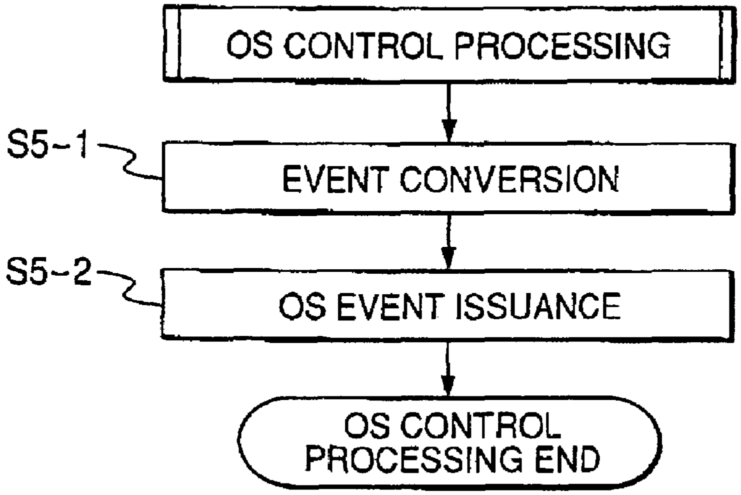
FIG. 33 is a flow chart which shows the operation of the remote control server in the embodiment 12 of the invention.
Figure 34:
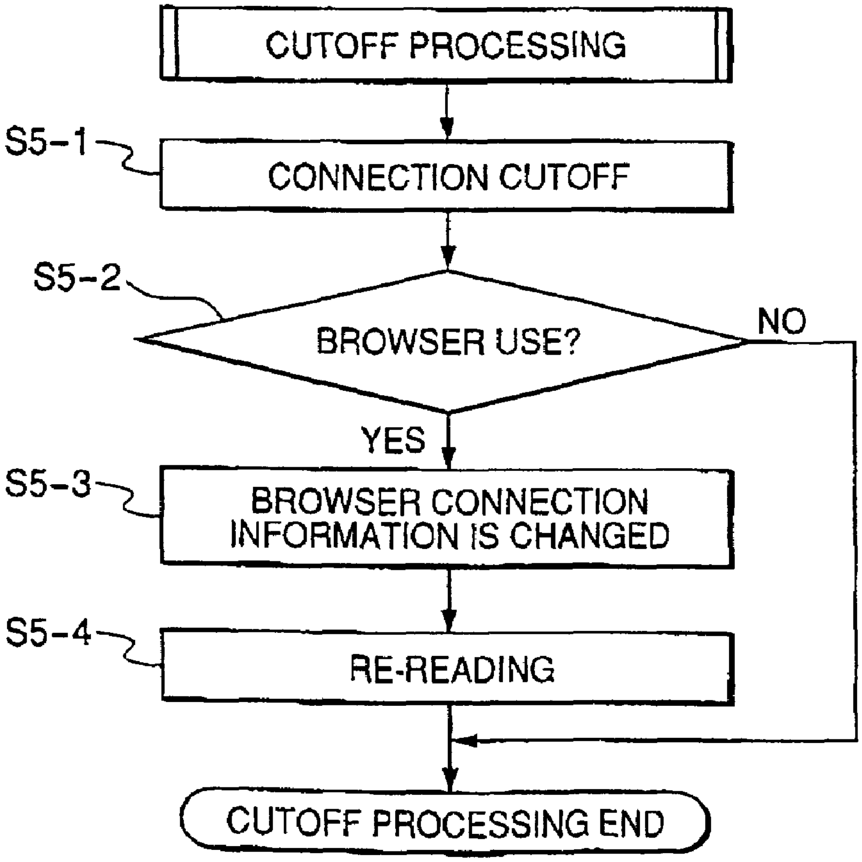
FIG. 34 is a flow chart which shows the operation of the remote control server in the embodiment 12 of the invention.
Figure 35:
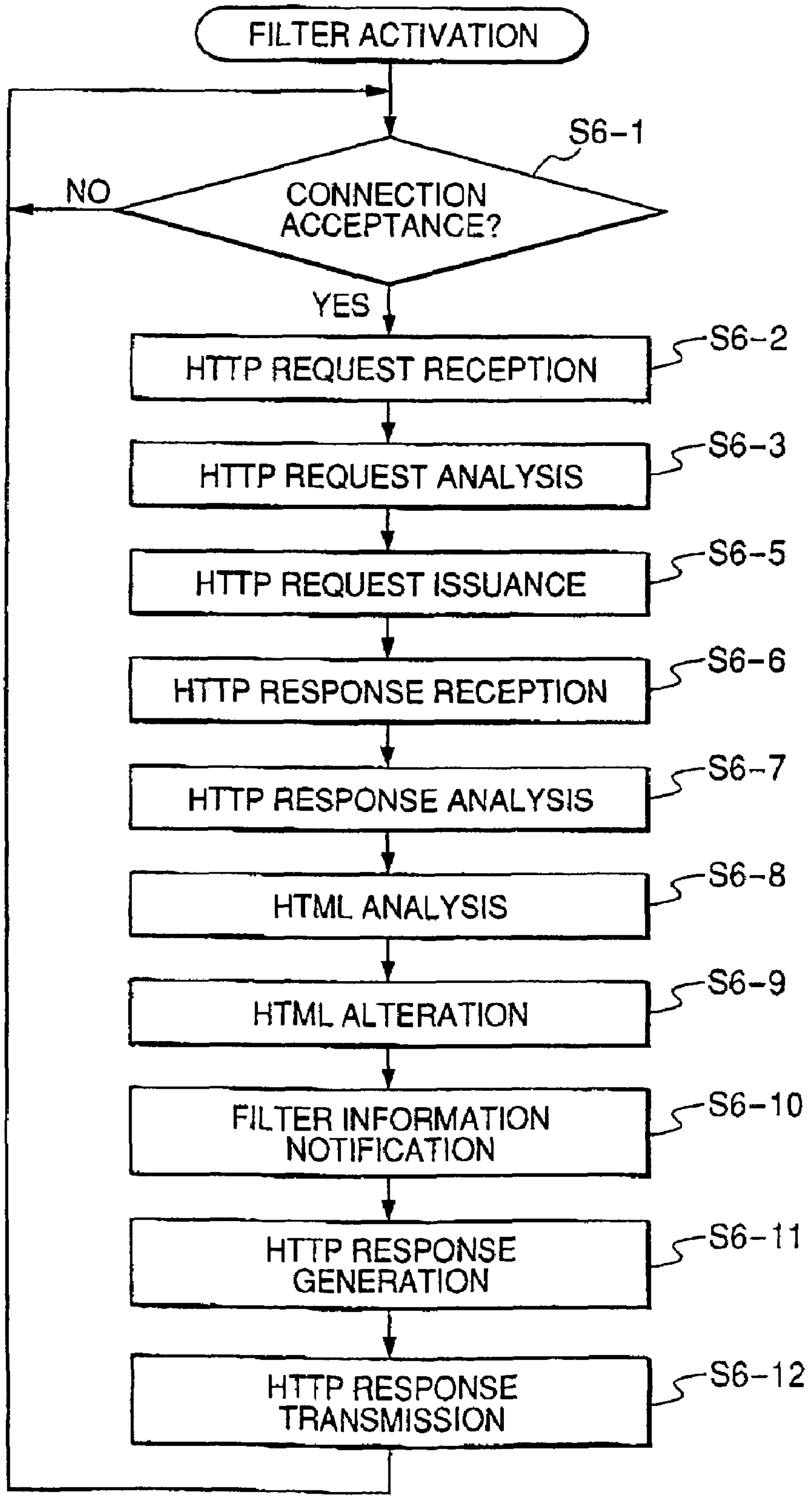
FIG. 35 is a flow chart which shows an operation of a HTML conversion filter in an embodiment 13 of the invention.

The flow charts from FIGS. 30 to 34 are flow charts which show an operation of the remote control server 302A, respectively, and show such an appearance that CPU 306C executed a program which was stored in ROM 306E. The flow chart of FIG. 35 is a flow chart which shows an operation of the HTML conversion filter 303, and shows such an appearance that CPU 307A executes a program which was stored in ROM 307C. Here, the flow chart of FIG. 29 shows that the terminal 301 is activated, and the server 302A receives image information of a display screen of PC 302 and displays it on the display part 301B. Also, the flow charts from FIGS. 30 to 34 show that the server 302A receives a connection request from the terminal 301, and obtains display image information of PC 302, and transmits it to the terminal 301, and receives an operation request from the terminal 301, and operates PC 302. Further, the flow chart of FIG. 35 shows that the filter receives a HTTP request from the browser, to take out HTML which is included in a HTTP response, and to alter HTML, and it is displayed on the browser.

Firstly, a user activates the terminal 301, and thereby, processing is started. When this activation is carried out, a user sets a server of a connection destination, by using the input part 301A. For example, in case that TCP/IP(Transmission Control Protocol/Internet Protocol) is used for a communication protocol, an IP address is designated. And, the terminal 301 issues a connection request to the server 302A (S1-1).

In this embodiment, it is configured that, after a user activated the terminal 301, a connection of the server 302A is carried out by an instruction request of a user. However, this embodiment is not limited to this connection method, and may be a connection mode for carrying out a connection to a predetermined server 302A in concurrence with activation.

And, in the server 302A, the control part 302I receives a connection request from the terminal 301, through the communication part 302D, and establishes a connection (S2-1).

Next, in the terminal 301, the control part 301E obtains image display capability information which was stored in the memory part 301D, and transmits it to the communication part 302D at the side of PC 302, through the communication part 301 (S1-2).

Here, in this embodiment, the image display capability information means resolution and display pixel information (bpp: Bit Per Pixel) of LCD 305B, and as the image display capability information of LCD 305B of the terminal 301, resolution is set to QVGA (320×240), and the display image information is set to 8 bpp. Meanwhile, this embodiment is not such a thing that the display capability information is limited to resolution and a display color, and it may include color palette information, tone information and so on.

Next, in the server 302A, the control part 302I receives the display capability information which was transmitted by the terminal 301 through the communication part 302D, and stores it in the memory part 302E (S2-2).

Subsequently, the control part 302I activates the obtaining part 302H, and obtains first display image information from an OS program, from the memory part 302J. And, the obtaining part 302H stores the first display image information in the memory part 302E (S2-3).

Here, in this embodiment, LCD 306B of the display part of PC 302 has larger solution than LCD 305B of the terminal 301, which is set to SVGA (1280×1024), and image information is set to 8 bpp which is the same as in the terminal 301. That is, the first display image information becomes an image of SVGA, 8 bpp, which is a display image of PC 302.

Subsequently, the obtaining part 302H obtains display capability information of the terminal 301, which was stored in the memory part 302E in S2-2, from the first display image information which was stored in the memory part 302E, and cuts out display image information to the obtained resolution, and thereby, second display image information is prepared.

Meanwhile, display capability information, which is transmitted from the terminal 301, is stored in the memory 302E in advance, and in accordance with this display capability information, the obtaining part 302H cuts out an image with a size of LCD 305B of the terminal 301, from display image information, which is also possible. By this, eliminated is a necessity of transmitting display capability information from the terminal 301 to the server 302A, and transaction, which is required for transmission and reception of the display capability information, is alleviated.

Also, in this embodiment, right after activation, the display part 301B of the terminal 301 displays most lower left of the display part 302C of PC 302. And, the obtaining part 302H cuts out a rectangular area of up to (320, 240) which is a QVGA size with setting the most lower left as an original point coordinate (0, 0). And, the second display image information after cut-out is stored in the memory part 302E. Subsequently, as the second display image information after cut-out, an image of a screen and coordinate information [(0, 0), (320, 240)] after cut-out are stored in the memory part 302E (S24). However, this invention is not limited to this storing method of display image information, and it is available even if it is set to coordinate information of an image which is transmitted to the terminal 301, against the first display image information. On this occasion, the coordinate information of the image is stored in the memory part 302E.

Next, the control part 302I compares an image of the second display image information which is stored in the memory part 302E and was previously transmitted to the terminal 301, and an image of the second display image information which is newly stored this time. And, in comparison, the control part 302 I checks whether or not there is a difference of both images (S2-5). At this time, the difference is extracted by comparing a difference of each pixel, to all pixels of the image. And, if there is the difference, the processing advances to S2-6, and in case that there is no difference, advances to S2-7. In case that it is judged that there is the difference, the control part 302I transmits the second display image information to the terminal 301 through the communication part 302D (S2-6). Meanwhile, right after activation, the second display image information in previous time is not stored, and therefore, the step of S2-6 is carried out.

On one hand, in the terminal 301, the control part 301E receives the second display image information which was transmitted from the server 302A, through the communication part 301C (S1-3) Then the received second display image information is saved in the memory part 301D (S1-4).

Subsequently, the control part 301E displays the second display image information, which was stored in the memory part 301D, on the display part 301B (S1-5). Meanwhile, bit-map data is used for the display image information of this embodiment, but the invention is not limited to this data format of the display image information.

And, it turns into a state of operation waiting from a user, or of image transmission waiting from the server 302A, but further, in case that a user input was generated from the terminal 301, input information analysis processing, which will be described later, is carried out, and in case that operation control of PC 302 is carried out and the display part 302C of PC 302 was updated, LCD 305B of the terminal 301 is updated by carrying out the above-described image transfer, which is repeated, so that it becomes possible for PC 302 to be controlled from the terminal 301.

Figure 36:
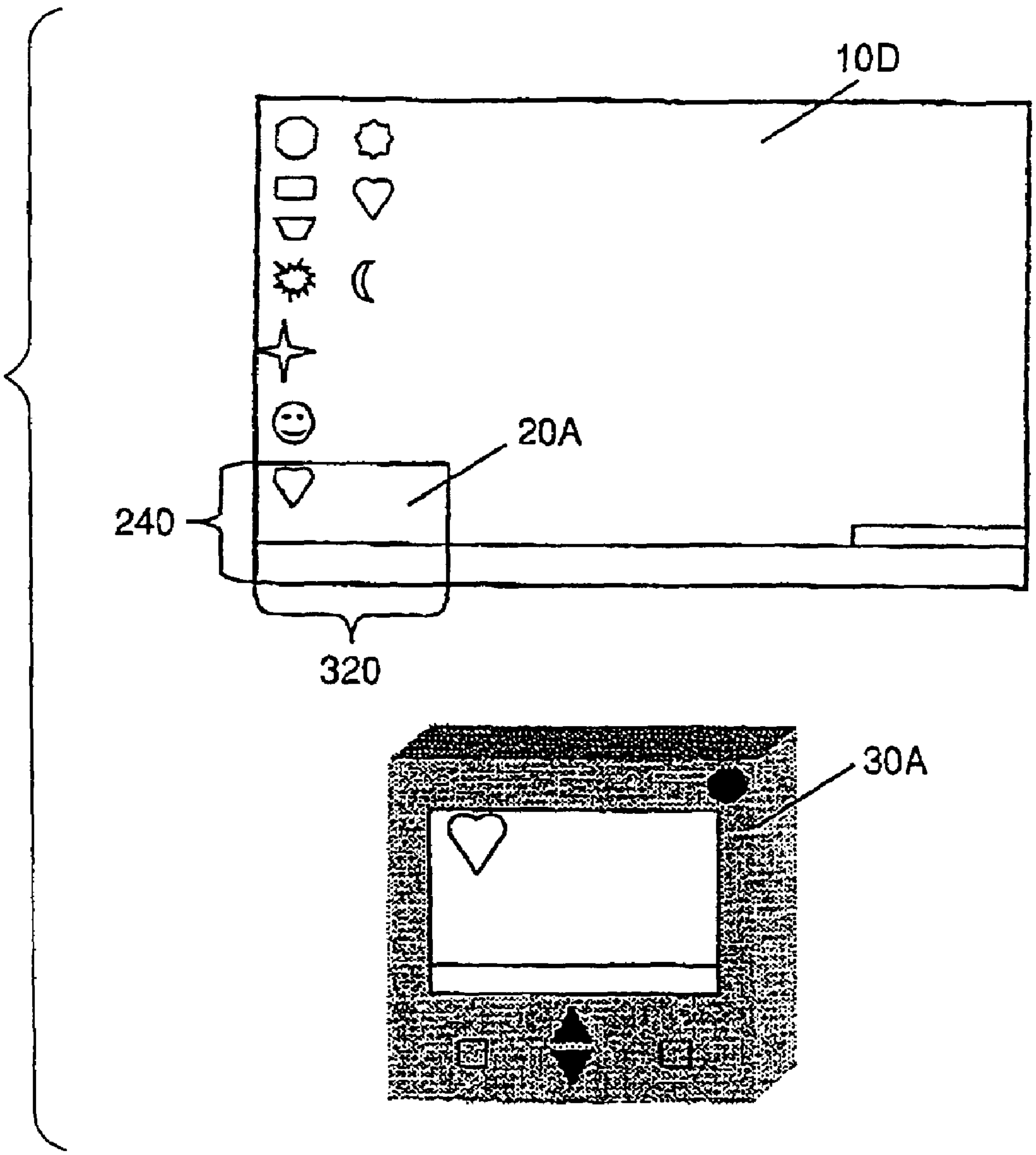
FIG. 36 is a view which shows display images of a computer to be controlled and a control terminal in the embodiment 13 of the invention.

Meanwhile, FIG. 36 shows display images of the computer to be controlled, and the control terminal. In FIG. 36, 10D designates the display part 302C of PC 302, and 20A designates a display image which is displayed by the display part 301B of the terminal 301, and 30A designates the control terminal.

Here, input information analysis processing, which is an operation of the server 302A in case that an operation instruction of a user was carried out from the terminal 301, will be described as follows.

In the input information analysis processing, in case that an operation instruction was carried out from a user in the terminal 301, the control part 301E detects a user input (S1-6), and transmits the input information to the server 302A through the communication part 301C (S1-7), and thereby, an input waiting status is released, and input information analysis processing is started in the server 302A. Meanwhile, the input information in this embodiment becomes a data structure with a format of (input event, coordinate information), but the invention is not limited to this format of input information.

Then, details of the input information analysis processing will be described by use of flow charts from FIGS. 31 to 34.

In the server 302A, the control part 302I receives input information such as a command, which was transmitted through the communication part 302D (S3-1), and the input information, which was received by the control part 302I, is handed over to the information interpretation part 302G, and the interpretation part 302G interprets the input information. That is, it is judged whether the transmitted input information is an operation request to the browser, a request of an OS generation operation, or an end request, and respective processing is carried out. That is, if the input information is the operation request to the browser (S3-2), browser control processing (S3-5) is to be carried out, and if it is the request of the OS general operation (S3-3), OS control processing (S3-6) is to be carried out, and if it is the end request (S3-4), cutoff processing (S3-7) is to be carried out.

The browser control processing, the OS control processing, and the cut-off processing will be described, respectively, along with the flow charts of FIG. 32, FIG. 33, and FIG. 34.

<Browser Control Processing>

Input information for browser control is operational information to a request for activating a browser (hereinafter, called as activation request), a request for changing a display element of the browser (hereinafter, called as display element change), and a request for moving focus of a link which was displayed on the browser (hereinafter, referred to as link selection), which are referred to this embodiment.

Figure 32:
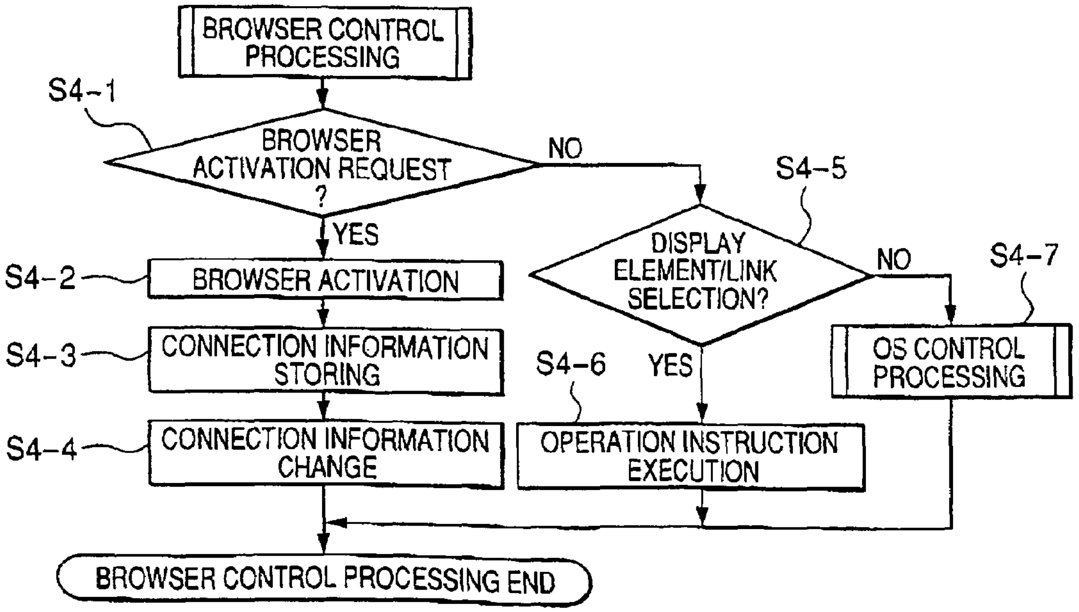
FIG. 32 is a flow chart which shows the operation of the remote control server in the embodiment 12 of the invention.

As shown in the flow chart of FIG. 32, in the browser control processing, the interpretation part 302G judges whether the input information, which was transmitted from the terminal 301, is the activation request (S4-1), and if it is the activation request, it issues a command for activating a browser, which is an application program stored in the storage part 302K (S4-2). Also, it takes out connection destination information of the browser, and stores it in the memory part 302E (S4-3). Further, it changes the connection destination information to an address of the filter (S4-4).

In this embodiment, setup of proxy, which is generally disposed in a browser, and is a mechanism for relaying a HTTP request, a HTTP response, is utilized for setup of the connection destination information. That is, a connection destination of the browser is designated to the filter 303, and proxy setup of the browser is designated to the filter, so as for the filter 303 to be connected to the Web server 304. Normally, the browser saves HTML which was accessed once, in a storage area which is called as a cache, for shortening access time to contents, and carries out display of the contents which were saved at the time of accessing to identical contents. In case that the browser was utilized from the terminal 301, HTML is altered by the filter 303 so as to be matched with a display size of the terminal 301 (which will be described later in alteration processing of HTML by the filter 303), and therefore, after this, in case that the browser of PC 302 was directly operation, but not from the terminal 301, HTML, which is saved in the cache of the browser, in short, which was altered for the terminal 301, is displayed. In sum, the contents are displayed with a form a which is different from an original layout. By updating the cache, it is possible to suppress such a matter that HTML, which was altered for the terminal 301, and saved in the cache, in case that the browser of PC 302 was directly utilized, is displayed on the browser.

Also, in case that it is judged, in S4-1, by the interpretation part 302G that the input information is not the activation request, and it was judged, in S4-5, that it is the display element selection request, or the link selection request, the interpretation part 302G activates the execution part 302, and has an operation instruction, which will be described later, operated (S4-6), and in case that the input information is not the display element selection request, or the link selection request, carries out the above-described OS control processing, and issues a control event of OS (S4-7).

Subsequently, execution of the operation instruction in the display element change, and the link selection, will be described. In case that it was judged, in S4-6, that the input information, which was transmitted from the terminal 301, is the display element change request, the execution part 302F carries out scanning of a next display element of an element which is a display element of HTML, and was now displayed on the display part 301B of the terminal 301. Here, the next display element is to determine a layout of a display element in HTML, in analysis processing of HTML, which will be described later, and is carried out by the filter 303 by use of coordinate information which was extracted at the time of HTML alteration, i.e., which is carried out at the time of alteration of HTML, but a position coordinate on this layout is notified to the server 302A (S2-10), and the server 302A obtains image information on a next display element of one which is displayed on the browser on the basis of this position information, and transmits it to the terminal 301 as described above. Also, on this occasion, the execution part 302F, in case that the next display element is not displayed on the display part 302C, scrolls the display element up to such a position that it is displayed on the display part 302C. That is, the execution part 302F carries out issuance of a scroll event to the browser application through the control part 302L. Display images of the computer to be controlled, and the control terminal, at this time, are shown in FIG. 37.

Figure 37:
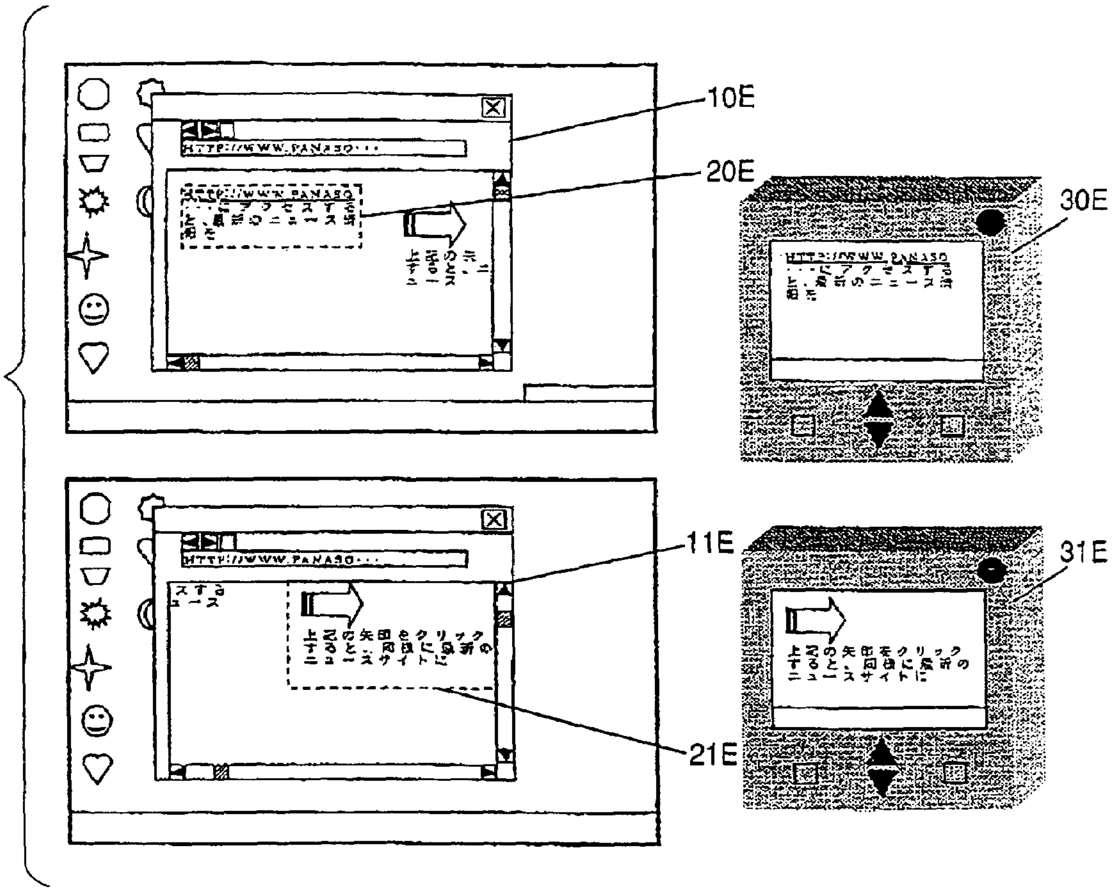
FIG. 37 is a view which shows display images of the computer to be controlled and the control terminal in the embodiment 13 of the invention.

In FIG. 37, 10E designates an appearance of the browser before scroll, and a rectangle 20E, which was surrounded by a dotted line, designates a display element which is selected at that time point, and 30E designates an appearance of display of the terminal 301. Also, 11E designates an appearance of the browser after scroll, and a rectangle 21E, which was surrounded by a dotted line, designates a display element which was selected by a selection operation of a display element, and 31E designates an appearance of display of the terminal 301. Also, in case that it was judged, in S4-6, that input information, which was transmitted from the terminal 301, is the link selection request, the execution part 302F issues an event of link focus movement (normally, incorporated in a browser), to the browser through the control part 302L. On this occasion, the execution part 302F also carries out control for having only a link, which is included in a current display element, executed focus movement. That is, it is carried out by notifying a display position of a link which is included in a display element of the browser, to the server 302A, on the occasion that the filter carries out HTML analysis.

Meanwhile, it may be available even if the execution part 302F is an internal module of the server 302A, or an interpreter for script language which is shown in the embodiment 13, and incorporated in the browser. Also, in this embodiment, it was designed that the obtaining part 302H obtains an image at a coordinate position of an image to be obtained every time a change operation is carried out, but without limiting to this, it may be available even if it is designed that it is to obtain image information in a fixed coordinate area, and obtains image information after a display element was scrolled to the fixed coordinate, every time a display area change operation is carried out, e.g., it always obtain image information from (0, 0) coordinate, by moving a display element, and a scroll bar of the browser to the (0, 0) coordinate of the browser, and by issuing a scroll request to the browser to have it scrolled. A display image of the computer to be controlled at this time is shown in FIG. 37.

Figure 38:
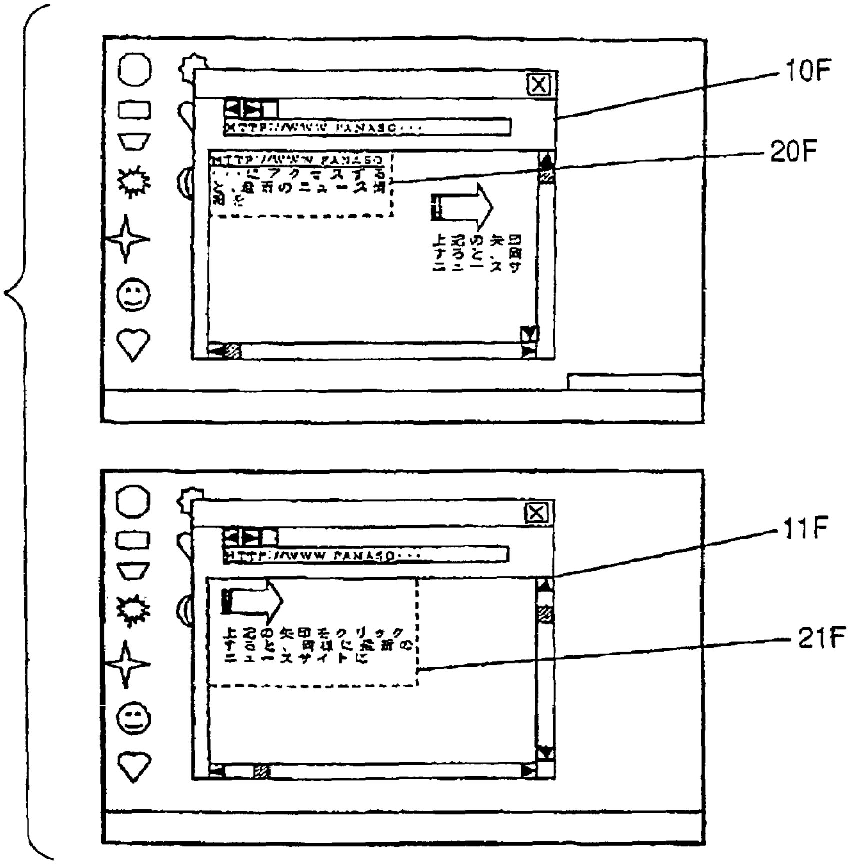
FIG. 38 is a view which shows a display image of the computer to be controlled in the embodiment 13 of the invention.

In FIG. 38, 10F designates an appearance of the browser before display element movement, and a rectangle 20F which was surrounded by a dotted line designates a display element which is selected at that time point. Also, 11F designates an appearance of the browser after display element movement, and a rectangle 21F, which was surrounded by a dotted line, designates a display element which was selected by a selection operation of a display element.

<OS Control Processing>

As shown in the flow chart of FIG. 33, in the OS control processing, an event, which was generated by operating a button of the terminal 301, and a touch panel on LCD, is converted in accordance with an event format conversion table in which it was corresponded to event information of a mouse and a keyboard for operating OS (S5-1). And, the control part 21 issues the event after conversion to the control part 302L as an vent to an OS program (S5-2). For example, describing about such a case that a user tapped twice an icon on a touch panel, input information at this time becomes, for example, ("tap LCD twice", tapped coordinate). And, it is converted in accordance with an event format conversion table as follows. In sum, conversion is carried out to "double click event of a mouse to a predetermined coordinate", and the even after conversion is issued to OS. After that, OS is to carry out processing to the event which was issued.

| Event of Control Terminal | OS Operation Event |
|---|---|
| Tap LCD Once | Single Click of Mouse |
| Tap LCD Twice | Double Click of Mouse |
| Drag LCD | Drag Event of Mouse |

<Cutoff Processing>

Input information for ending is operation information to an end request of a remote control session which is now carried out. When this request is issued from the terminal 301, the server 302A cut off a connection with the terminal 301 through the communication part 302D (S5-1), and in case that the browser was used before that (S5-2; Y), reads out connection information with the browser from the memory part 302E, and returns to a status before use of the terminal 301 (S5-3), and has the browser carried out a re-reading operation (S5-4). Meanwhile, the connection information, which is read out from the memory part 302E in S5-3, is such a thing that the control part 302I saved in the memory part 302E at the time of browser control processing.

By the input information analysis processing which was shown above, remote control from the terminal 301 to PC 302 becomes possible in the remote control system.

Next, an operation of the filter 303 for altering contents to be displayed on the browser, in order to enable operation control of the browser at the time of remote control, will be described by use of the flow chart of FIG. 35.

When the browser is activated, through the input information analysis processing from the terminal 301, and access to contents is started, the browser of PC 302 carries out a connection to the filter 303, through the communication part 302D, and issues the HTTP request which is the content obtaining request.

The filter 303 accepts this connection request through the communication part 303A (S6-1), and further, receives the HTTP request (S6-2). The HTTP request is configured by a request row and a header row, and the request row includes a request method and address information (URL: abbreviation of Uniform Resource Locators), and version information of HTTP protocol.

Here, URL means address information on Internet of contents which is requested, and takes a format of use protocol+ server address+position information of contents on a server. Also, the header row is configured by header name+":"+ header value. The HTTP request has different specifications (formats) in case of requesting to the proxy, and in case of requesting directly to the Web server. Thus, the filter 303, when it receives the HTTP request, activates the HTTP analysis part 303D and analyzes the HTTP request, and converts the request for proxy into a format of requesting directly to the Web server 304 (6-3). A conversion result is saved in the memory part 303B. Meanwhile, in this embodiment, described is such a case that a connection setup of the browser becomes a setup of requesting directly to the Web server 304, but to begin with, in case that the browser is set up in such a manner that it is connected through a proxy, alteration of the HTTP request is not carried out, and the HTTP request is simply relayed to a proxy server.

Subsequently, the control part 303H transmits the HTTP request, which was saved in the memory part 303B, to the Web server 304 through the communication part 303A (S6-5). As a result of that, the Web server 304 is to transmits a HTTP response, which is content data requested by the HTTP request, and the filter 303 receives the HTTP response, which was transmitted by the Web server 304, through the communication part 303A (S6-6).

And, the control part 303H activates the HTTP analysis part 303D, and analyzes the HTTP response, in order to take out HTML data which is actual content data from the received HTTP response (S6-7). HTML data of the analysis result is saved in the memory part 303C.

And, the control part 303H activates the HTML analysis part 303F, and analyzes HTML, and saves an analysis result in the memory part 303C (S6-8).

HTML is a language for carrying out structuring of a document by a sign called as a tag, as shown below.

Example of HTML for Expressing Table

```
<HTML> . . . Start tag of HTML
<BODY> . . . Tag which represents a main body portion of HTML
<TABLE> . . . Tag which represents start of the table
<TR> . . . Tag which represents a row of the table
<TD> . . . Tag which represents a cell of the table
        Cell 1 . . . Character string of Cell of Table
</TD> . . . Tag which represents a cell of the table
<TD>
        Cell 2
</TD>
</TR> . . . Tag which represents an end of a row of the table
</TABLE> . . . Tag which represents an end of the table
</BODY> . . . Tag which represents an end of a main body portion
of HTML
</HTML> . . . Tag which represents an end of HTML
```

Figure 39:
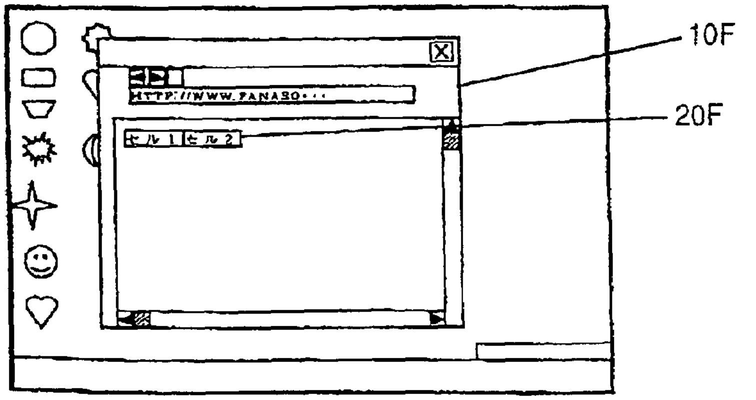
FIG. 39 is a view which shows a display image of the computer to be controlled in the embodiment 13 of the invention.

HTML analysis is to determine how a display element in a structured document id displayed in a display area of the browser, i.e., how the display element is laid out, in addition to analyzing this language structure, and detecting a display element in a document. For example, in HTML which was described in the above-described table, it is displayed on the browser as shown in a display image (10F designates a browser, and 20F designates such an appearance that a table in HTML was displayed) of the computer to be controlled shown in FIG. 39.

Figure 40:
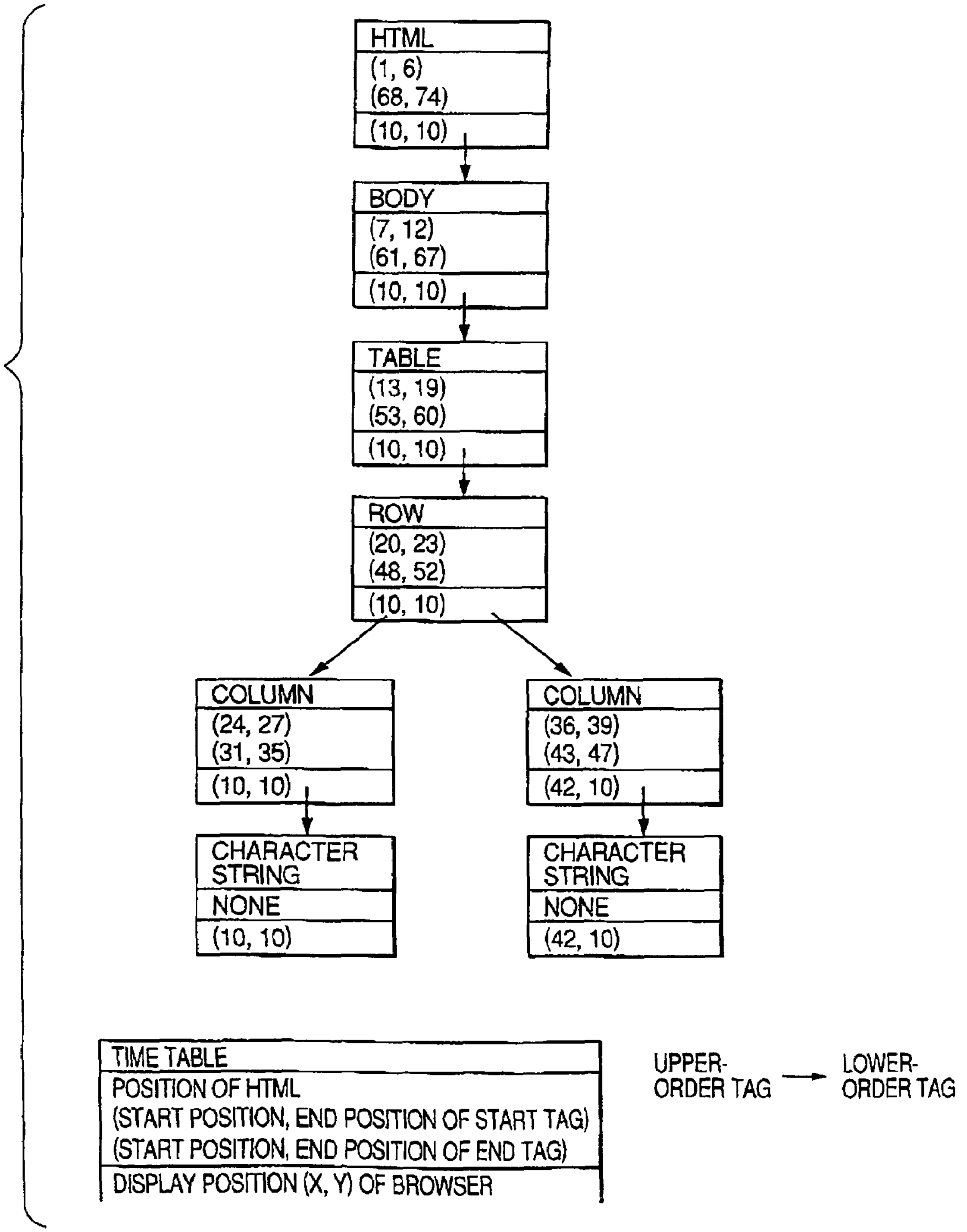
FIG. 40 is a view which shows an image of a data structure of a HTML analysis result in the embodiment 13 of the invention.

Here, determination of the layout is to detects coordinates in the display area of the browser, of character strings “cell 1”, “cell 2” which are display elements. Meanwhile, an image of a data structure as a HTML analysis result is shown in FIG. 40.

Subsequently, the control part 303H activates the HTML conversion part 303G, and carries out conversion processing of HTML to a data structure of the analysis result which was saved in the memory part 303B (S6-9), and saves the result in the memory part 303B.

In the conversion processing of HTML, display elements are grouped so as to be accommodated in a width size of the display part 301B of the terminal 301, and in case that it is not accommodated in the width of the display part 301B, a width of a tag attribute is automatically set up to aggregation of display elements, so as for a size to be accommodated in the width, and a tag is inserted in the vicinity of the display element aggregation of corresponding HTML, and a display position coordinate of the layout after change is changed.

Figures 42, 43:
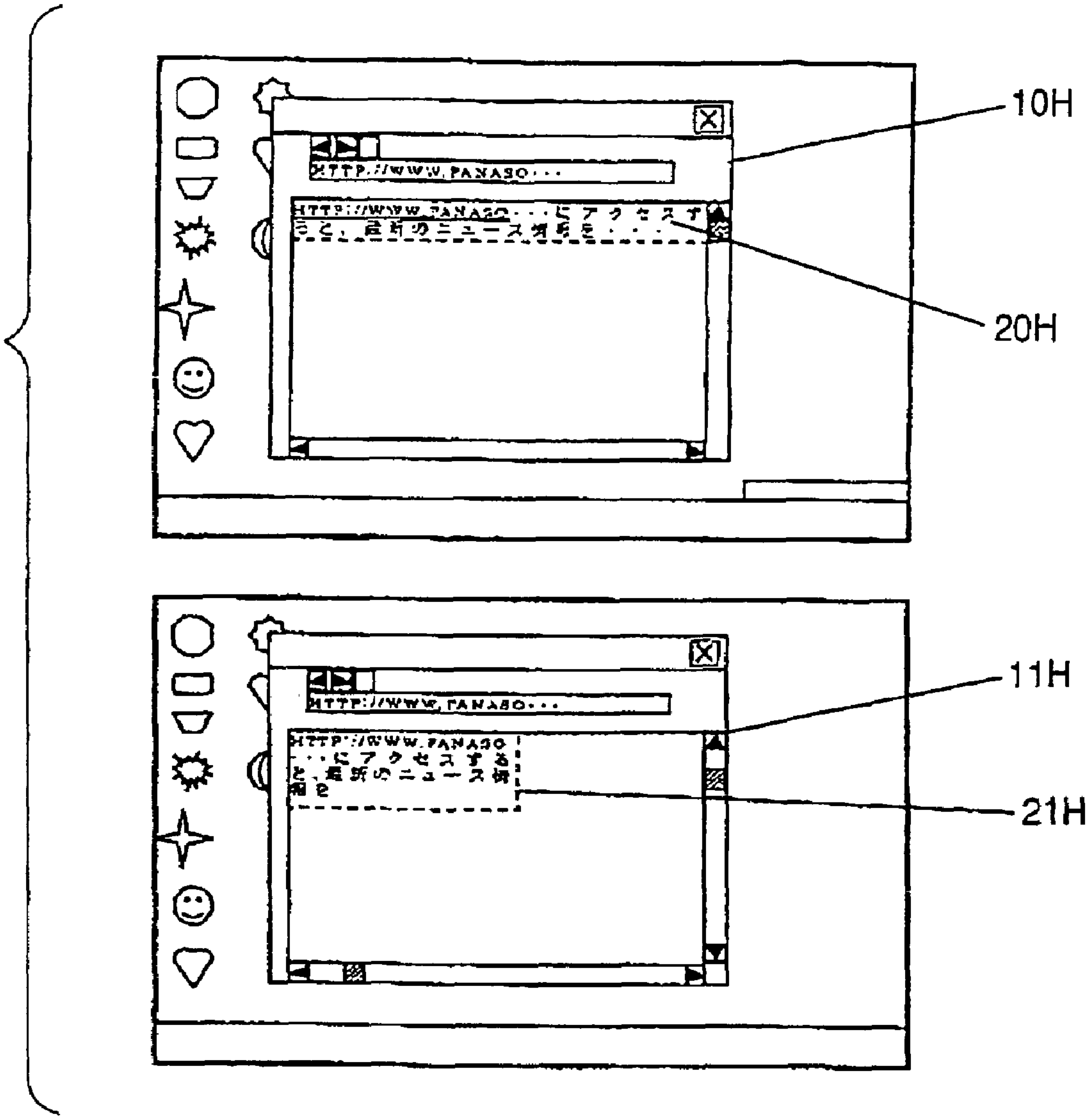
FIG. 42 is a view which shows a display image of a browser before and after HTML alteration in the embodiment 13 of the invention.
FIG. 43 is display position coordinate information which is notified from a filter in the embodiment 13 of the invention.

In this embodiment, a HTML tag called as DIV is set up to a tag for grouping of display elements, and 320 pixels, which is the width of the display part 301B of the terminal 301, is set up to its width attribute. FIG. 41 shows an alteration result of HTML before and after DIV setup at this time (10: before DIV tag setup, 11: after DIV tag setup), and FIG. 42 shows a display image of the browser before and after HTML alteration (10H, 11H: browser, 20H: display element before DIV tag setup, 21H: display element after DIV tage setup).

Meanwhile, in this embodiment, the DIV tag is used for grouping of display elements, but the invention is not limited to utilization of this DIV tag, and it is available even if display elements in HTML are grouped by use of other HTML tags, e.g., TABLE tag and SPAN tag etc.

Subsequently, the HTML conversion part 303G is connected to the server 302A through the communication part 303A, in order to notify display position coordinates of display elements after HTML conversion to the server 302A, and notifies the display position coordinates (S6-10). And, the server 302A receives this notification, and judges whether data, which was transmitted from a connection acceptance status (S2-1) after connection, is information of display position coordinates (S2-9), and saves display position coordinate information, which was received by the control part 302I through the communication part 302D, in the memory part 302E (S2-10). The display position coordinate information, which is notified from the filter 303 at this time, is shown in FIG. 43.

Finally, the control part 303 H activates the HTTP generation part 303E, and generates a HTTP response from the converted HTML (S6-11), and the control part 303H transmits the converted HTTP response through the communication part 303A to the browser (S6-12). And, the transmitted HTTP response is received by the browser of PC 302 through the communication part 302D, and displayed on the display part 302C of PC 302.

As shown above, by inserting HTML tags in display elements of HTML, so as to be accommodated in a width of the terminal 301, in case of viewing display image information which was displayed on the display part 302C of PC 302, from the terminal 301 through a communication line, display elements are displayed in tune with the width of the terminal, and therefore, for example, in case of reading a sentence, eliminated is a necessity to carry out scroll in a lateral direction, and it becomes easy to carry out an operation of the browser in the remote control system. Further, positioning to individual display elements, which were displayed on the browser of PC 302, can be carried out from the terminal by use of a browser control command, and therefore, it is possible to expect significant improvement of operability, as compared to a case of utilizing the terminal 301, over user’s carrying out delicate positioning to an area of display elements.

Embodiment 13

Next, another embodiment of the invention will be described as follows.

In this embodiment, in the operations of control processing of HTML, and HTML alteration of the filter, an interpreter for script language, which was incorporated in the browser, is utilized, and control processing of the browser is carried out by script, and thereby, it is possible to carry out improvement of processing efficiency in case of utilizing a browser in remote control.

Normally, in a browser, an interpreter is incorporated for the purpose of controlling internal data (i.e., the internal data means HTML, and its display elements). By utilizing this interpreter, it is possible to refer, from script, to information such as a display position coordinate of a character string, and an image which are display elements, and so on. In the embodiment 1, it is carried out by such a matter that the filter 303 determines the display position coordinate at the time of analysis of HTML, and its result is notified to the server 302A, and a display element at the display position coordinate is displayed on the terminal 301, at the time of control of the browser, but it is possible to obtain the display element by script of the browser, and display the display image information in a display area on the browser on which the display element was displayed, on the display part 301B of the terminal 301. Therefore, there is no necessity to obtain coordinate information of a display position, as in the embodiment 12, and also, there is no necessity to notify its result to the server 302A, and therefore, it is possible to carry out promotion of efficiency of the analysis processing which the filter carries out, or control processing of the browser.

Figure 44:
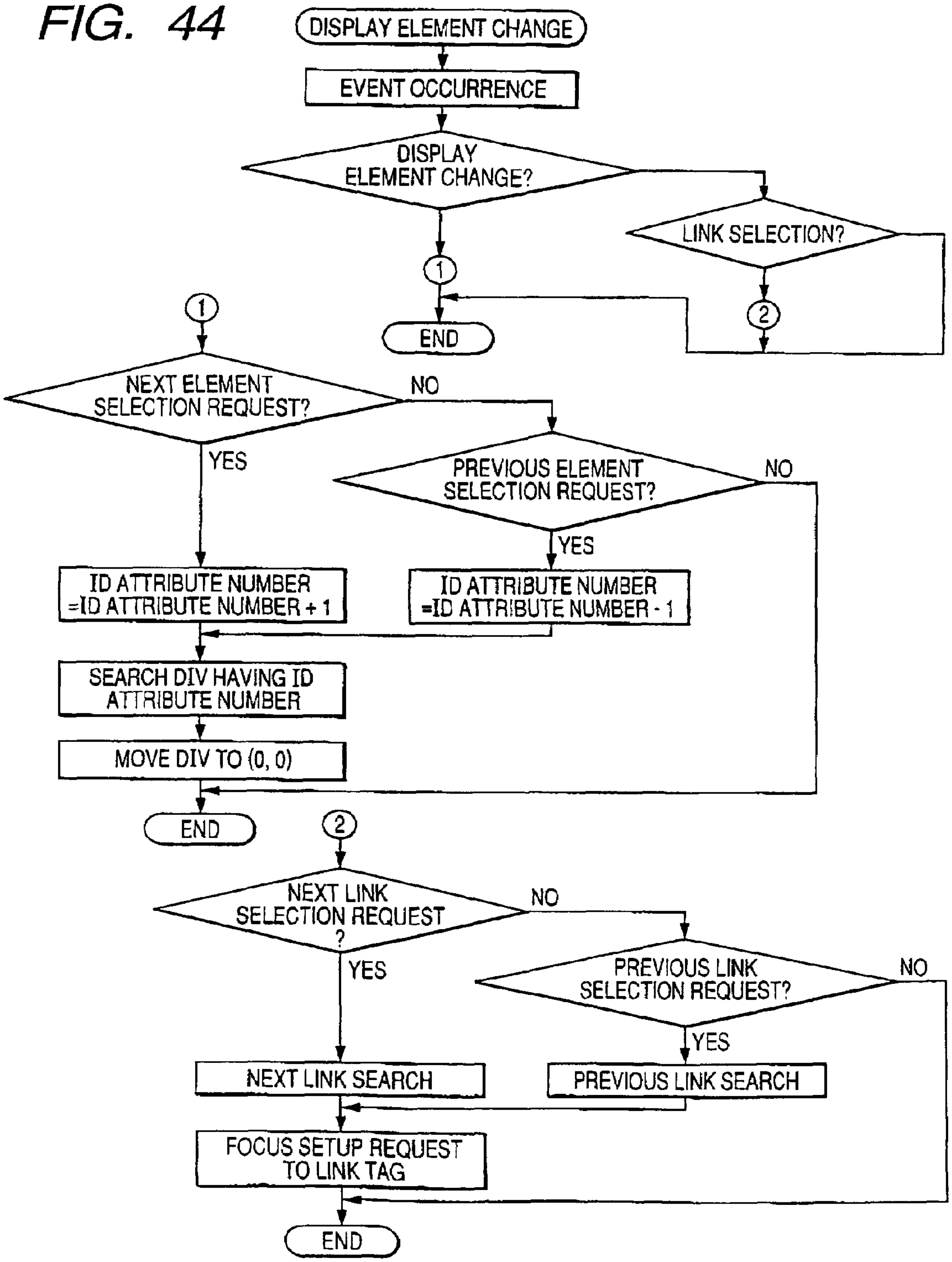
FIG. 44 is a flow chart of a script in the embodiment 13 of the invention

In this embodiment, in S6-9 which is shown in the flow chart of FIG. 35, an identifier attribute is further set up to such the DIV tag that the HTML conversion part 303G used for grouping display elements, and also, script as shown in the flow chart of FIG. 44 is inserted. The browser is to read HTML in which this script was inserted, and when an even for browser control, i.e., a display element and link selection operation request is issued from the terminal 301 to the browser, this script is activated, and the server 302A obtains display image information of corresponding display elements and of an area which is located in a link, and transmits it to the terminal 301, and it is possible to display it on the display part 301B. In sum, as shown in the embodiment 12, when a user issues a control command of the browser from the input part 301A of the terminal 301, a control operation of the browser, which has been carried out by the execution part 302F, becomes possible to be substituted with script.

In sum, by utilizing script, which was incorporated in the browser, for operation control of the browser, eliminated is a necessity to determine display coordinate information of display elements in HTML, or to notify display coordinates to the server 302A, and therefore, processing efficiency on the occasion of carrying out the operation control of the browser is improved, in the remote control system.

Embodiment 14

In the embodiments 11, 13, a selection order of display elements of the browser is dependent on an embedding order of DIV tags, which is carried out in case that a system, i.e., the filter 303 analyzes and alters HTML. For example, in case that analysis of HTML is carried from the beginning of HTML, and DIV tags are set up in such an order that display element appear, the selection order of display elements becomes a marking order due to DIV tags. In case that a display element, which is requested by a user, appears at the beginning of HTML, there is no problem, but there is not necessarily such a rule that the display element, which a user wishes to view, appears at the beginning of HTML. Thus, in this embodiment, a method for making the display element, which a user wishes, selectable directly will be described.

Figure 45:
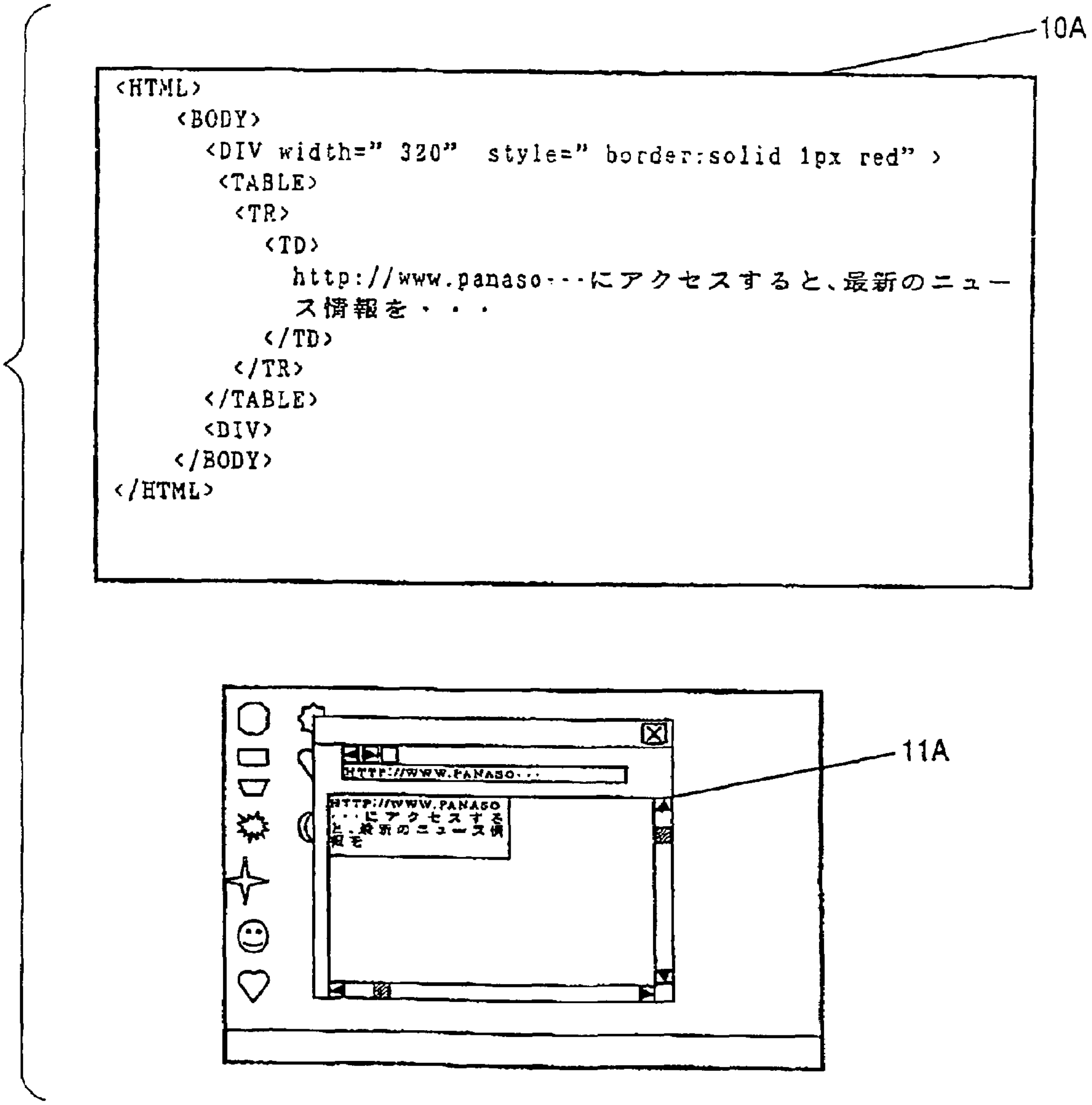
FIG. 45 is a view which shows HTML after alteration, a display image of a browser which displayed HTML after alteration.

In S6-9 of the flow chart shown in FIG. 35, on the occasion that the filter 303 alters HTML, in addition to the method which was shown in the embodiment 1, an attribute for displaying a frame line is further added to the DIV tag, and inserted before and after the display elements, and a result is transmitted to the browser of PC 302. FIG. 45 shows altered HTML (10A) at this time and a display image (11A) of the browser on which the altered HTML was displayed.

Next, in case that a user operated the browser, an operation of the browser control processing shown in the flow chart of FIG. 32 is carried out, and on this occasion, selection of a display element is carried out. For example, assuming that a user carries out an operation of tapping on LCD 305B of the terminal 301 and thereby, an operation of display element selection was generated, the control part 301E is to notify this input information (tap LCD once, coordinate), to the server 302A through the communication part 301C.

And, the server 302A receives this input information, and it is judged in the interpretation part 302G that it is the display element selection operation, and the input information is to be handed over to the execution part 302F. The execution part 302F image-recognizes a frame line which was displayed in a display area of the browser, which exists in the vicinity of coordinate information of this input information, and moves a corresponding area to, for example, the original point coordinate (0, 0). Meanwhile, it is available even if any one of the methods shown in the embodiments 12 through 13 is used for the movement of the area. Also, algorithm of the image recognition is not referred to in the invention, and it is available even if any algorithm is used. In sum, by tap of LCD which a user carried out from the terminal 301, a display area, which exists in the vicinity of a tapped position, is to be displayed on the terminal.

As shown above, by displaying a frame line for a display element, and by searching the frame line, it becomes possible to select a display element, and therefore, it becomes possible to instantaneously select a display element that a user wishes. Also, by displaying the frame line and by recognizing the frame line, efficiency of image recognition processing is also improved, and it becomes possible to search an area of display elements at high speed. Further, as a secondary advantage, it becomes possible for a user to visually recognize that this frame line is a display element, by such a fact that the frame line was displayed, and therefore, for example, it becomes possible to avoid such an erroneous operation that, in case that a user is reading a text of a certain display element, he advances to a next display element by mistake.

Embodiment 15

Figure 46:
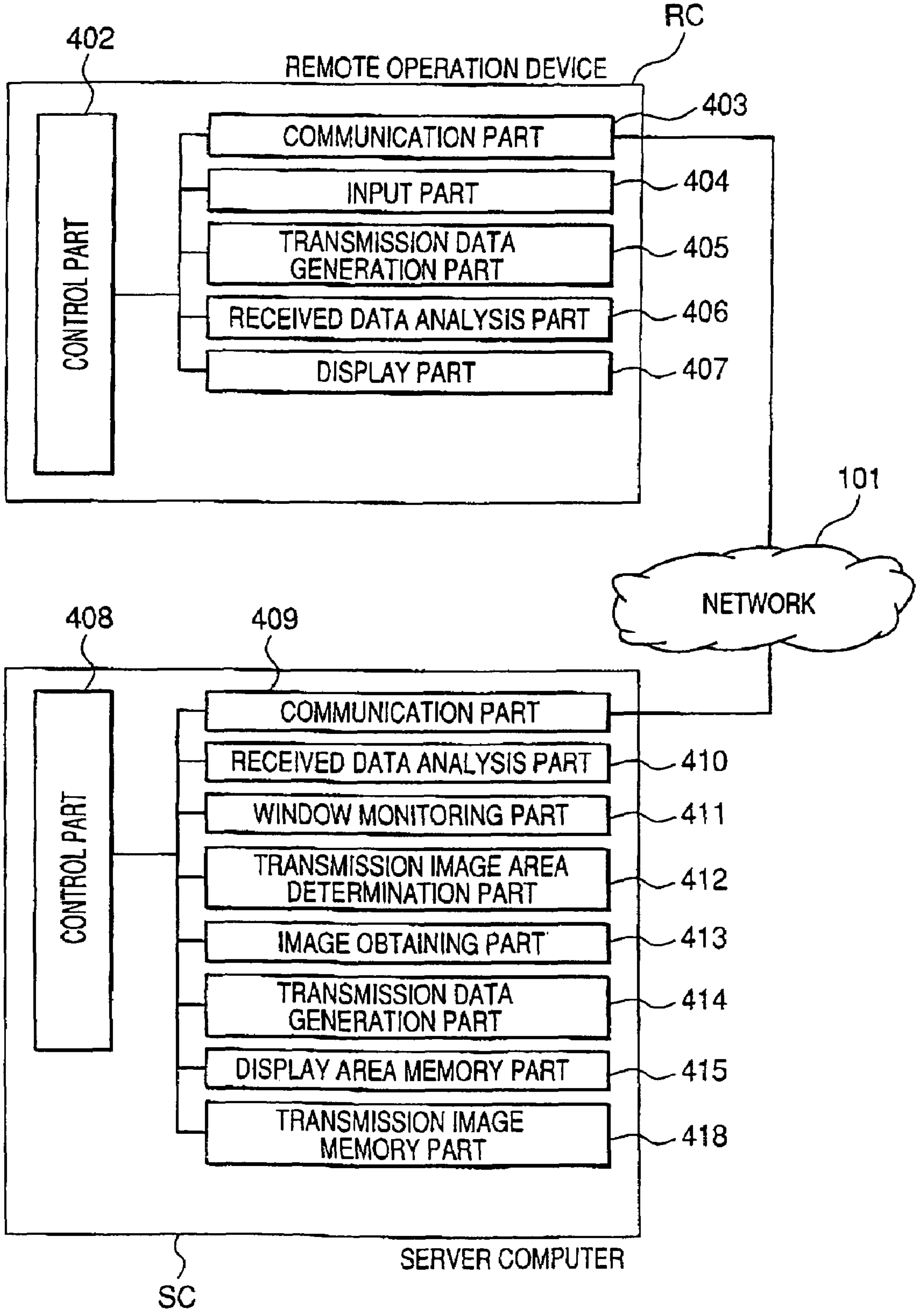
FIG. 46 is a functional block diagram of a remote operation system in an embodiment 15 of the invention.

FIG. 46 is a functional block diagram of a remote operation system in an embodiment of the invention.

In FIG. 46, the remote operation system in this embodiment is of such a configuration that a remote operation device, which is a small size communication terminal, and a server computer are connected so as to be able to carry out data communication, by a communication network 401 such as Internet and LAN.

In FIG. 46, a remote operation device, which is of a control side, has a communication part 403 for carrying out data communication with the server computer through the communication network, an input part 404 for carrying out an operation to an image which was displayed, a transmission data generation part 405 for generating transmission data to the server computer, a received data analysis part 406 for analyzing data which was received from the server computer, and a display part 407 for displaying image data of a display screen which was received from the server computer, and has a control part 402 for controlling these respective parts.

Also, the server computer, which is of a controlled side, has a communication part 409 for carrying out data communication with the remote operation device through the communication network, a received data analysis part 410 for analyzing data which was received from the remote operation device, a message monitoring part (window monitoring part) 411 for obtaining a display message which is issued by OS, a transmission image area determination part 412 for determining an area of a screen which is transmitted to the remote operation device, a screen obtaining part 413 for obtaining screen data which is displayed by the server computer itself, a transmission data generation part 414 for generating transmission data to the remote operation device, and a transmission image memory part 418 for obtaining screen data which was cut out and processed by the transmission data generation part 414, and for storing it temporarily. Further, it has a control part 408 for controlling these respective parts.

Figure 47:
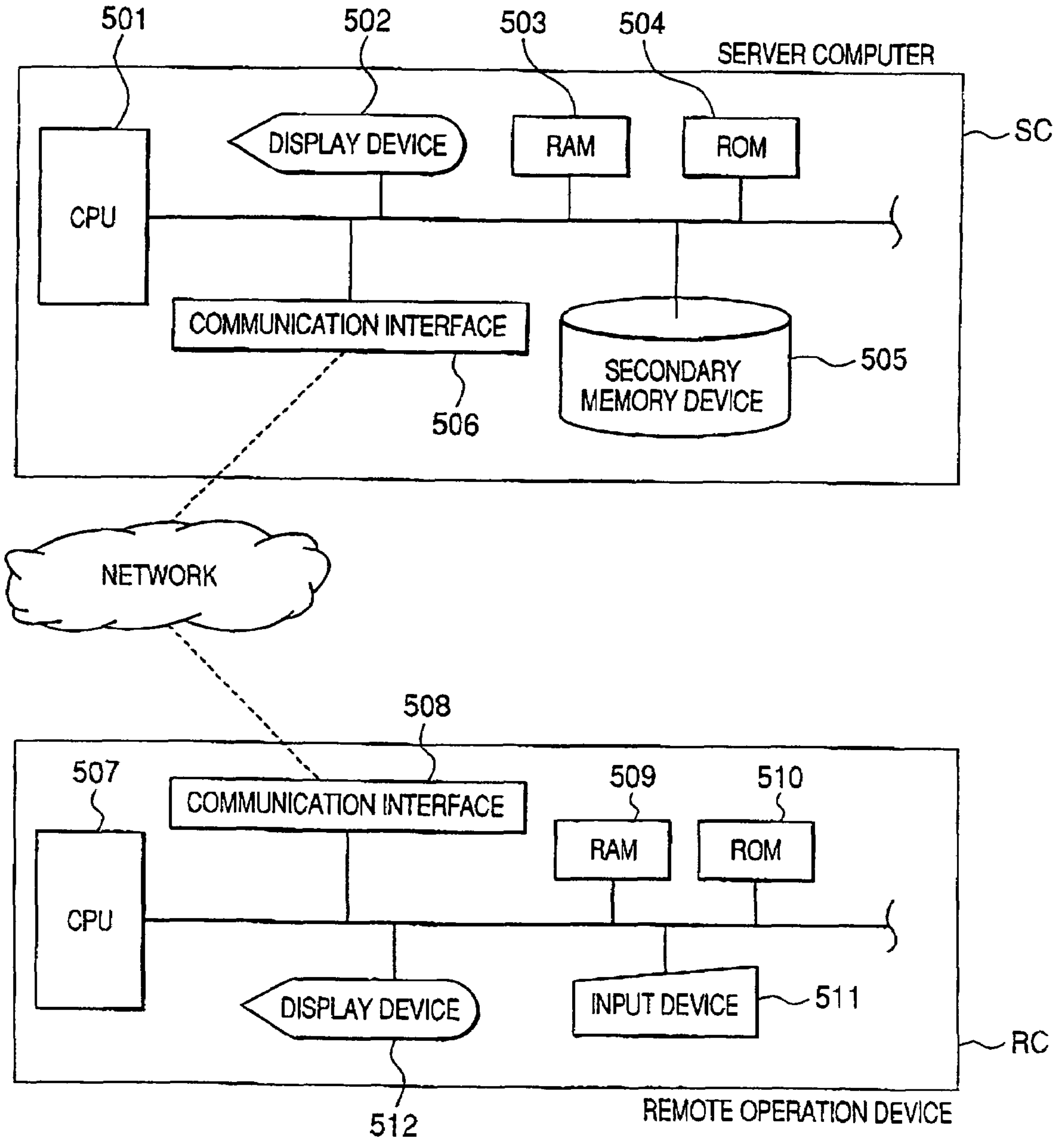
FIG. 47 is a device block diagram of the remote operation system in the embodiment 15 of the invention.

FIG. 47 is a device block diagram of the remote operation system in the embodiment of the invention As shown in FIG. 47, a server computer SC has CPU (Central Processing Unit) 501 for carrying out various programs/data, a display device for displaying data, RAM (Random Access Memory) 503 for storing data temporarily, ROM (Read Only Memory) 504 for storing the program/data which are executed by CPU 501 and other data, and a communication interface 506 for carrying out data communication.

Also, the remote operation device has CPU (Central Processing Unit) 507 for executing various programs/data, a communication interface 508 for carrying out data communication, RAM (Random Access Memory) 509 for storing data temporarily, ROM (Read Only Memory) 510 for storing the program/data which is executed by CPU 507 and other data, an input device 511 for inputting an operation from an operator, and a display device 512 for display data.

A relation of the functional parts shown in FIG. 46 and hardware shown in FIG. 47 will be described. As shown in FIG. 46 and FIG. 47, in the remote operation device, the communication part 403 is realized by the communication interface 508, and the input part 404 is realized by the input device 511, and the display part 407 is realized by the display device 512, and the transmission image memory part 418 is realized by RAM 509, respectively. Also, the transmission data generation part 405, the received data analysis part 406, and the control part 402 are realized by such a matter that CPU 507 executes the program/data which is stored in ROM 510 over exchanging data with ROM 510 and RAM 509.

In the server computer SC, the communication part 409 is realized by the communication interface 506, and the received data analysis part 410, the message monitoring part 411, the transmission image area determination part 412, the image obtaining part 413, the transmission data generation part 414, and the control part 408 is realized by such a matter that CPU 501 executes a control program which is stored in the secondary memory device 505 over exchanging data with ROM 504 and RAM 503.

Meanwhile, the display device is a thing which makes clearly understandable that a screen, which is displayed on the server computer, is displayed on the remote operation device, and there is no problem even if it is eliminated in a practical sense.

Also, in the remote operation device and the server computer, various program/data, which are executed by CPUs 501 and 507, may be of such a mode that a thing, which has been stored in the device in advance, is executed, and may also be of such a mode that a thing, which is stored in a recording medium having portability, or a thing, which was downloaded through the communication network, is read out and executed.

As to the remote operation system which was configured as described above, its operation will be hereinafter described as follows.

Figure 48:
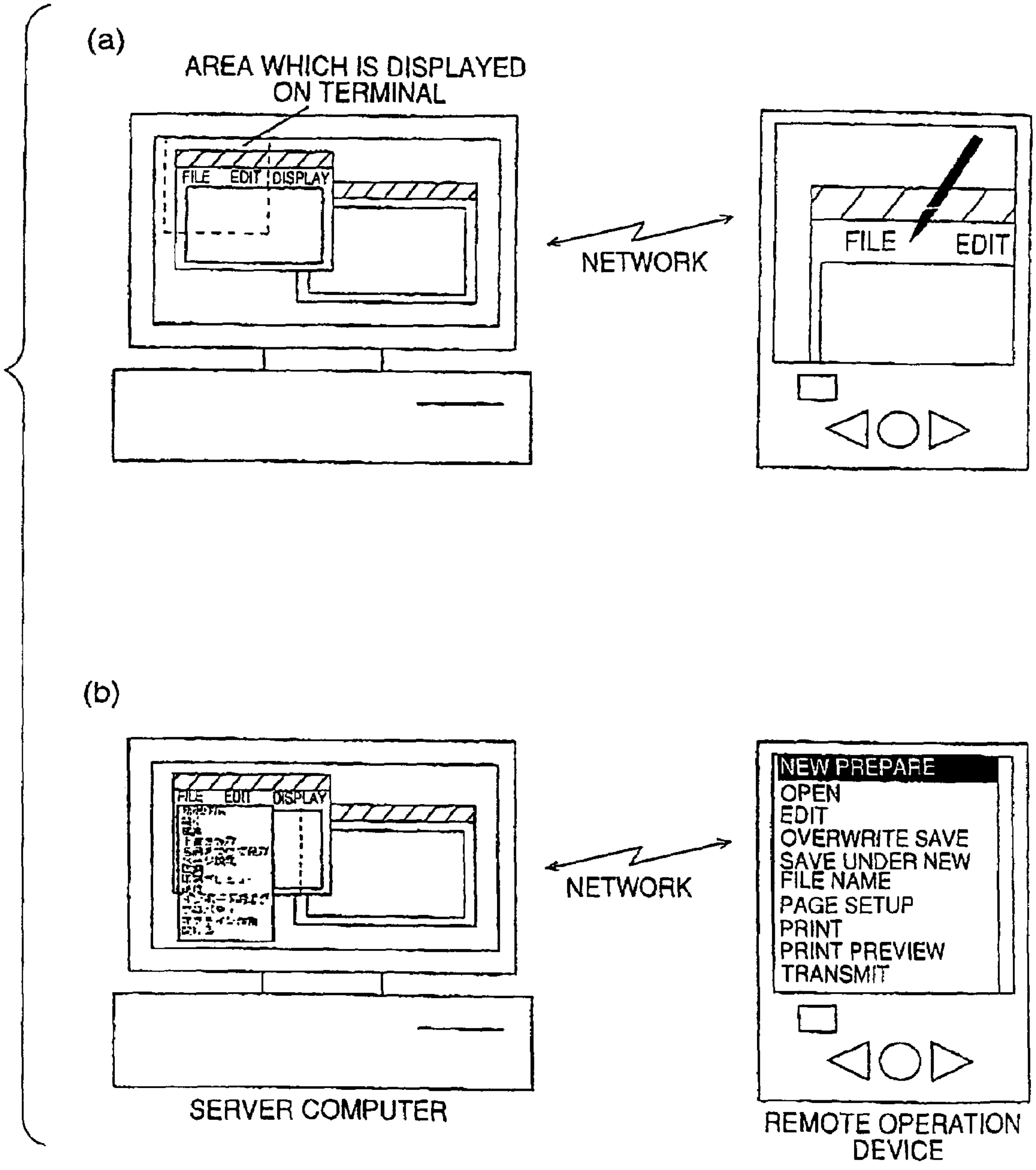
FIG. 48 is a view which shows one example for matching a display area with a menu which was opened and for displaying it on a remote operation apparatus in the remote operation system in the embodiment 15.

FIG. 48 is a view which shows one example of coordinating an opened menu with a display area and displaying it on the remote operation device in the remote operation system in the embodiment 15, and FIG. 48(*a*) shows such a status that a part of a display screen of the server computer is displayed on the remote operation device. Also, FIG. 48(*b*) shows a part of the display screen of the server computer, and such a status that a menu of a certain window was opened.

Meanwhile, in the example shown in FIG. 48, a user uses a stylus pen for opening the menu. Besides the example of using the stylus pen, it is available even if a device such as a cursor key for operating a mouse cursor is attached to the remote operation device, and the menu is opened by it, and also, an exclusive button for opening the menu is attached, and any part for opening the menu is no object.

As shown in FIG. 48, in case that a user of the remote operation device carries out an operation for opening any menu (menu regarding a file) in a certain window, in such a status (FIG. 48(*a*)) that it is possible to carry out a remote operation of the server computer from the remote operation device, coordinate information, which a user indicated by the stylus pen, is sent to the server computer.

The server computer, after the message monitoring part 411 detects an instruction for opening the menu of that window, displays the menu which was opened on the display device of the server computer. Therewith, the server computer obtains image data to be transmitted to the remote operation device including a display area of the menu, and transmits the image data to the remote operation device, and the remote operation device displays the received image data (FIG. 48(*b*)).

Concretely speaking, as shown in FIG. 48(*b*), the transmission image area determination part 412 conforms a upper left coordinate of a rectangular area of a menu area which a user newly opened, to a upper left corner of the display device of the remote operation device, and sets up a lateral width and a height of the display device of the remote operation device, beginning at the upper left coordinate of the rectangular area of the menu area, as a new transfer area.

Meanwhile, by utilizing Application Program Interface (hereinafter, referred to as API) of an OS which is used, it is possible to obtain rectangular area information of a window. Since a menu is one kind of windows, it is possible to know the upper left coordinate, and the lateral width, the height of the rectangular area of the menu area which was newly opened, by utilizing API. Beginning at this upper left coordinate of the rectangular area of the menu area which was newly opened, a new transfer area is to be set up.

In FIG. 48(*b*), the transfer area, which was newly set up, is shown by a broken line. An image of this new transfer area is once stored in the transmission image memory part 418. And, the image data, which was stored in this transmission image memory part 418, is transmitted to the remote operation device. Here, there may be such a case that a vertical direction of the menu display area which was newly opened is not completely accommodated on a screen of the display device of the remote operation device, and a user has to carry out scroll in a longitudinal direction, but a lateral direction scroll is unnecessary so that a burden of a user is reduced.

Meanwhile, in the concrete example shown in FIG. 48, it shows such an appearance that a pull-down menu of the window is opened, but it is all right even if it is a menu which is opened by a right click of a mouse. Also, in case of Windows(R) of Microsoft(R) Corporation, it is all right even if it is a start menu, and a type of a menu is no object.

Figure 49:
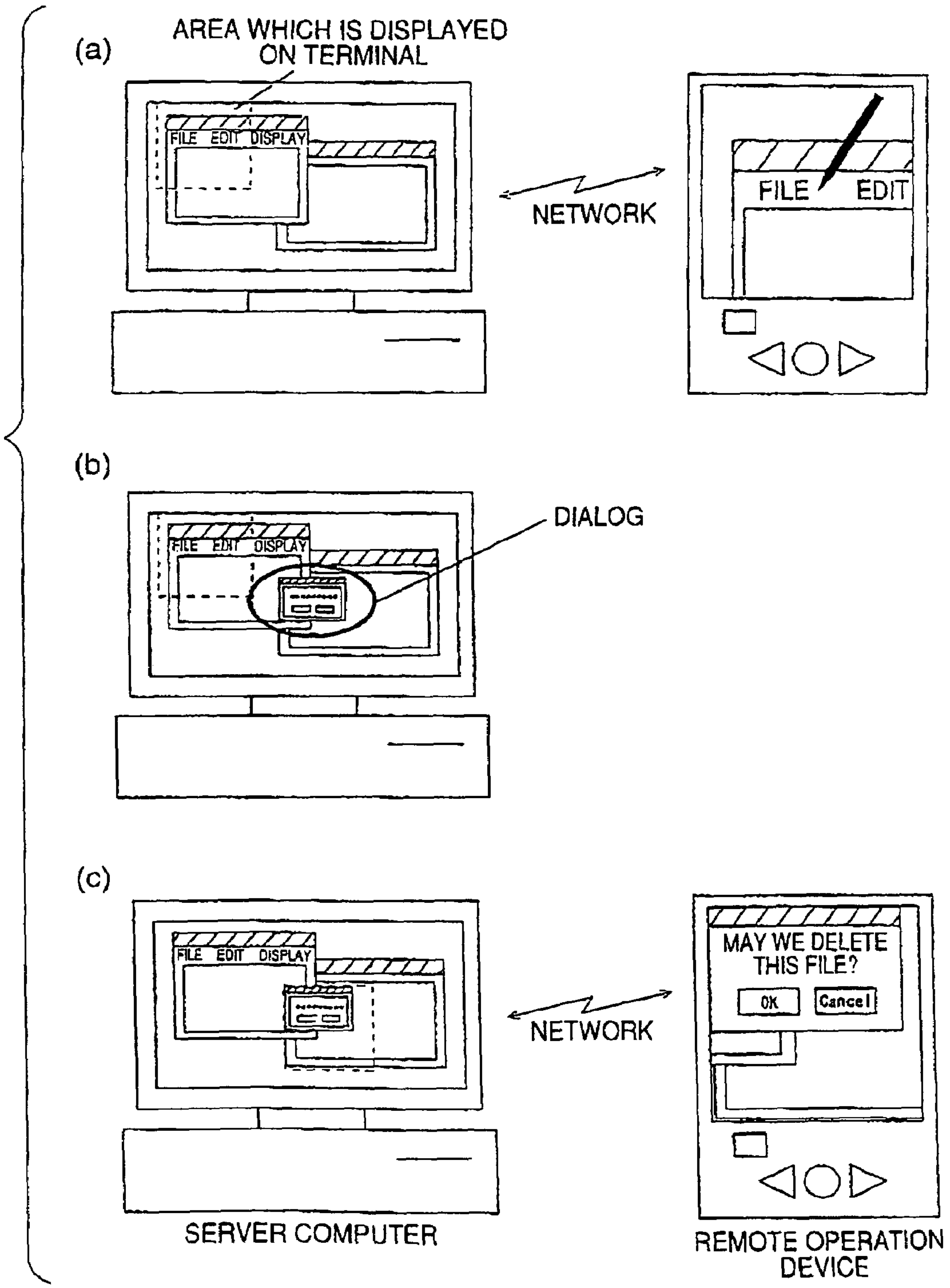
FIG. 49 is a view which shows one example for matching a display area with a dialog which was opened and for displaying it on the remote operation apparatus in the remote operation system in the embodiment 15.

Next, FIG. 49 is a view which shows one example of conforming a dialog which was opened, with a display area and displaying it on the remote operation device in the remote operation system in the embodiment 15, and FIG. 49(*a*) shows such a status that a part of a display screen of the server computer is displayed on the remote operation device. Also, FIG. 49(*b*) shows a part of the display screen of the server computer, and such a status that a certain dialog was opened.

Also, FIG. 49(*c*) shows such a status that the display area is conformed with the opened dialog and displayed on the remote operation device.

Next, processing as to such a case that a dialog was opened at a position which was deviated from the display area of the remote operation device, by an operation on the remote operation device, or by an application on the server computer regardless of a user's intention, in such a status that a remote operation of the server computer from the remote operation device is possible (FIG. 49(*a*)) as shown in FIG. 49, will be described as follows. When the dialog was opened at the position which was deviated from the display area of the remote operation device (FIG. 49(*b*)), in the server computer, the message monitoring part 411 detects that the dialog was opened, and it obtains image data in tune with a display area of the dialog, and transmits the image data to the remote operation device, and the remote operation device displays the received image data (FIG. 49(*c*)). Meanwhile, by evacuating coordinate information which shows a display area of the remote operation device at the time before the dialog was opened, it is possible to easily turn the display back.

Concretely speaking, as shown in FIG. 49(*c*), the transmission image area determination part 412 conforms a upper left coordinate of a rectangular area of a menu area which a user newly opened, to a upper left corner of the display device of the remote operation device, and sets up a lateral width and a height of the display device of the remote operation device, beginning at the upper left coordinate of the rectangular area of the menu area, as a new transfer area.

Meanwhile, by utilizing API of OS, in the same manner as the description of FIG. 48, it is possible to obtain rectangular area information of a window, and therefore, beginning at this upper left coordinate of the rectangular area of the menu area which was newly opened, a new transfer area is to be set up.

In FIG. 49(*c*), the transfer area, which was newly set up, is shown by a broken line. An image of this new transfer area is once stored in the transmission image memory part 418, and the image data, which was stored in this transmission image memory part 418, is transmitted to the remote operation device. By this, even in case that the dialog was opened at a position which was deviated from the display area of the remote operation device regardless of user's intention, the dialog is to be displayed on the display device of the remote operation device, and therefore, there is no case that a user misses out on important information, warning as to file deletion etc.

Figure 50:
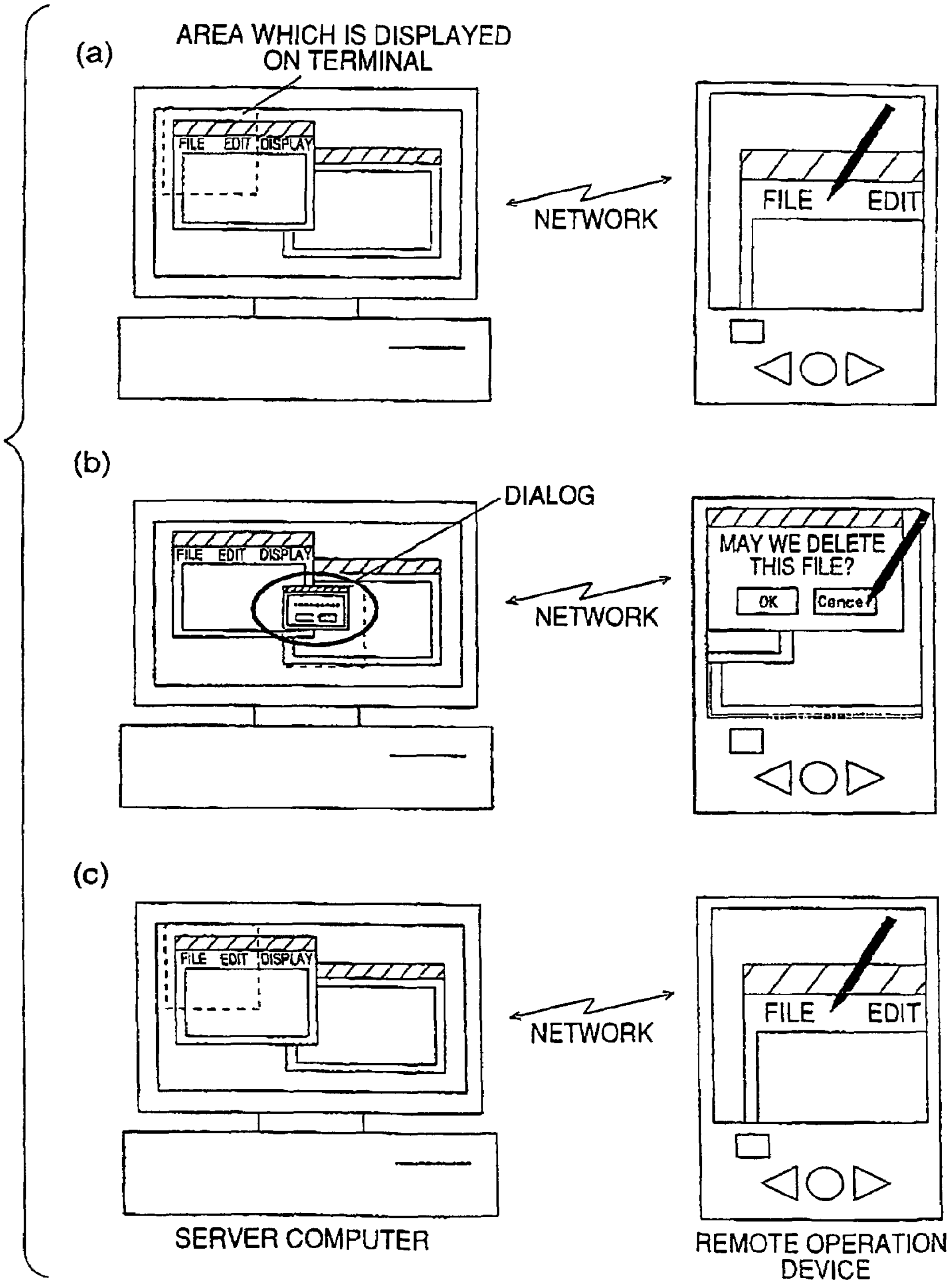
FIG. 50 is a view which shows one example for returning to an original display area at the time that the dialog was closed and for displaying it on the remote operation apparatus in the remote operation system in the embodiment 15.

Next, FIG. 50 is a view which shows one example of turning back to the original display area when the dialog was closed and displaying it on the remote operation device in the remote operation system in the embodiment 15, and FIG. 50(*a*) shows such a status that a part of a display screen of the server computer is displayed on the remote operation device. Also, FIG. 50(*b*) shows such a status that the dialog is opened on the server computer, and a display area is coordinated with the dialog and displayed on the remote operation device. Also, FIG. 50(*c*) shows such a status that, when the dialog was closed, the display area is turned back to the status of FIG. 50(*a*) and displayed on the remote operation device.

As shown in FIG. 50, when the dialog was displayed on the server computer, in such a status that a remote operation of the server computer from the remote operation device is possible (FIG. 50(*a*)), display area storing means 415 evacuates the area which was displayed in (FIG. 50(*a*)), and the display part 407 displays it on the remote operation device, coordinating the display area with the dialog (FIG. 50(*b*)).

Meanwhile, a method of coordinating the display area with the dialog is similar to the description of FIG. 49, and it is possible to obtain area information of a dialog which was newly opened, by utilizing API of OS, and therefore, beginning at this upper left coordinate of the rectangular area of the menu area which was newly opened, a new transfer area is to be set up.

Next, when a user of the remote operation device carries out an operation for closing the dialog (e.g., coordinate instruction by a stylus), the instruction is sent to the server computer. The server computer detects the instruction for closing the dialog, and reads out the area which was evacuated in accordance with it, and transmits an image of the area to the remote operation device, and thereby, it is possible to continuously carry out a work at the time right before the dialog is opened (FIG. 50(*c*)).

Figure 51:
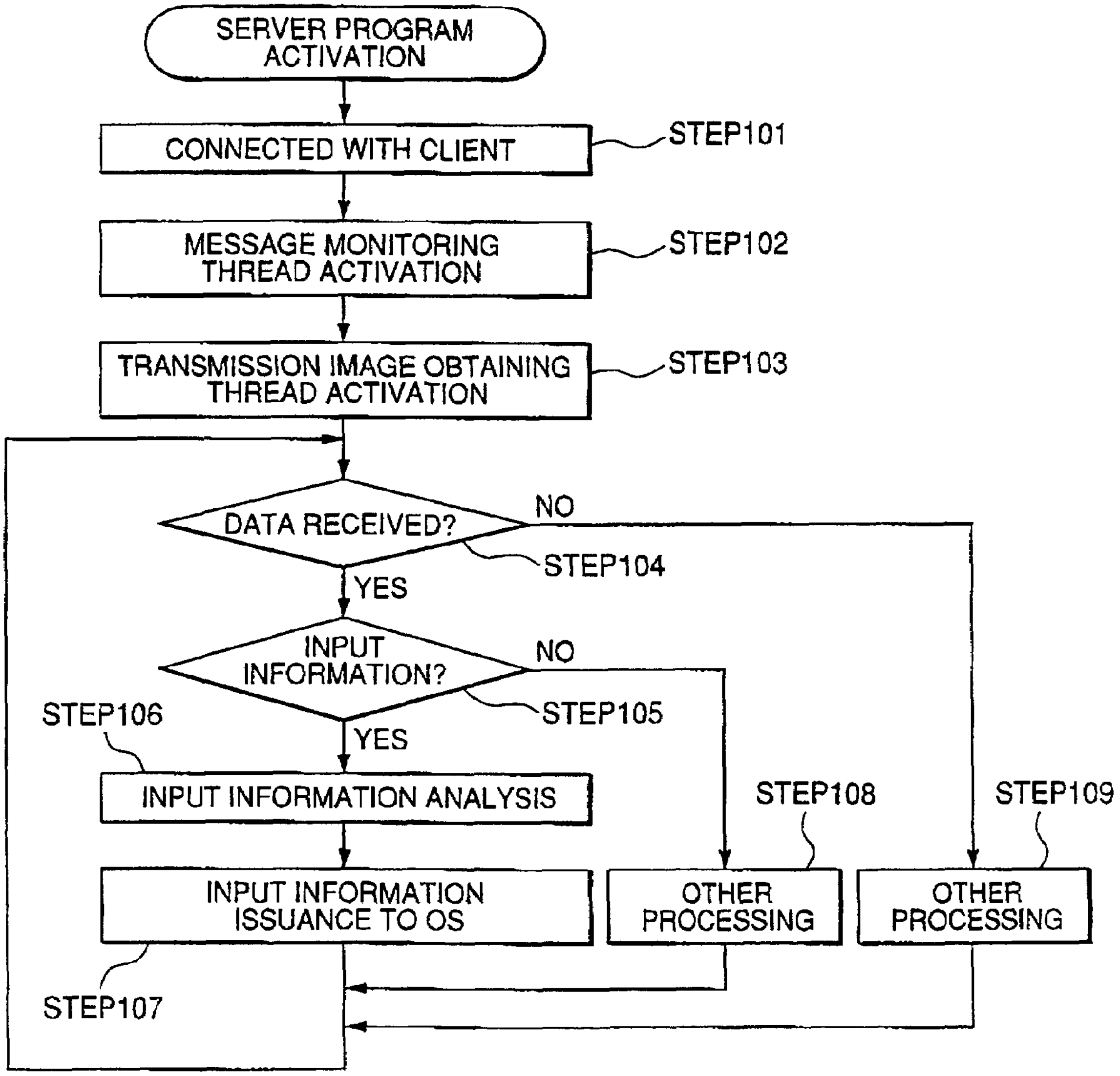
FIG. 51 is a flow chart which shows an operation at the time that a server computer received data such as input information from the remote operation apparatus in the remote operation system in the embodiment 15.
Figure 52:
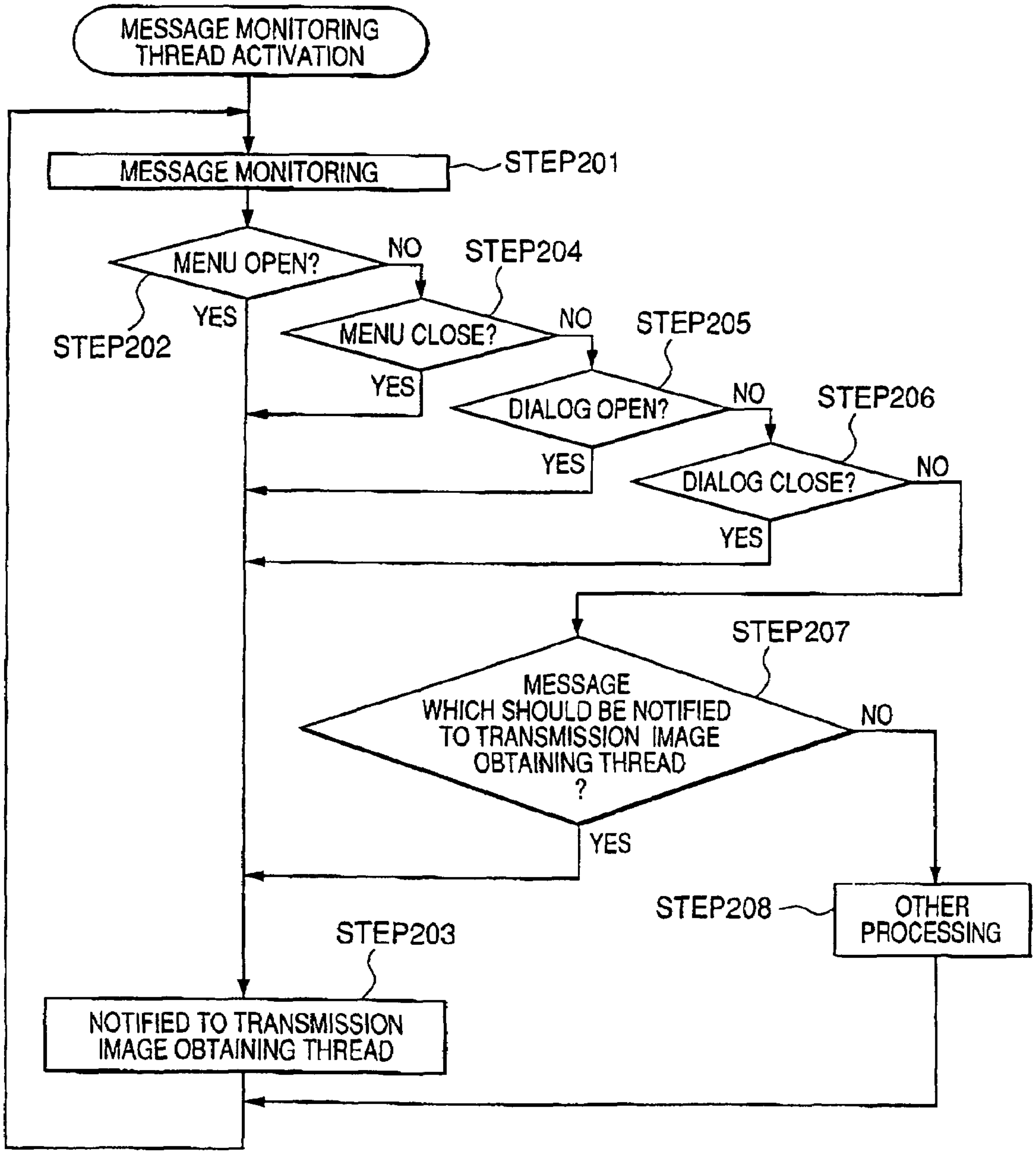
FIG. 52 is a flow chart which shows an internal operation at the time that the server computer detected opening and closing of the menu and the dialog in the remote operation system in the embodiment 15.
Figure 53:
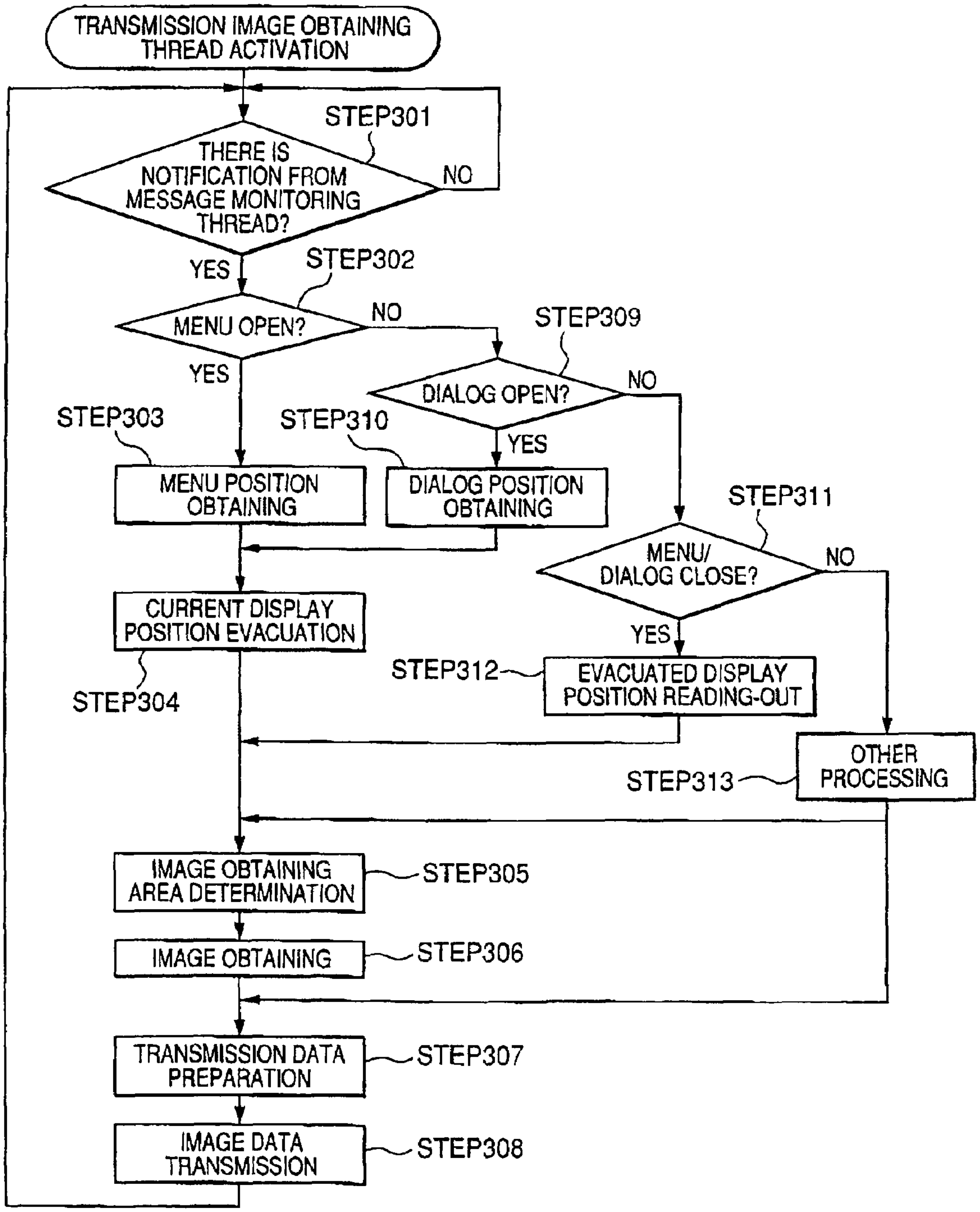
FIG. 53 is a flow chart which shows an operation at the time that the server computer detected opening and closing of the menu and dialog, until it transmits an image to the remote operation apparatus, in the remote operation system in the embodiment 15.

FIG. 51, FIG. 52 and FIG. 53 are operational flow charts of the remote operation system in the embodiment 15 of the invention, and are thins which showed operations of the server computer which is of a controlled side. Flows of operations which are shown in the above-described FIG. 48 and FIG. 50 will be described in detail by use of the flow charts of FIG. 52 and FIG. 53.

FIG. 51 is a flow chart which shows an operation at the time that the server computer received data such as input information from the remote operation device in the remote operation system in the embodiment 15. In FIG. 51, shown is a flow of such processing that, when a connection with the remote operation is established, after the server computer was activated, a message monitoring thread for monitoring a message which is issued by OS, and a transmission image obtaining thread for obtaining image data to be transmitted to the remote operation device are activated, and thereafter, input information from the remote operation device is received.

As shown in FIG. 51, after a server program was activated, a user activates the remote operation device in a step 101, to connect it to the server computer, and the communication part 409 establish the connection. As connection procedures, detailed description will be omitted.

In a step 102, the message monitoring part 411 activates the message monitoring thread for monitoring a message which is issued by OS. The message monitoring thread will be described in FIG. 52.

In a step 103, the transmission image area determination part 412 determines an area of an image to be transmitted to the remote operation device, and processes image data which was obtained, and activates the transmission image obtaining thread for transmitting it to the remote operation device. The transmission image obtaining thread will be described in FIG. 53.

In a step 104, the communication part 409 received data which is transmitted from the remote operation device.

In a step 105, the received data analysis part 410 carries out analysis of the received data, and judges whether or not it is input information from the remote operation device.

In case that the received data is input information, in a step 106, the received data analysis part 410 carries out analysis of a content of the input information, and converts it into an appropriate format to OS like a mouse event or a key event, and in a step 107, the received data analysis part 410 issues input information to OS. At this time, OS carries out an operation in accordance with the issued input information there is such a possibility that the operation of OS is various operations such as a character input, a position change of a window, and in this embodiment, such an operation that a menu and a dialog are displayed will be described. For example, in the remote operation device, in case that an input operation, which is comparable to a left click of a mouse in a menu item coordinate of a window which is displayed, was carried out, the step 106 converts it into a left click event of a mouse, and in the step 107, issues that event to OS. As a result of that, OS carries out an operation for displaying a menu.

On one hand, in case that, in the step 105, the received data is other than the input information, there is a necessity for the server computer to carry out separate processing in a step 108, but here, a detailed explanation will be omitted.

Also, in case that there is no data which is transmitted from the remote operation device in the step 104, the server computer carries out separate processing in a step 109, but here, a detailed explanation will be omitted.

As a result of the above-described operations, it results in such a status that a user's input operation in the remote operation device was reflected on the server computer.

FIG. 52 is a flow chart for explaining the message monitoring thread which functions in the server computer in the remote operation system in the embodiment 15, and shows monitoring of a message which OS issues, and an internal operation when opening and closing of a menu and a dialog were detected. Then, by use of FIG. 52, a mechanism of detecting timing of open or close of a menu and a dialog will be described.

When a connection with the remote operation device is established, the message monitoring thread is activated (step 102 shown in FIG. 51), and it activates the message monitoring part 411 (step 201), and hooks the message that OS issues. The hook is a programming language, and indicates, for example, processing for poaching a message that OS issues to a certain window.

In a step 202, the message monitoring part 411 judges whether or not the hooked message is a message regarding menu open. In case that it is the message regarding menu open, it issues, in a step 203, a notification message showing that menu open was detected, to the transmission image obtaining thread which was activated in the step 103 of FIG. 51.

Hereinafter, in a similar fashion, in a step 204, the message monitoring part 411 judges whether or not the hooked message is a message regarding menu close, and in case that it is the message regarding menu close, it issues, in a step 203, a notification message showing that menu close was detected, to the transmission image obtaining thread.

In a step 205, the message monitoring part 411 judges whether or not the hooked message is a message regarding dialog open, and in case that it is the message regarding dialog open, it issues, in the step 203, a notification message showing that dialog open was detected, to the transmission image obtaining thread.

In a step 206, the message monitoring part 411 judges whether or not the hooked image is a message regarding dialog close, and in case that it is the message regarding dialog close, it issues, in the step 203, a notification message showing that dialog close was detected, to the transmission image obtaining thread.

The above-described messages which are notified to the transmission image obtaining thread in the step 202 through the step 206 include information showing that an event to which menu or dialog was generated.

In a step 207, the message monitoring part 411 judges whether or not the hooked message is a message which should be notified to the transmission image obtaining thread, other than open or close of the menu and the dialog, and in case that it is the message which should be notified, it carries out, in the step 203, issuance of a notification message to the transmission image obtaining thread.

In a step 208, in case that there is no necessity to notify the hooked message to the transmission image obtaining thread in particular, another separate processing is carried out, but here, a detailed explanation will be omitted.

As a result of the above-described operations, when a user's open or close operation of the menu and the dialog in the remote operation device was reflected on the server computer, or when the menu or the dialog was opened or closed, by an application on the server computer, regardless of user's intention, it becomes possible for the server program to detect open or close of the menu and the dialog.

FIG. 53 is a flow chart for explaining the transmission image obtaining thread which functions in the server computer in the remote operation system in the embodiment 15, and shows operations up to transmitting an image to the remote operation device, when the menu and the dialog was opened or closed by an input operation by the remote operation device, and an operation of an application on the server computer.

Hereinafter, on the basis of FIG. 53, a mechanism of coordinating an area of an image which is transmitted to the remote operation device with a display position of the menu or the dialog, or turning back to an original display position, after open or close of the menu and the dialog were detected.

When a connection with the remote operation device is established, the transmission image obtaining thread is activated (step 103 shown in FIG. 51). When the transmission image obtaining thread is activated, a notification message from the message monitoring part 411 is received in a step 301.

In a step 302, in case that the notification message from the message monitoring thread shows menu open, the transmission image area determination part 412 obtains, in a step 303, display position information of the menu which is opened, from information which is included in the notification message. The display position information here is, for example, a upper left coordinate and horizontal and vertical sizes of a rectangle of the menu.

In a step 304, the transmission image area determination part 412 evacuates information of an area coordinate of an image which is now displayed on the remote operation device by storing it in the display area memory part 415.

The evacuated display area is used when the menu which is opened was closed. Meanwhile, it is all right even if the number of display areas to be evacuated is plural. For example, in case of a menu, there is a status of opening menu in a staircase pattern by opening a menu A through a sub menu B, and further opening a sub menu C, and when the menu A was opened, an area R1, which was displayed at the last minute, is evacuated, and then, when the sub menu B was opened, an area R2 which was displayed at the last minute, i.e., a display area of the menu A is evacuated, and then, when the sub menu C was opened, an area R3 which was displayed at the last minute, i.e., a display area of the sub menu is evacuated.

In a step 305, the transmission image area determination part 412 seeks an area of an image which is transmitted to the remote operation device, from display position information of the menu which was obtained in the step 303, and a display size of the remote operation device.

In a step 306, the image obtaining part 413 obtains the image in the area which was sought, and in a step 307, the transmission data generation part 414 carries out conversion of the obtained image data into a format for transmitting to the remote operation device, and in a step 308, transmits image data from the communication part 409 to the remote operation device.

In a step 309, in case that a notification message from the message monitoring thread shows dialog open, the transmission image area determination part 412 obtains, in a step 310, display position information of a dialog which is being opened.

Later processing is similar to the case of menu open, and processing is shifted to the step 304.

Also, in a step 311, in case that a notification message from the message monitoring thread shows menu close or dialog close, in a step 312, the transmission image area determination part 412 reads out an area which was evacuated when a closed menu or a dialog was opened, from the display area memory part 415.

Later processing is similar to the case of menu open, and processing is shifted to the step 305, and an area which was read out in the step 312 is applied as an image area to be transmitted which is determined in the step 305.

On one hand, in case that a notification message from the message monitoring thread has nothing to do with the menu and the dialog, there is a necessity to carry out separate processing in a step 313, but here, since there is no relation, an explanation will be omitted.

By the operations as described above, an image, which was accorded with a display position of the menu or the dialog, which was opened in accordance with a user's input, is transmitted to the remote operation device.

In this manner, according to the remote operation system of this embodiment, when a menu or a dialog was opened, by user's operation from the input device of the remote operation device, or by an operation of an application on the server computer regardless of user's intention, it is possible to display an image which existed at a display position of the menu or the dialog which was opened, on the display device of the remote operation device, and also, when the menu and the dialog were closed, it is possible to return display back to an area which was operated at the last minute, and therefore, it becomes possible to improve operability of the system.

Embodiment 16

Next, another embodiment of the invention will be described along with the drawings.

Figure 54:
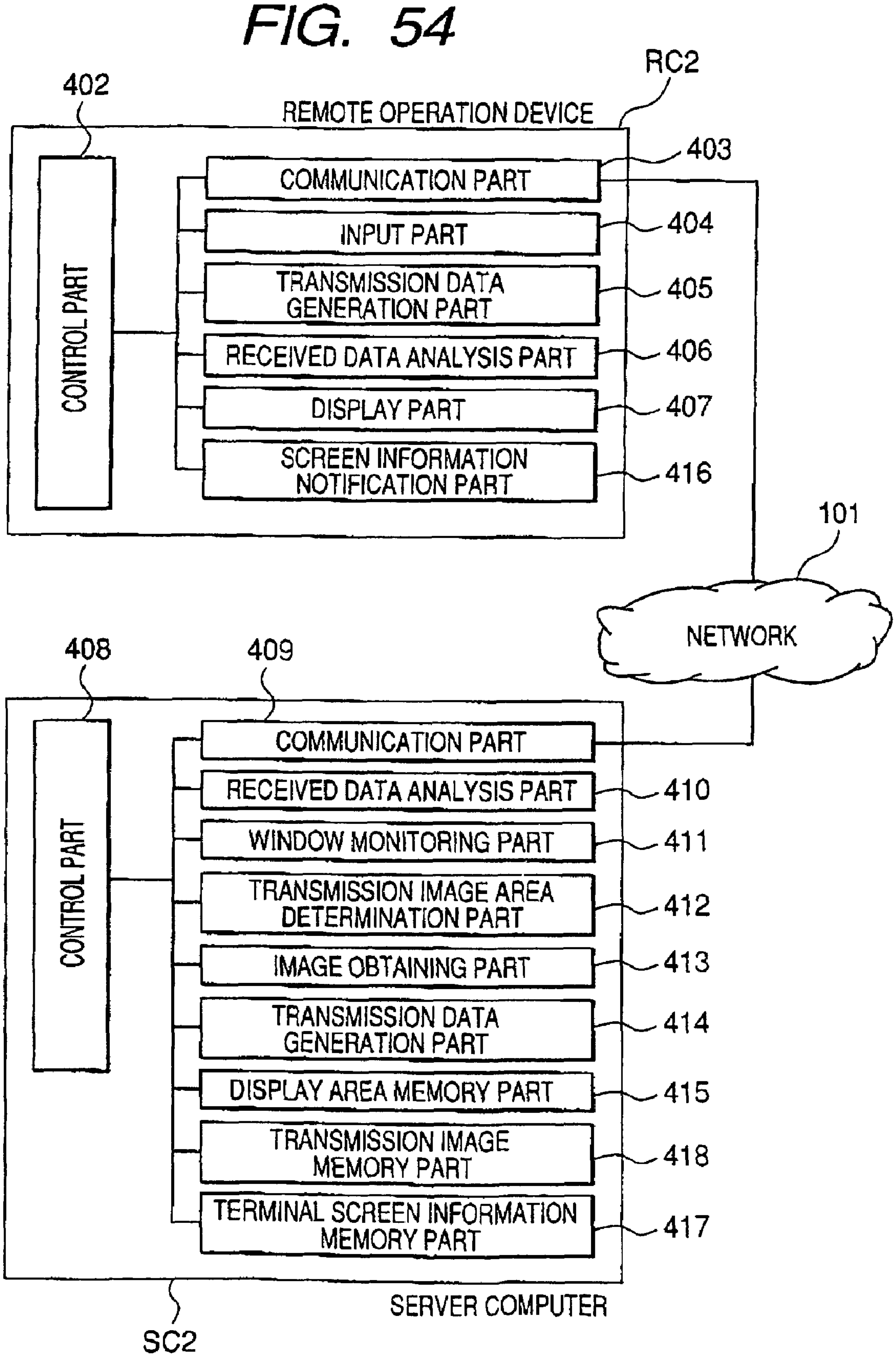
FIG. 54 is a functional block diagram of a remote operation system in an embodiment 16 of the invention.

Meanwhile, in FIG. 54, a functional block diagram of the embodiment is shown, and it is a diagram that, to the remote operation device in FIG. 46, an image information notification part 416 for notifying information of the display device of the remote operation device to the server computer is added to the remote operation device was added, and a terminal screen information memory part 417 for storing information regarding display capability of the display device of the remote operation device which is notified from the remote operation device to the server computer was added. The information regarding the display capability is information such as a screen size, resolution, number of colors of the display device of the remote operation device. Meanwhile, a device block diagram of the remote operation system in this embodiment is similar to FIG. 47, and therefore, an explanation will be omitted.

Figure 55:
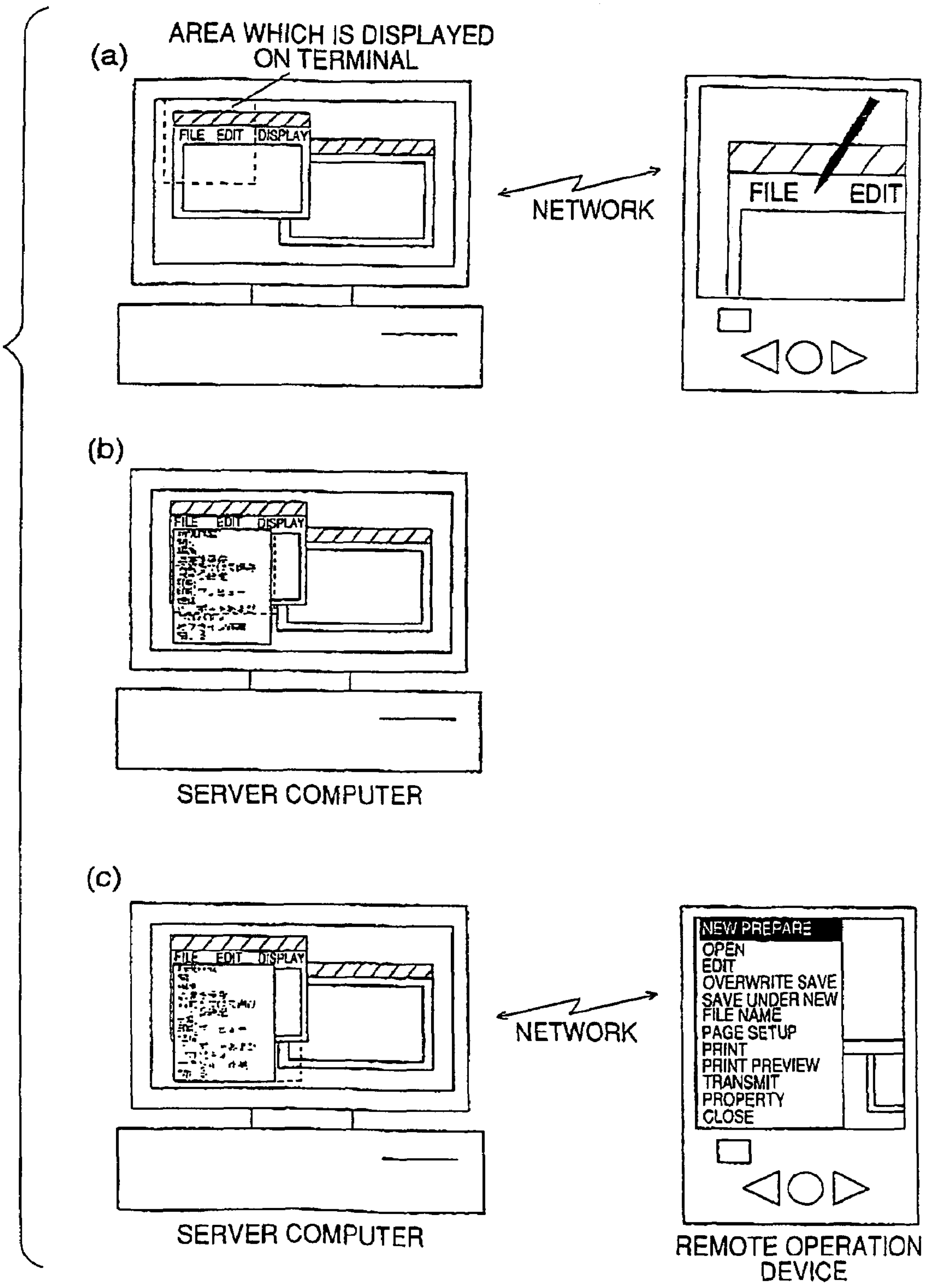
FIG. 55 is a view which shows one example for displaying a full picture of a menu which was opened, on a remote operation apparatus, in the remote operation system which relates to the embodiment 16.

FIG. 55 is a view which shows one example for displaying a full picture of a menu which was opened, on the remote operation apparatus, in the remote operation system which relates to the embodiment 16, and FIG. 55(*a*) shows such a status that a part of a display screen of the server computer is displayed on the remote operation device. Also, FIG. 55(*b*) is a part of the display screen of the server computer, and shows such a status that a menu of a certain window was opened. At this time point, an image of such a status that a menu was opened has not yet been transmitted to the remote operation device.

FIG. 55(*c*) shows such a status that a display area was expanded in such a manner that an entirety of a menu which was opened is displayed on the remote operation device. As shown in the figure, a display area (broken line of FIG. 55(*c*)) is taken widely so as for the entirety of the opened menu to be displayed on the remote operation device, and an image, to which processing of reduction etc. was applied, is transmitted to the remote operation device. In this manner, in the remote operation system of the embodiment 16, with reference to screen information which has been recorded in the terminal screen information memory part 417, an area is set up in such a manner that the entirety of the opened menu is displayed on the remote operation device.

As shown in FIG. 55, when an operation for opening any menu of a window is carried out by the remote operation device, in such a status that a remote operation of the server computer from the remote operation device is possible (FIG. 55(*a*)), that information is sent from the remote operation device to the server computer. The server computer detects an instruction for opening a menu of that window, and opens a menu screen in accordance with it, and obtains image data in tune with a size of the menu. And, the image obtaining part 413 or the transmission data generation part 414 reduction-processes the image data to such a size that it is accommodated in the display device of the remote operation device, and transmits it to the remote operation device, and the remote operation device displays the received image data on the display part 407 (FIG. 55(*c*)).

Here, the reduction process means processing for reducing an image on the occasion that the image obtaining part 413 obtains an image, or on the occasion that the transmission data generation part 414 generates transmission data, in such a manner that a size of a menu becomes a size which is equivalent to a terminal screen size, if a size of the obtained menu is compared with the terminal screen size which has been saved in the terminal screen information memory part 417, and the size of the menu is larger than the terminal screen size. Meanwhile, by utilizing API of OS which is used, it is possible to obtain a size of a menu, The suchlike flow of an operation shown in FIG. 55 will be described by use of the flow chart of FIG. 54 which was described in the embodiment 15, and flow charts of FIG. 56 and FIG. 57.

Figure 56:
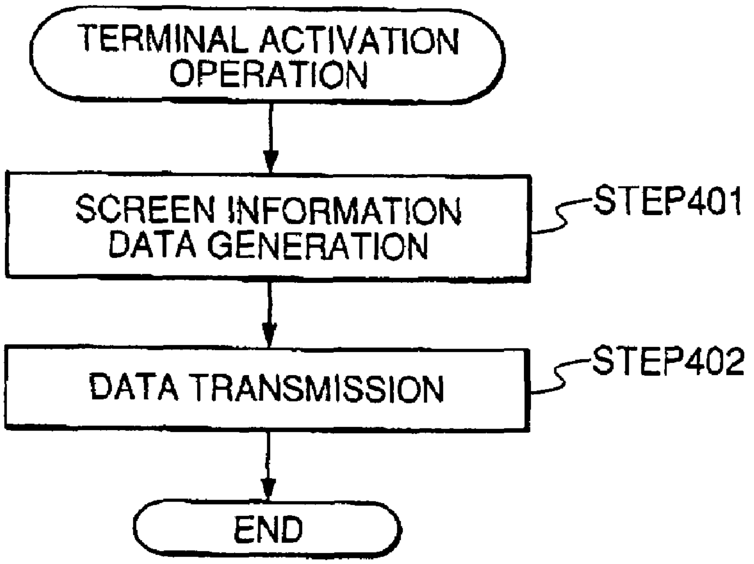
FIG. 56 is a flow chart which shows such an operation that the remote operation apparatus transmits information which is specific to a display apparatus, to a server computer, in the remote operation system in the embodiment 16.
Figure 58:
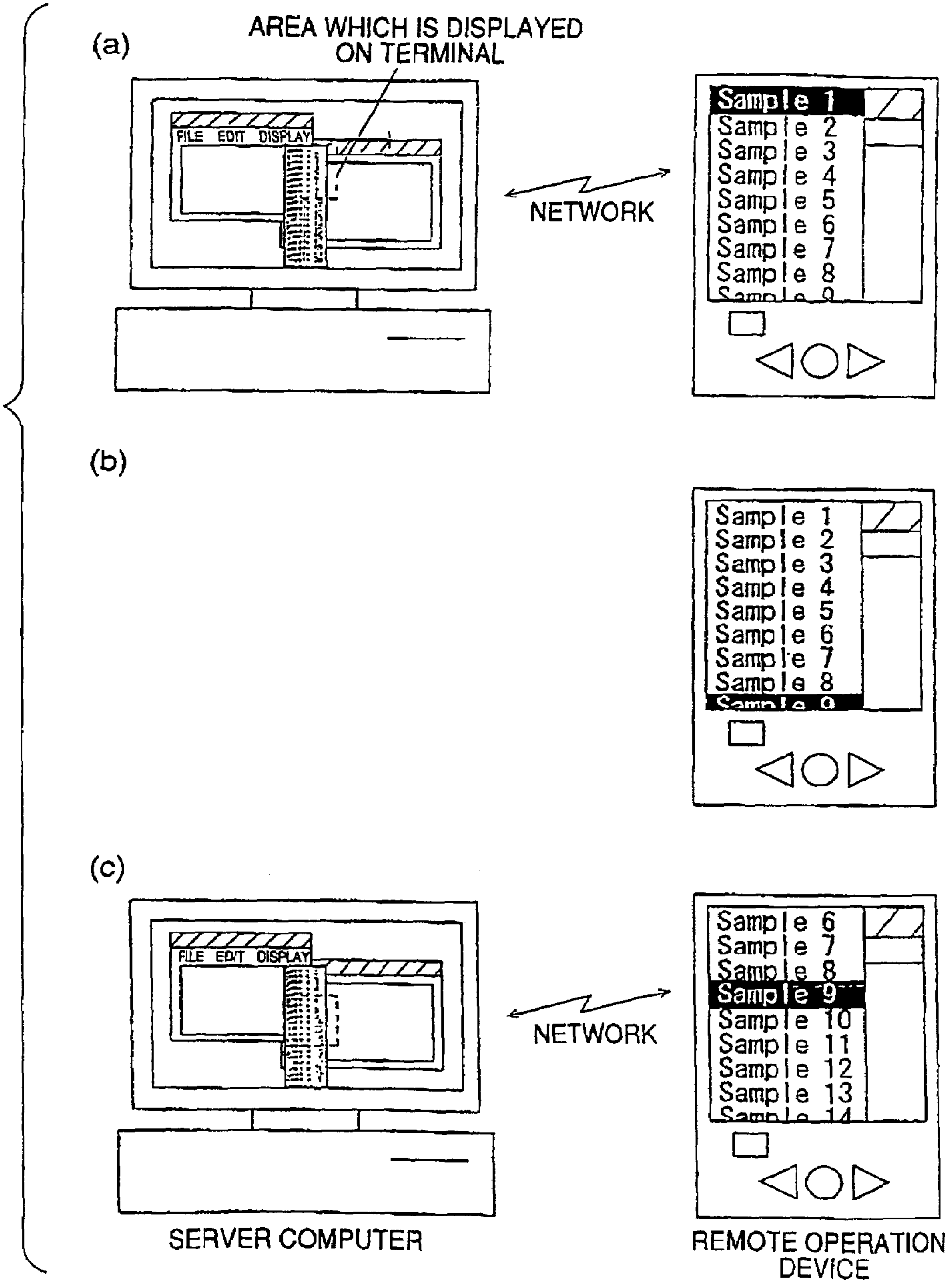
FIG. 58 is a view which shows one example for displaying, on a remote operation apparatus, an item at a portion which was not displayed on the occasion of selecting an item of a menu which was opened, in a remote operation system in an embodiment 17.

FIG. 56 is a flow chart which shows an operation on the occasion that the remote operation device transmits specific information regarding the display device of the remote operation device to the server computer in the remote operation system in the embodiment 16, and FIG. 58 is a flow chart which represents an operation of the server computer on the occasion that the specific information regarding the display device of the remote operation device was received from the remote operation device in the remote operation system in the embodiment 16.

In FIG. 56, the remote operation device was activated, and thereafter, in a step 401, the screen information notification part 416 collects specific (screen display capability) information regarding the display device of the remote operation device, and converts it into data with a format to be transmitted to the server computer. In a step 402, the generated data is notified to the server computer by the communication part 403, and it is finished.

Figure 57:
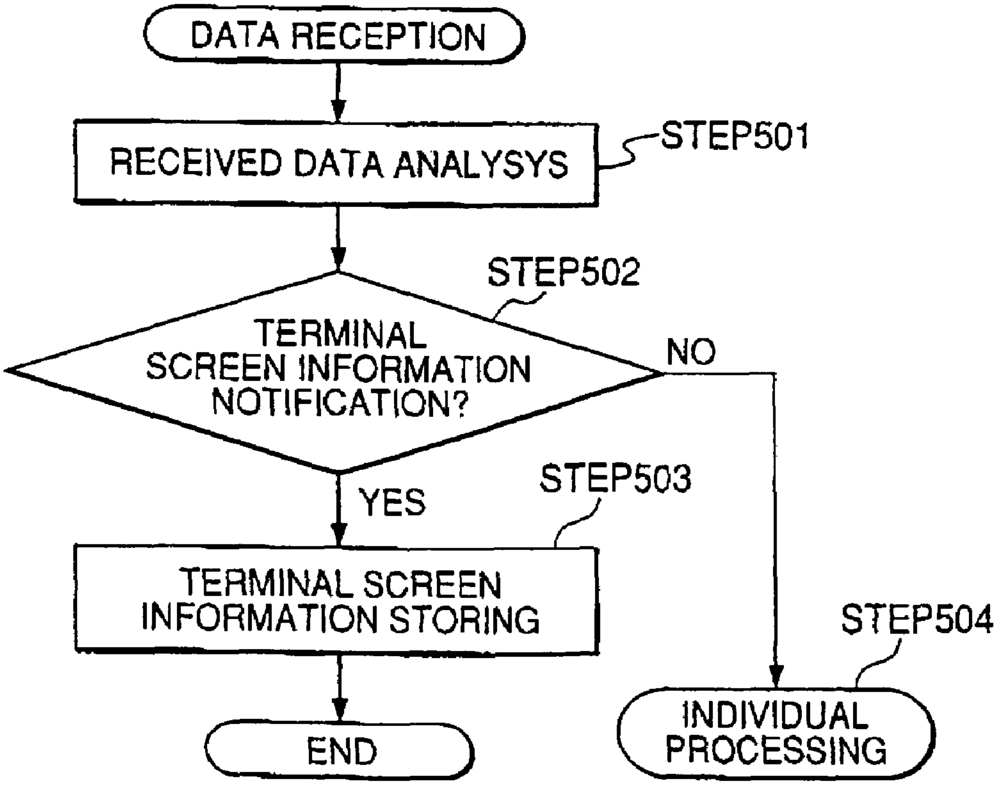
FIG. 57 is a flow chart which shows an operation at the time that the server computer received image information from the remote operation apparatus in the remote operation system in the embodiment 16.

Subsequently, in FIG. 57, the server computer, which received any data (which is received from the remote operation device, is not of only information of screen display capability) from the remote operation device, firstly carries out analysis of received data in the received data analysis part 410, in a step 501.

In a step 502, in case that the analyzed received data is a screen information notification of the remote operation device, the terminal screen information memory part 417 stores, in a step 503, the screen information which was received, and finishes processing. A place for storing may be RAM 203, or it is all right even if it is the secondary memory device 205.

Also, in the step 502, in case that the received data is data other than the screen information notification, there is a necessity to carry out individual processing in a step 504, but a detailed explanation will be omitted.

As above, on the assumption that the server computer is holding specific information regarding the display device of the remote operation device, the flow chart of FIG. 53 will be described.

In FIG. 53, a flow of an operation in case that a menu was opened is the same as a content which was described in the embodiment 15, from the step 301 up to the step 304, and in the step 305, the transmission image area determination part 412 determines an image obtaining area, on the basis of a rectangle size of the menu or the dialog which was obtained in the step 303, and a screen size of the remote operation device which has been held in the terminal screen information memory part 417.

A process for determining the image obtaining area is as follows.

A start coordinate of the image obtaining area is assumed to be a upper left coordinate of a menu. As for a calculation of horizontal and vertical sizes of the image obtaining area, an aspect ratio of a screen is calculated from the screen size of the remote operation device. Next, horizontal and vertical sizes of a rectangle of a menu or a dialog are compared, and one with a larger size is selected. For example, in case that the vertical size was selected, the vertical size is used as a vertical size of the image obtaining area. Further, this vertical size is multiplied with the aspect ratio, to calculate a horizontal size, and it is sued as a horizontal size of the image obtaining area.

Concretely speaking, for example, it is assumed that the screen size of the remote operation device is set to 320 dots vertically×240 dots horizontally, and a size of a menu is 400 vertically×150 dots horizontally. At this time, since a side of the menu with a larger size is of a vertical direction, if the aspect ration 240/320=3/4 is multiplied with 400, a horizontal size becomes 400×3/4=300, and the image obtaining area becomes a size of 400 vertically×300 horizontally.

In accordance with the image obtaining area which was calculated as described above, the image obtaining part 413 obtains, in the step 306, an image which was reduced so as to become horizontal and vertical sizes of the screen of the remote operation device.

In the step 307, the transmission data generation part 414 converts the reduced image which was obtained in the step 306, into a format to be transmitted to the remote operation device.

In the step 308, the communication part 409 transmits the processed image data to the remote operation device.

Also, as to a dialog, similar processing is carried out after the step 309.

As a result of the above-described operations, it becomes possible to display a full picture of the opened menu or dialog on the display device of the remote operation device, in such a status that an image was reduced.

In this manner, according to the remote operation system of this embodiment, when a menu or a dialog was opened by user's operation from the input device of the remote operation device, or by an operation of an application on the server computer regardless of user's intention, it is possible to display a full picture of the menu or the dialog on the remote operation device, and therefore, there is no necessity for a user to carry out a troublesome scroll operation etc. when he selects an item of the menu, and it becomes possible to improve operability of the system.

Embodiment 17

A functional block diagram of a remote operation system in this embodiment is similar to FIG. 46, and therefore, an explanation will be omitted. Also, a device block diagram of the remote operation system in the embodiment 17 is similar to FIG. 47, and therefore, an explanation will be omitted.

FIG. 58 is a view which shows one example for displaying an item in a portion which was not displayed on the occasion of selecting an item of a menu, on the remote operation device, in the remote operation system in the embodiment 17, and FIG. 58(*a*) shows such a status that a menu of a certain application window on the server computer is opened, and such an image that a display position was coordinated with the menu is displayed on the remote operation device. A broken line shown in FIG. 59 shows an area which is displayed on the remote operation device at that time.

FIG. 58(*b*) shows such a status that a cursor, which shows a selection position of a menu, has been shifted downward by an operation system of the remote operation device. FIG. 58(*c*) shows such a status that, in case that an item of the selected menu was deviated from an area which is displayed in FIG. 58(*b*), an image of a display area including an item which is not selected is re-transmitted, and displayed on the remote operation device.

Figure 59:
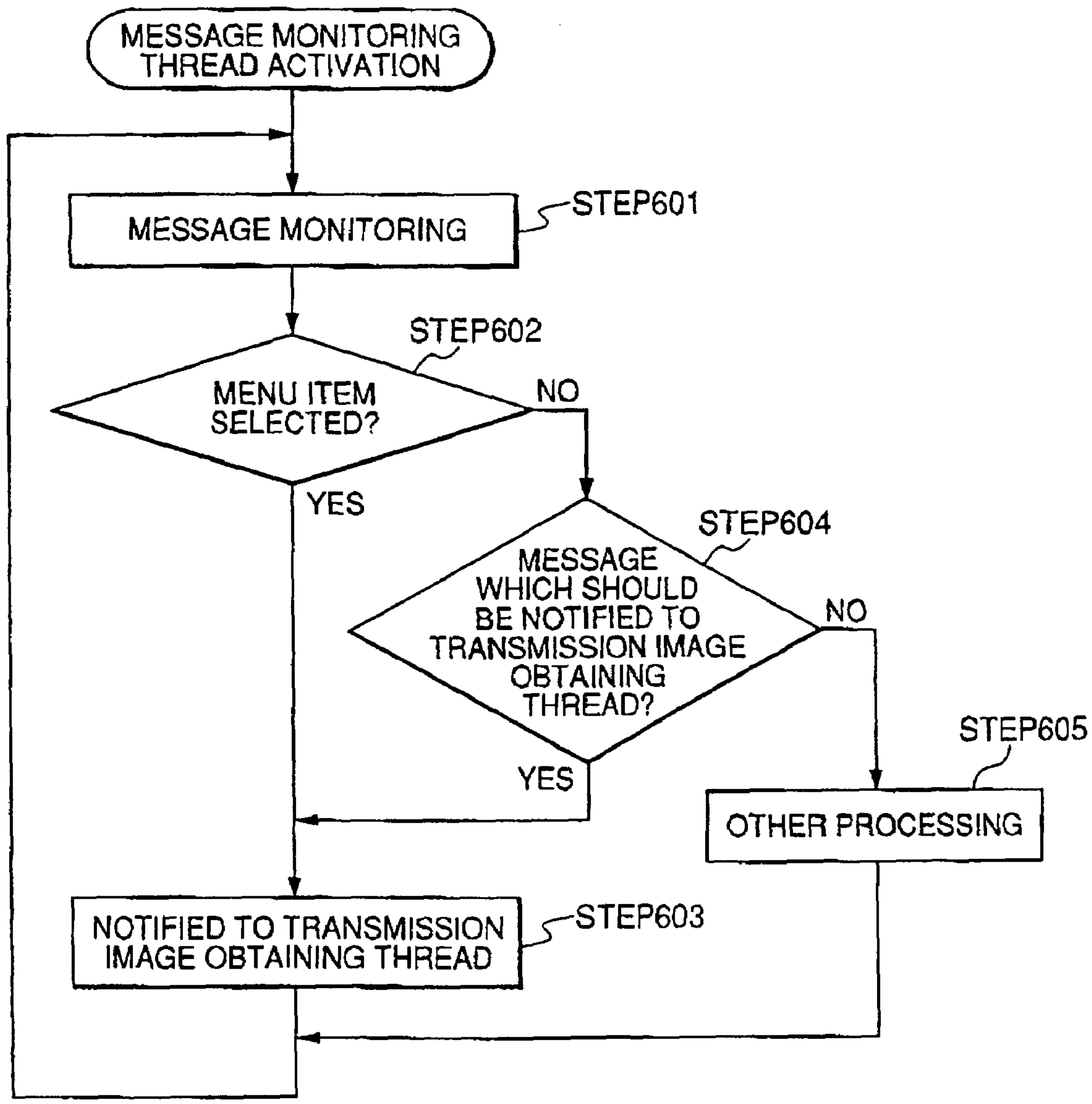
FIG. 59 is a flow chart which shows an internal operation at the time that a server computer detected movement of a cursor of a menu item, in the remote operation system in the embodiment 17.

As shown in FIG. 59, in case that an item in a portion which is not displayed on a screen of the remote operation device was intended to be selected, in case that a menu, which was opened, is larger than a screen size of the remote operation device (FIG. 58(*a*)), re-setup of a display area is carried out in such a manner that an entirety of a selected item is displayed, by shifting a cursor of the menu (FIG. 58(*b*)), and an image in that area is transmitted to the remote operation device, and the remote operation device displays image data which was received (FIG. 58(*c*)).

Figure 60:
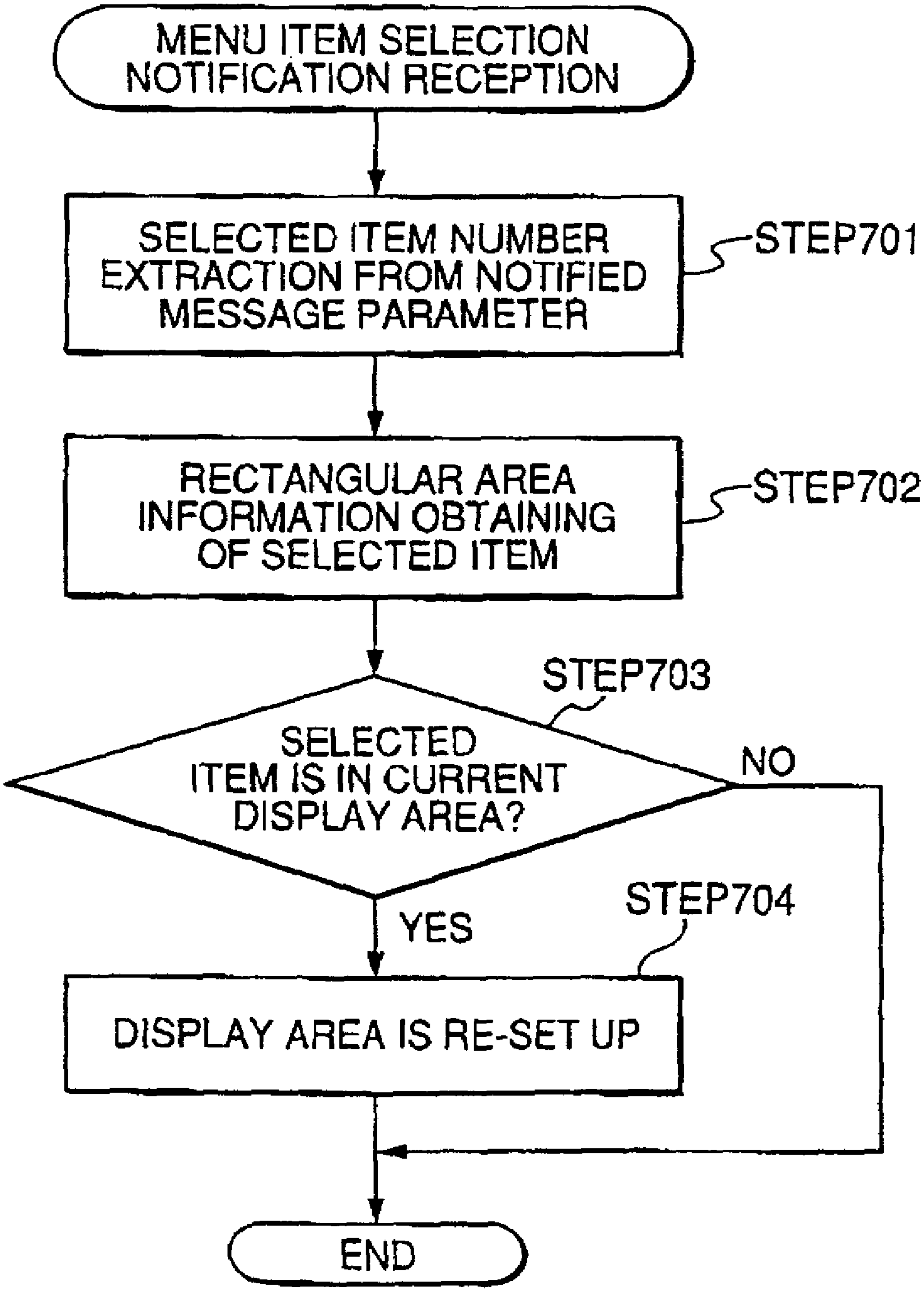
FIG. 60 is a flow chart which shows an operation at the time that the server computer detected movement of the cursor of the menu item, until it determines an area of an image to be transmitted to a remote operation apparatus, in the remote operation system in the embodiment 17.

FIG. 59 and FIG. 60 are operational flow charts of the remote operation system in the embodiment 17 of the invention, and are things which showed an operation of the server computer which is of the controlled side. A flow of an operation shown in FIG. 58 will be explained as follows in detail by use of the flow charts of FIG. 59 and FIG. 60.

FIG. 59 is a flow chart which shows an internal operation when the server computer detected movement of a cursor of menu items in the remote operation system in the embodiment 17.

When a connection with the remote operation device is established, the message monitoring thread shown in FIG. 59 is activated, and it activate the message monitoring part 411, and hooks a message that OS issues in a step 601.

In a step 602, the message monitoring part 411 judges whether or not the hooked message is a message regarding item selection of a menu In case that it is the message regarding menu item selection, the message monitoring part 411 issues, in a step 603, a notification message for showing that there was a change of menu item selection, to the transmission image obtaining thread. Meanwhile, to the notification message, a number of the item which is now selected is added as a parameter.

In a step 604, the message monitoring part 411 judges whether or not the hooked message is a message which should be notified to the transmission image obtaining thread, other than menu item selection, and if it is the message to be notified, issuance of a notification message to the transmission image obtaining thread is carried out in the step 603.

Meanwhile, here, the message to be notified to the transmission image obtaining thread includes also a message regarding open or close of a menu or a dialog, which was described in the embodiment 15.

In a step 605, in case that there is no necessity to notify the hooked message to the transmission image obtaining thread in particular, other separate processing is carried out, but here, it has nothing to do with the invention, and therefore, an explanation will be omitted.

As a result of the above-described operations, in case that an item selection operation of a menu was carried out from an operation system in the remote operation device, it becomes to detect that a cursor position of the menu was changed.

Next, in FIG. 60, an operation up to re-setup of an area which is displayed on the remote operation device, in case that a cursor position was moved to outside an area which is now displayed on the remote operation device, after it was detected that the cursor position of a menu was changed, will be described.

FIG. 60 is a flow chart which shows an operation up to determining an area of an image which is transmitted to the remote operation device, when the server computer detected movement of a cursor of menu items in the remote operation system in the embodiment 17. In FIG. 60, shown is a flow of processing for transmitting an image in a display area to the remote operation device, including a selected item of a menu in the display area, in case that, in the transmission image obtaining thread, a notification message from the message monitoring thread was menu item selection.

As shown in FIG. 60, in the transmission image obtaining thread, when the menu item selection notification message was received, a number of an item which is selected from parameters of a notification message is extracted in a step 701.

In a step 702, a rectangular area, which surrounds an item which is selected by utilizing a number of the item, is obtained. A method of obtaining the rectangular area may utilize API of OS which is used, and since a rectangular area of an entire menu is known, a rectangular area of a n-th item may be calculated.

In a step 703, it is judged whether or not an area of a selected item is included in an area which is now displayed on the remote operation device, and in case that it is not included, re-setup is carried out in a step 704 in such a manner that the area of the selected item is included in the display area, and it is finished.

Also, in the step 703, in case that it was judged that the area of the selected item is included in the area which is now disclosed on the remote operation device, it is finished without carrying out re-setup of the display area.

As a result of the above-described operations, if a cursor of a menu is moved and an item which is intended to be selected is outside a current display area, it becomes possible to re-setup it to a display area which includes an item which is intended to be newly selected, and to display it on the remote operation device.

In this manner, according to the remote operation system of this embodiment, in case that a cursor was moved to an outside of a display area of the remote operation device, by moving a cursor which shows selection of a menu item, by a user's operation from the input device 211 of the remote operation device, there is no necessity for a user to carry out a scroll operation separately, by transmitting an image in an area which includes the cursor to the remote operation device, and it becomes possible to improve operability of the system.

Embodiment 18

A functional block diagram of a remote operation system in this embodiment is similar to FIG. 54, and therefore, an explanation will be omitted. Also, a device block diagram of the remote operation system in the embodiment is similar to FIG. 55, and therefore, an explanation will be omitted.

In the embodiment 15 through the embodiment 17, in case that a menu is larger than a screen size of the remote operation device, on the occasion of displaying a menu on the remote operation device, there is such a case that an image of only the menu is displayed on the remote operation device. At this time, if a menu is intended to be closed without selecting an item of the menu, there is such a necessity that a user himself scrolls a display area, and displays an area other than the menu, and clicks that portion.

In the embodiment 18, an embodiment for alleviating operational complication in case of displaying a menu on an entire screen of the remote operation device will be described.

Figure 61:
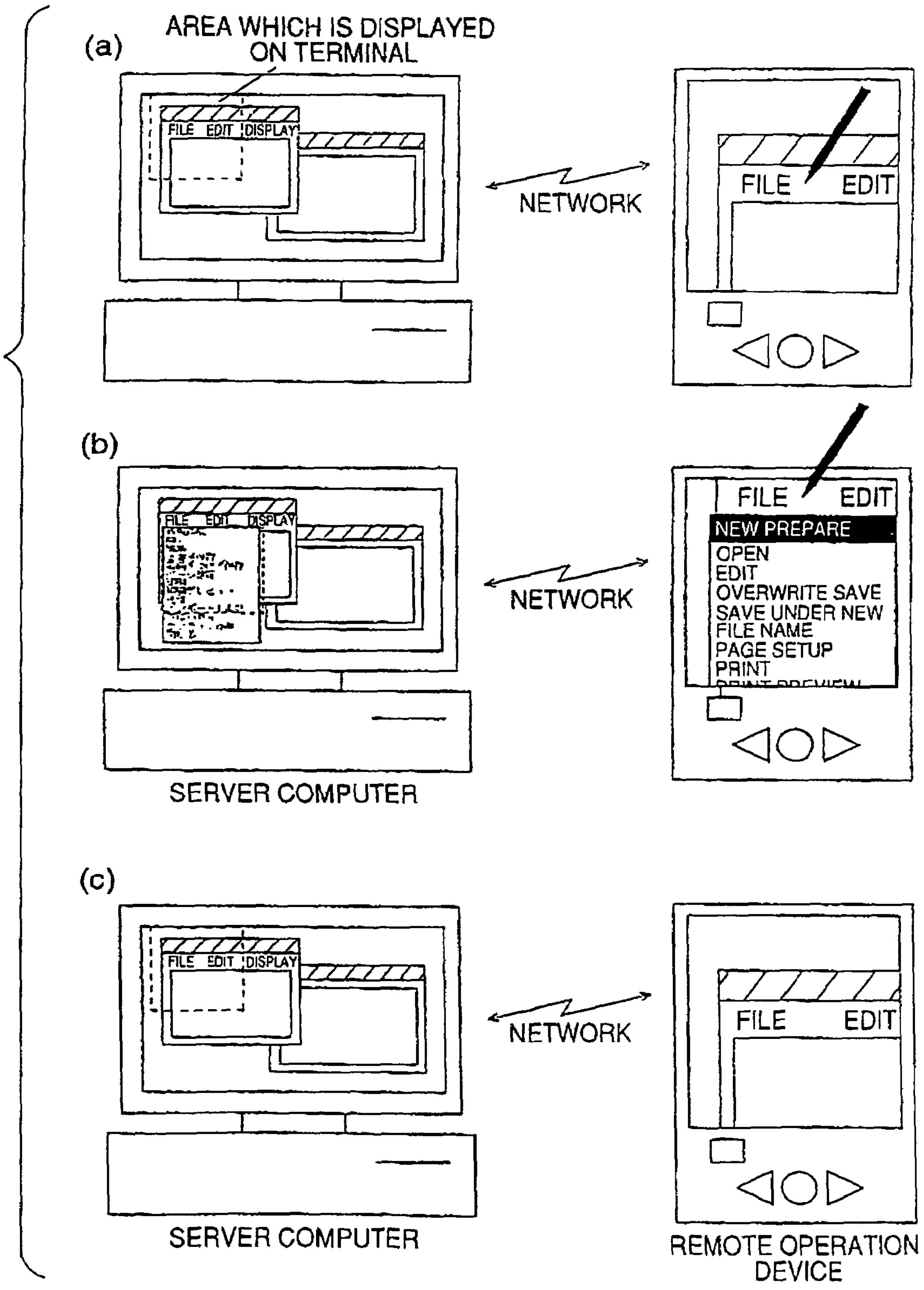
FIG. 61 is a view which shows one example for displaying an image which included an area other than a menu on the occasion that a menu was opened, in a remote operation system in an embodiment 18.

FIG. 61 a view which shows one example for displaying an image in which an area other than a menu was included, on the occasion that a menu was opened, in the remote operation system in the embodiment 18, and FIG. 61(*a*) shows such a status that a part of a display screen of the server computer is displayed on the remote operation device. Also, FIG. 61(*b*) shows such a status that an image, which included an area other than a menu, is displayed on the remote operation device on the occasion that the menu was opened. Also, FIG. 61(*c*) shows such a status that a user clicks the area other than the menu, and the menu was closed.

As shown in FIG. 61, when a menu was displayed on the server computer, in such a status that a remote operation of the server computer from the remote operation device is possible (FIG. 61(*a*)), an image is obtained and transmitted, setting an area with margins at a upper part and a left part of an area of the menu, as a display area, and is displayed on the remote operation device (FIG. 61(*b*)). Also, by clicking an area other than the menu, the menu is closed, and it is possible to display an original display area (FIG. 61(*c*)).

In this manner, according to the remote operation system of this embodiment, when a menu is opened by a user's operation from the input device 511 of the remote operation device, or by an operation of an application on the server computer regardless of user's intention, it becomes possible to close the menu, by clicking a portion other than the menu, in case that the menu is intended to be closed without selecting an item of the menu, by transmitting an area which included the opened menu and an area other than the menu, to the display device of the remote operation device, and it is possible to alleviate the operational complication, and it becomes possible to improve operability of the system.

It should be understood that the forgoing pertains only to the embodiments of the present invention, and that numerous changes may be to the embodiments described herein without departing from the spirit and scope of the Invention.

This application is based upon and claims the benefit of priority of Japanese Patent Application No2003-364269 filed on Oct. 24, 2003 and Japanese Patent Application of the No2003-75413 filed on Nov. 5, 2004 and Japanese Patent Application of the No2003-401261 filed on Dec. 1, 2004 and Japanese Patent Application of the No2003-401262 filed on Dec. 5, 2004 the contents of which are incorporated herein by reference in its entirety.

What is claimed is:

1. A remote operation system comprising a communication device which obtains display information through a network, and a remote operation device which is capable of carrying out communication with the communication device and which receives the display information obtained by the communication device, wherein the remote operation device comprises:

a first display part, which displays various information, which obtains display information from the communication device by an instruction from the remote operation device, and which displays said display information on the first display part, and wherein the communication device comprises:

a second display part which displays various information;

a window monitoring part, which detects that a window displayed on a display screen of the second display part is newly opened, and obtains display position information of the newly opened window;

a transmission image area determination part, which determines a display area which is displayed on the first display part of the remote operation device, from entire display displayed on the second display part, on the basis of the display position information obtained by the window monitoring part;

an image obtaining part, which obtains display information in the display area determined by the transmission image area determination part;

a transmission data generation part, which converts the display information obtained by the image obtaining part into a signal to be transmitted to the remote operation device, a communication part, which transmits the signal converted by the transmission data generation part, to the remote operation device, and a control part which controls the above-described each part, wherein:

in response to the newly opened window being displayed on the second display part, the display information corresponding to said newly opened window is automatically displayed on the first display part.

2. The remote operation system as set forth in claim 1, wherein the transmission image area determination part determines a display area, on the basis of display position information obtained by the window monitoring part and a display screen size of the first display part.

3. The remote operation system as set forth in claim 1, wherein the transmission image area determination part determines a display area on the basis of display position information obtained by the window monitoring part, in case that a window is newly opened on the second display part, and changes screen data which is transmitted to the remote operation device by the communication part, to image data before a display message is opened, in case that a window of the second display part, which relates to a display area which is displayed on the first display part, is opened.

4. A remote operation system comprising a remote operation device and a server device which are capable of carrying out mutual data communication through a communication network, wherein the remote operation device comprises:

a first display part, which obtains a display image which is in response to an instruction on a display screen of the first display part, from the server device, and displays it on the first display part;

wherein the server device comprises:

a second display part;

a window monitoring part, which detects that a window displayed on a display screen of the second display part is newly opened, and obtains display position information of the newly opened window;

a transmission image area determination part, which determines a display area displayed on the first display part of the remote operation device, among entire display which is displayed on the second display part, on the basis of the display position information obtained by the window monitoring part;

an image obtaining part, which obtains display data in the display area determined by the transmission image area determination part;

a transmission data generation part, which converts the display data obtained by the image obtaining part, into a signal to be transmitted to the remote operation device;

a communication part, which transmits the signal converted by the transmission data generation part, to the remote operation device;

a control part, which controls the above-described each part, wherein, in response to the newly opened window being displayed on the second display part, the display information corresponding to said newly opened window is automatically displayed on the first display part; and a display area memory part, which stores, when another window is opened on the second display part in such a status that display information of the display area of the second display part is displayed on the first display part, coordinate information of a display area surrounded by the another window; and wherein the control part reads out coordinate information of the display area saved by the display area memory part, on the occasion that the window monitoring part detected that a window is closed, and the transmission image area determination part determines image data in a display area which is transmitted to the remote operation device on the basis of the coordinate information.

5. A display method for displaying information with a display part of a remote operation device based on the display information of a communication device, wherein a communication network exists between the remote operation device and the communication device, and the remote operation device and the communication device communicate with each other using the communication network, the display method comprising:

detecting opening of a window displayed on a display screen of a display part of the communication device;

obtaining display position information of the window opened in the communication device;

determining a display area, in which the display part of the remote operation device performs a display process, in an entire display area, in which the display part of the communication device performs a display process, on the basis of the obtained display position information;

obtaining display information of the determined display area;

converting the display information into a signal; and transmitting the signal to the remote operation device, wherein:

in response to the window being displayed on the display screen of the display part of the communication device, the display information corresponding to said window being displayed on the display screen of the display part of the communication device is automatically displayed on the display part of the remote operation device.

* * * * *